US006550675B2

(12) United States Patent
Davis et al.

(10) Patent No.: US 6,550,675 B2
(45) Date of Patent: Apr. 22, 2003

(54) DIRECT VOTE RECORDING SYSTEM

(75) Inventors: Thomas G. Davis, Nidlothian, VA (US); Irving L. Rabinowitz, Glenside, PA (US)

(73) Assignee: Diversified Dynamics, Inc., Glen Allen, VA (US)

( * ) Notice: Subject to any disclaimer, the term of this patent is extended or adjusted under 35 U.S.C. 154(b) by 0 days.

(21) Appl. No.: 09/797,185

(22) Filed: Mar. 2, 2001

(65) Prior Publication Data

US 2001/0035455 A1 Nov. 1, 2001

Related U.S. Application Data

(63) Continuation of application No. PCT/US99/20197, filed on Sep. 2, 1999.

(60) Provisional application No. 60/098,906, filed on Sep. 2, 1998.

(51) Int. Cl.[7] ................................................ G06F 17/60

(52) U.S. Cl. ....................... 235/386; 235/51; 235/50 R; 235/50 A; 235/382.05; 705/12

(58) Field of Search ................................ 235/50, 50 R, 235/50 A, 50 B, 50 F, 382.05, 386

(56) References Cited

U.S. PATENT DOCUMENTS

| | | | | | |
|---|---|---|---|---|---|
| 3,722,793 | A | * | 3/1973 | Arnoff | 235/54 |
| 4,807,908 | A | | 2/1989 | Gerbel | 283/5 |
| 5,120,939 | A | * | 6/1992 | Claus et al. | 235/380 |
| 5,189,288 | A | * | 2/1993 | Anno et al. | 235/386 |
| 5,218,528 | A | * | 6/1993 | Wise et al. | 235/54 F |
| 5,260,550 | A | | 11/1993 | Rapp et al. | 235/50 R |
| 5,278,753 | A | | 1/1994 | Graft, III | 364/409 |
| 5,362,104 | A | | 11/1994 | Rapp et al. | 283/5 |
| 5,377,099 | A | | 12/1994 | Miyagawa | 364/409 |
| 5,412,727 | A | * | 5/1995 | Drexler et al. | 380/24 |
| 5,495,532 | A | | 2/1996 | Kilian et al. | 380/30 |
| 5,497,318 | A | | 3/1996 | Miyagawa et al. | 364/409 |
| 5,583,329 | A | | 12/1996 | Davis, III et al. | |
| 5,610,383 | A | * | 3/1997 | Chumbley | 235/386 |
| 5,612,871 | A | | 3/1997 | Skogmo | 395/212 |
| 5,732,222 | A | | 3/1998 | Miyagawa et al. | 395/212 |
| 5,764,221 | A | | 6/1998 | Willard | |
| 5,821,508 | A | | 10/1998 | Willard | |
| 5,875,432 | A | * | 2/1999 | Sehr | 705/12 |
| 5,878,399 | A | * | 3/1999 | Peralto | 705/12 |
| 6,081,793 | A | * | 6/2000 | Chalienner et al. | 705/50 |
| 6,250,548 | B1 | * | 6/2001 | McClure et al. | 235/51 |

* cited by examiner

*Primary Examiner*—Michael G. Lee
*Assistant Examiner*—Seung Ho Lee
(74) *Attorney, Agent, or Firm*—Jacobson Holman PLLC

(57) ABSTRACT

A Direct Vote Recording System (DVRS) (10) has three primary components, Personal Computer (PC) (100) which runs an Election Management System (EMS), Direct Vote Recording Machine (DVRM) (300) and a Smart Card Activator Device (SCAD) (500). In addition, the DVRS includes Data Carriers (800), Voter Smart Cards (710) and Polling Office smart cards (720). The DVRS generally operates as follows: (1) data of a new election is created using the EMS software on the PC (100), (2) downloading that data to Ballot/Tally Data Carriers (800) which are then transported to Polling Place(s) where (3) the data is then loaded into the SCAD (500) and DVRM(s) (300), (4) hardware tests may then be conducted on the DVRS equipment and Test Voting may be performed to validate operational DVRS software and the accuracy of the downloaded election data, (5) the election is then conducted using the SCAD to generate Voter Smart Cards (710) for Test, Practice and Active voting, and the DVRM to collect votes, (6) polls are closed, the data is downloaded from the DVRM(s) (300) to the Data Carrier (800), and, (7) the Carrier (800) is returned to the PC where election results are computed and reports made. Test and Practice voting may only be conducted prior to opening the polls. The Polling Officer smart card (720) is used by a Polling Officer to control operation of the SCAD (500) and DVRMs (300) at the Polling Place.

27 Claims, 37 Drawing Sheets

DIRECT VOTE RECORDING SYSTEM

This is a Continuation Application of PCT International Application No. PCT/US99/20197, filed Sep. 2, 1999 and claims benefit of provisional application No. 60/098,906 filed Sep. 2, 1998.

BACKGROUND OF THE INVENTION

1. Field of the Invention

The present invention relates to a voting system. More particularly, the present invention relates to an automated direct vote recording system (DVRS).

2. Description of the Related Art

Voting systems have generally been developed to facilitate voting. However, these systems are not highly reliable and are not flexible for use in a variety of voting conditions. In addition, prior voting systems are generally difficult to use by both election officials that create and tally an election and by voters.

SUMMARY OF THE INVENTION

Accordingly, it is an object of the present invention to provide a voting system that meets Federal Election Commission Requirements, and can create a variety of elections.

It is a further object of the invention to provide a voting system that is easy to use, has a portable Voting Machine, high level of security and reliability, displays the correct ballot to each voter without intervention of a Polling Officer, retains voting results accumulated over a period of weeks, display ballots in different languages, and supports various voting conditions such as cumulative voting and candidate rotation.

It is yet another an object of the invention to provide a voting system that supports each cycle of a vote, including election or ballot definition, Polling Place preparation, voting, poll closing, and vote tallying.

It is a further object of the invention to provide a voting system that supports voter authorization, practice and test voting, result reporting, fraud prevention, hardware capabilities and audit trails.

The DVRS system generally comprises three primary components: Personal Computer (PC) which runs an Election Management System (EMS), Direct Vote Recording Machine (DVRM or Voting Machine) and Smart Card Activator Device (SCAD). In addition, the DVRS includes PCMCIA Ballot/Tally Data Carriers (Data Carrier), Voter Smart Cards and Polling Officer smart cards. The EMS is used to create an election and tally election results. The SCAD is used to configure Voter Smart Cards to control voting, which occurs on the DVRM. The Data Carriers are used in two roles, first as a Ballot/Tally carrier to transfer election or ballot data for the EMS to the DVRMs and SCADs and to transfer tally data from the DVRM to the EMS, and second as an Archive Data Carrier.

The DVRS generally operates as follows. (1) Data of a new election is created using the EMS software on the PC. (2) Downloading that data to Ballot/Tally Data Carriers which are then transported to Polling Place(s) where (3) the data is then loaded into the SCAD and DVRM(s). (4) Hardware tests may then be conducted on the DVRS equipment and Test Voting may be performed to validate operational DVRS software and the accuracy of the downloaded election data. (5) The election is then conducted using the SCAD to generate Voter Smart Cards for Test, Practice, and Active voting and the DVRM to collect votes. (6) Polls are closed, the data is downloaded from the DVRM(s) to the Data Carrier. And, (7) the Carrier is returned to the PC where election results are computed and reports made. Test and Practice voting may only be conducted prior to opening the polls, and the Polling Officer smart card is used by a Polling Officer to control operation of the SCAD and DVRMs at the Polling Place.

An Auto-Secure Mode is provided so that the Polling Officer neither has to guard the SCAD nor take it along when called away from their post. The auto-secure mode will power-down the SCAD after 15 minutes of inactivity or upon command. Access can only be resumed by inserting a Polling Officer smart card and entering the Polling Officer password. The SCAD will then display the Polling Officer menu. The Polling Officer can enable/disable the automatic function.

The DVRM solely supports voting. The DVRM includes redundant memory and dual power capabilities to protect voting results and to allow continued operation in the event of power failure. Built-in security features minimize the potential for vote fraud while keeping Polling Officer training requirements to a minimum. The DVRM displays ballots and accepts votes an those ballots. In support of Active Voting, the DVRM may also be used as a Practice Voting Machine and also has a Test Voting mode for use prior to Polls Open. The Polling Officer, however, does not need to access a DVRM during Active Voting. Polling Officer tasks are only required prior to polls open for loading and testing, and after polls are closed for data retrieval and optional local reports.

Operation of the DVRM generally begins with the Polling Officer loading the DVRM with new election data. The data is then verified and optional hardware tests or adjustments may be performed. Prior to polls open, the DVRM may also be used for Test Voting or Practice Voting. Once the polls have been opened on a DVRM, that unit will no longer accept a Test Voting smart card under any circumstances since Test Voting collects test votes which could destroy the live data. Practice voting however does not save data and can therefore be performed at any time, but only on DVRMs dedicated to Practice Voting.

Each Polling Officer is also issued an EMS User Password by a person designated as the DVRS System Administrator, which the Polling Officer may change if so inclined. This EMS User Password is used to access the EMS software on the PC for the purpose of creating the Polling Officer SCAD and DVRM passwords. The Polling Officer creates and enters his/her own alphabetic DVRM password. The EMS will validate that sequence as the Polling Officer DVRM Password and will also create and return a numeric sequence as that Polling Officer's SCAD Password. Because the SCAD has only a numeric keypad, and the DVRM has only an alphabetic keypad, the Polling Officer is issued both a Polling Officer SCAD Password and a Polling Officer DVRM Password. These are used for accessing the respective units at the Polling Place. These passwords are unique to this Polling Officer at this Polling Place for this election.

The bulk of Polling Place preparation is best performed far in advance of Election Day to allow time for changes. If this is done, the Polling Officer must only remove the batteries after the testing is complete and store the units securely until Election Day. At that time, three actions may be performed: the units may be put directly into service at Polls Open time, any part(s) of the original Polling Place Preparation can be repeated either to update the election data due to intervening changes, or a demonstration can be performed to verify that Data Integrity has been maintained during post-testing storage and transport to the Polling Place.

The voting system of the present invention provides support for all voting conditions, including early voting, primary elections, multiple ballot entries for a single candidate endorsed by multiple parties, ticket voting, ticket splitting, overvote prevention, write-in voting, and two-part recalls. The system can also create bilingual ballots with text in two languages on the same ballot page, large-text ballots, and audio response. Party icons can be displayed as part of each candidate's ballot entry. Signatures and official seals may be displayed on the first or last page of each ballot or on the top of every page. A variety of controls allow the using jurisdiction to tailor the system to local needs and procedures.

Authorized users are required to sign on to the EMS using an ID and password. The access control subsystem will confirm a user's identity against a file of encrypted passwords. This subsystem will then limit access to authorized elections and to just those functions authorized for the selected election. All other subsystems are designed so they cannot be invoked independently of the access control subsystem. The Voter Smart Card is password protected using a Polling Place specific internal password known only to the SCADs and DVRMs. The Voter Smart Cards can only be used one time at one Polling Place and for one election until re-programmed by the SCAD. All data stored on the PCs and Data Carriers are encrypted, preferably at the record level. Tamper detection codes may also be used. The Voter and Polling Officer smart cards are password protected.

No critical data is stored on the SCAD, so encryption is not necessary. Data stored on the DVRM will rely on the physical security provided for the Voting Machines themselves. Therefore, the DVRM is not encrypted in the preferred embodiment. Data stored in the RAM drive and in flash memory on the DVRMs is protected by Reed-Solomon codes. All PC-based subsystems keep a complete audit log of all database maintenance (add, change, delete) activities and all other user requests. All action records will contain the user ID, date/time, facility, and type of action (e.g., report or function requested).

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1A:
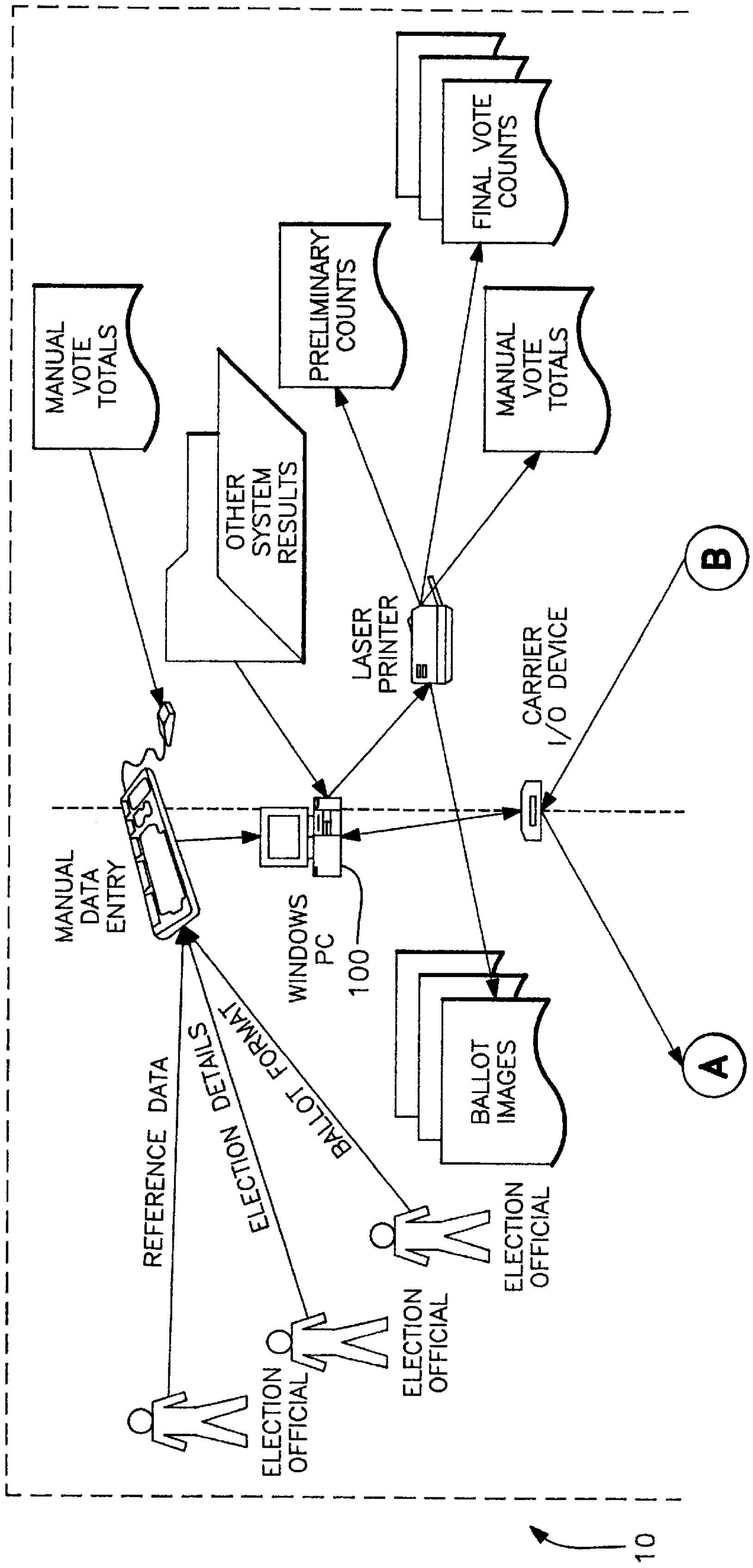
FIGS. 1–3 show the DVRS implemented in a small, medium and large configuration, respectively.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Direct Vote Recording System (DVRS)

Figure 1B:
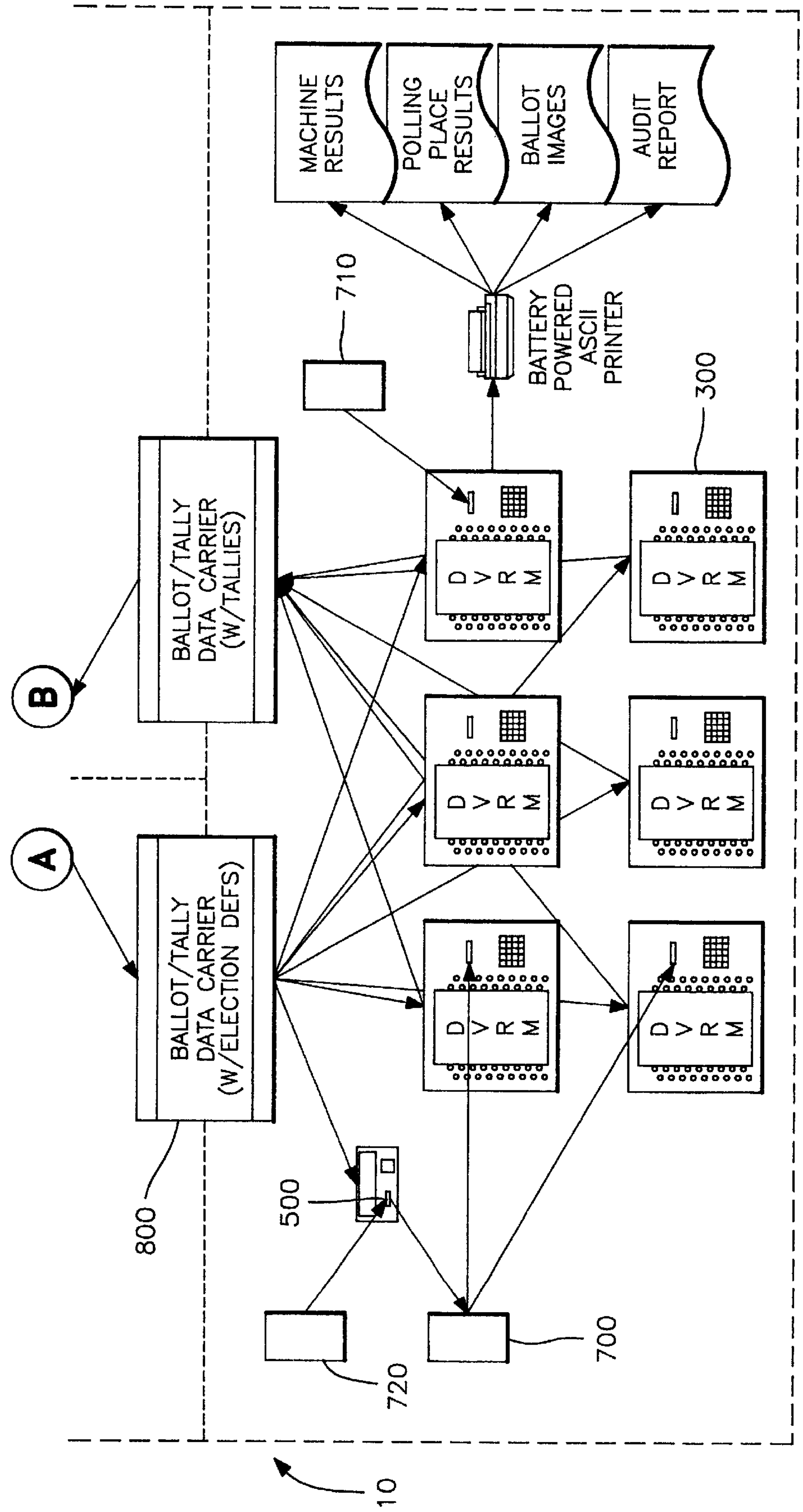
Figure 2A:
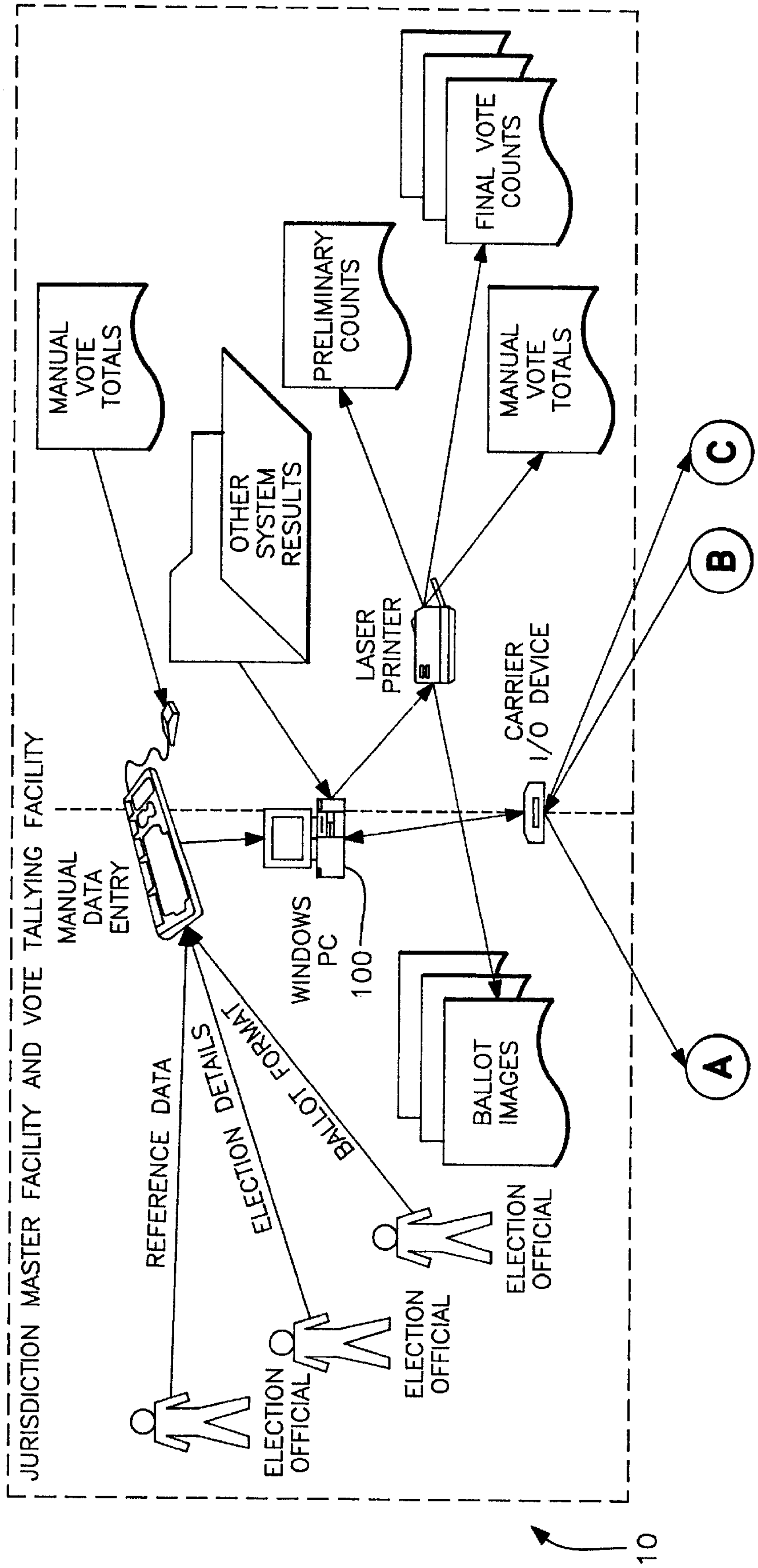
Figure 2B:
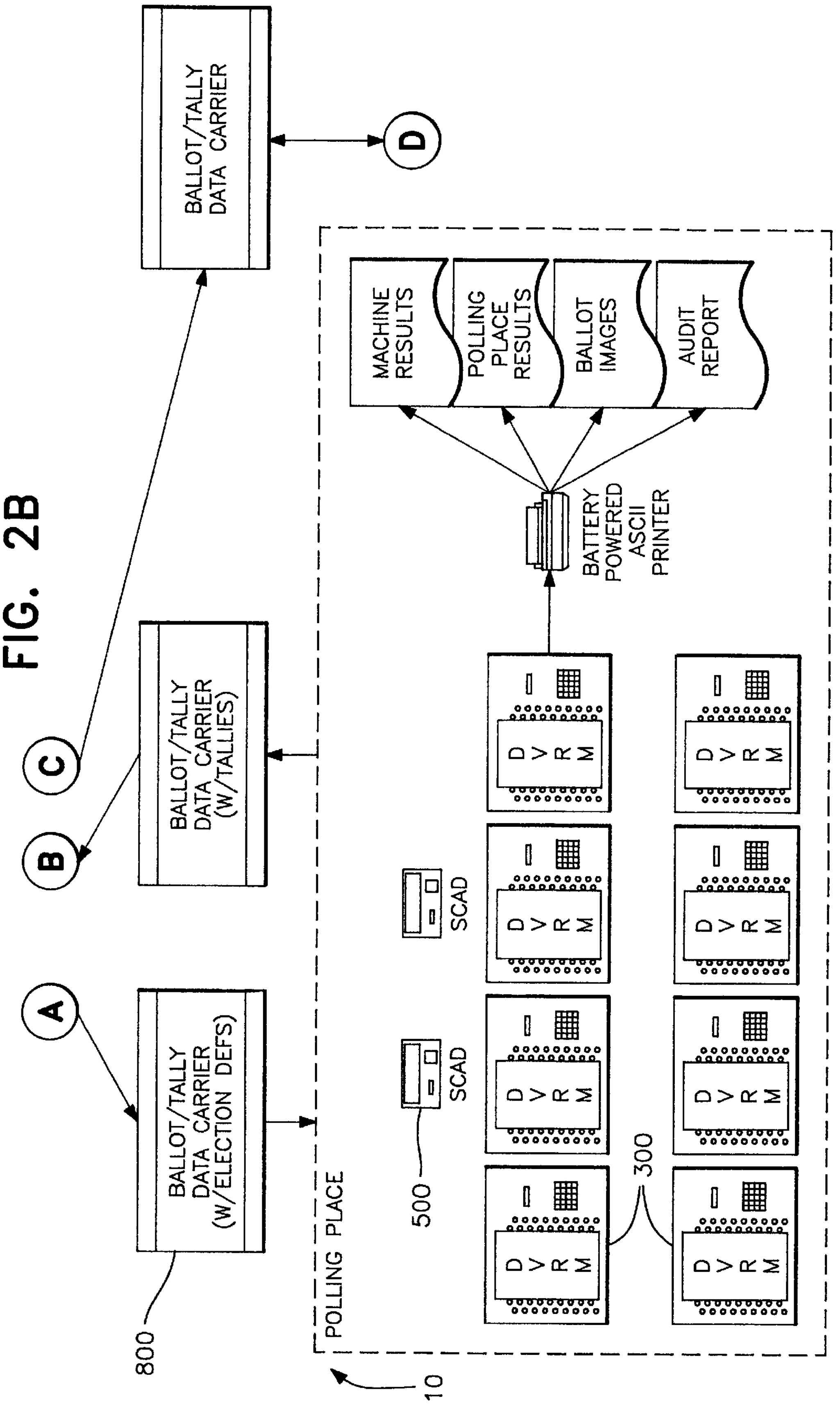
Figure 2C:
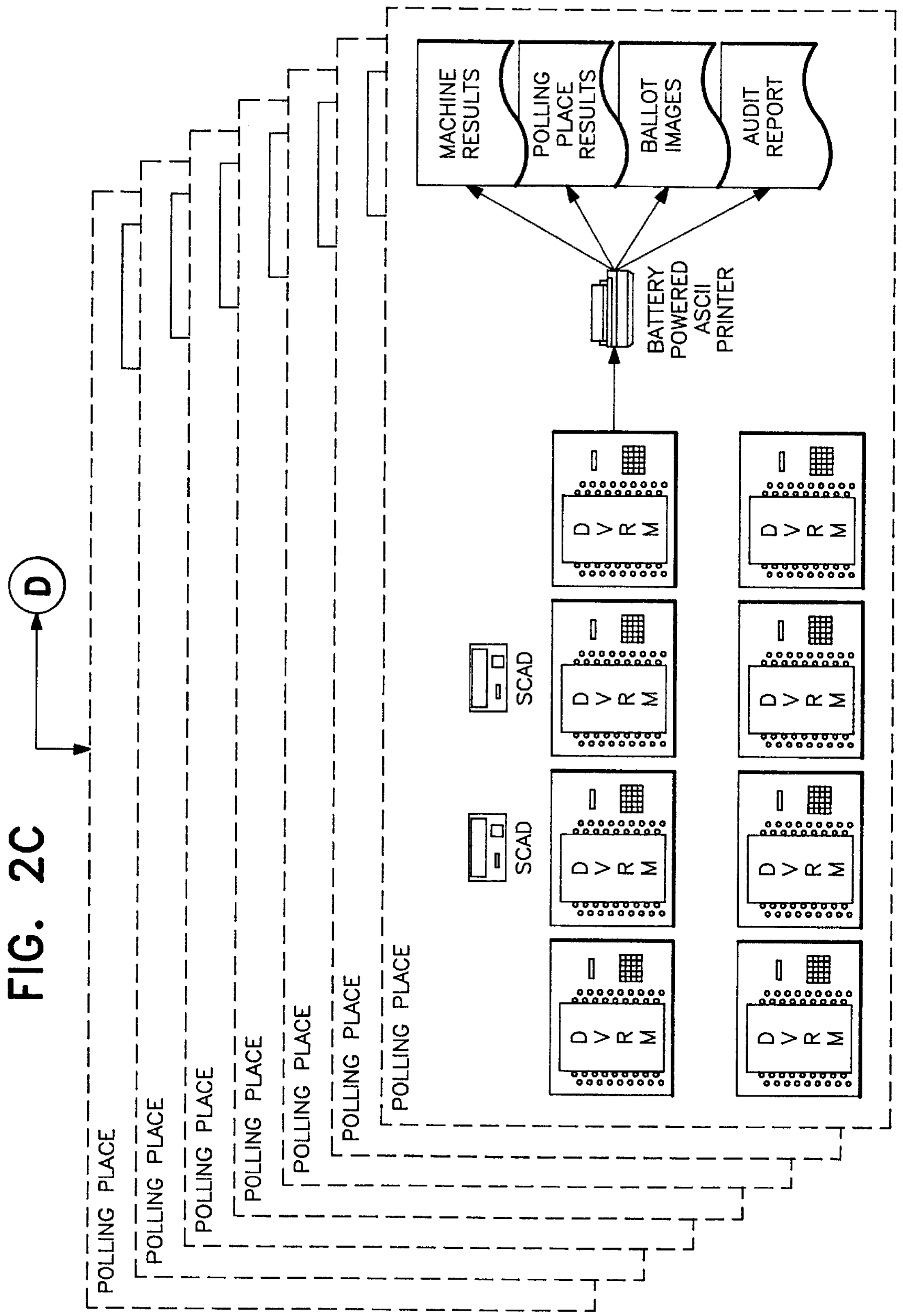
Figure 3A:
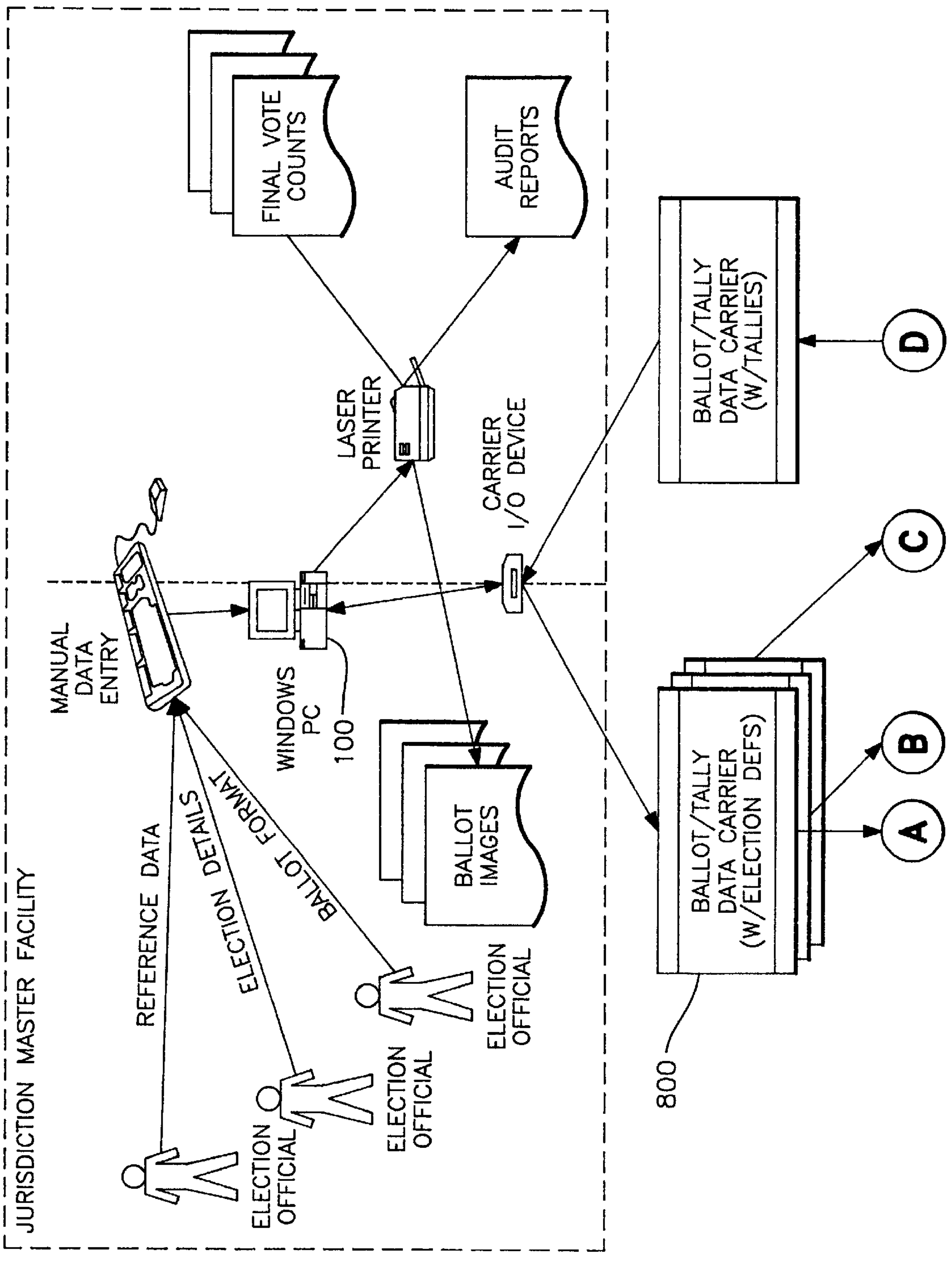
Figure 3B:
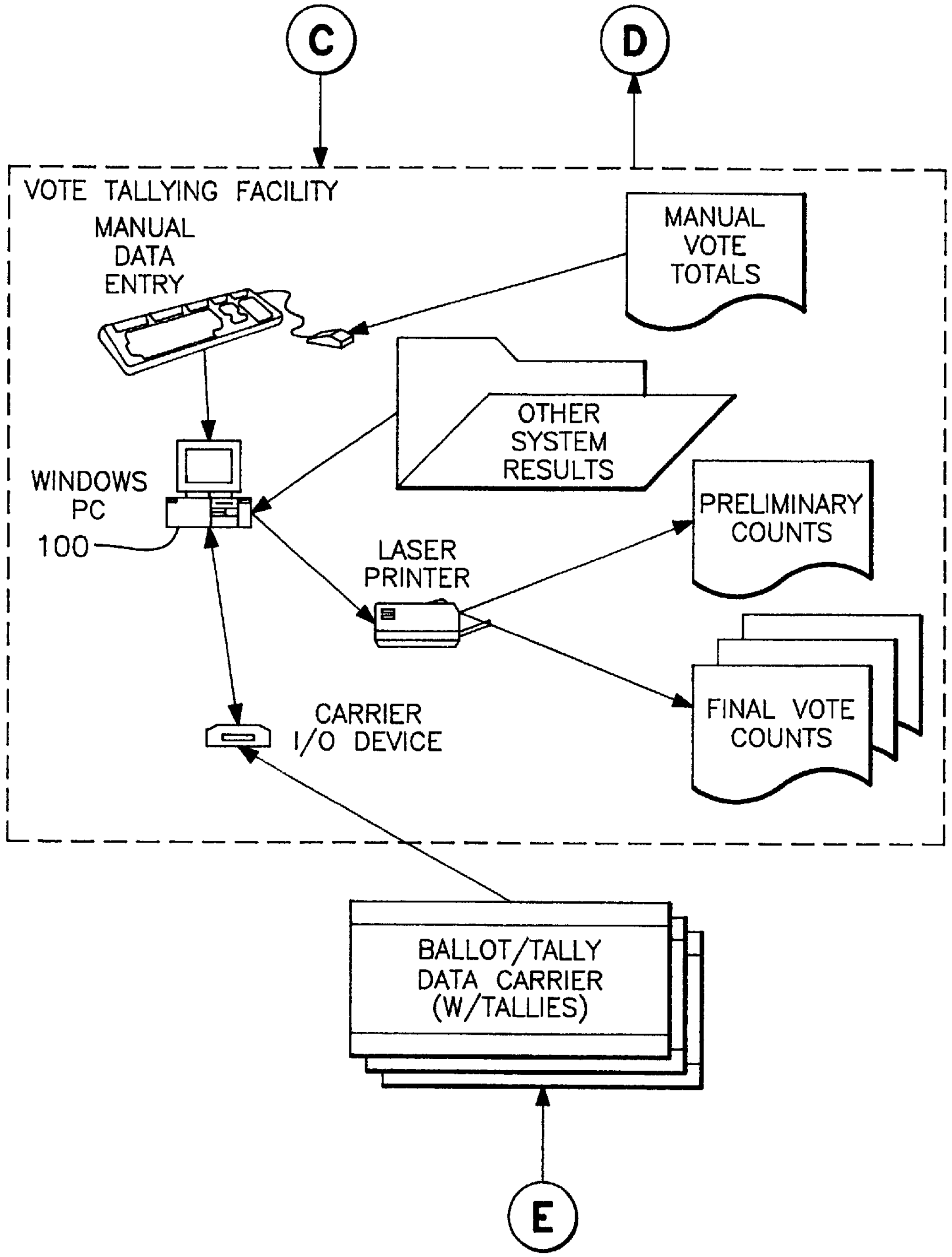
Figure 3C:
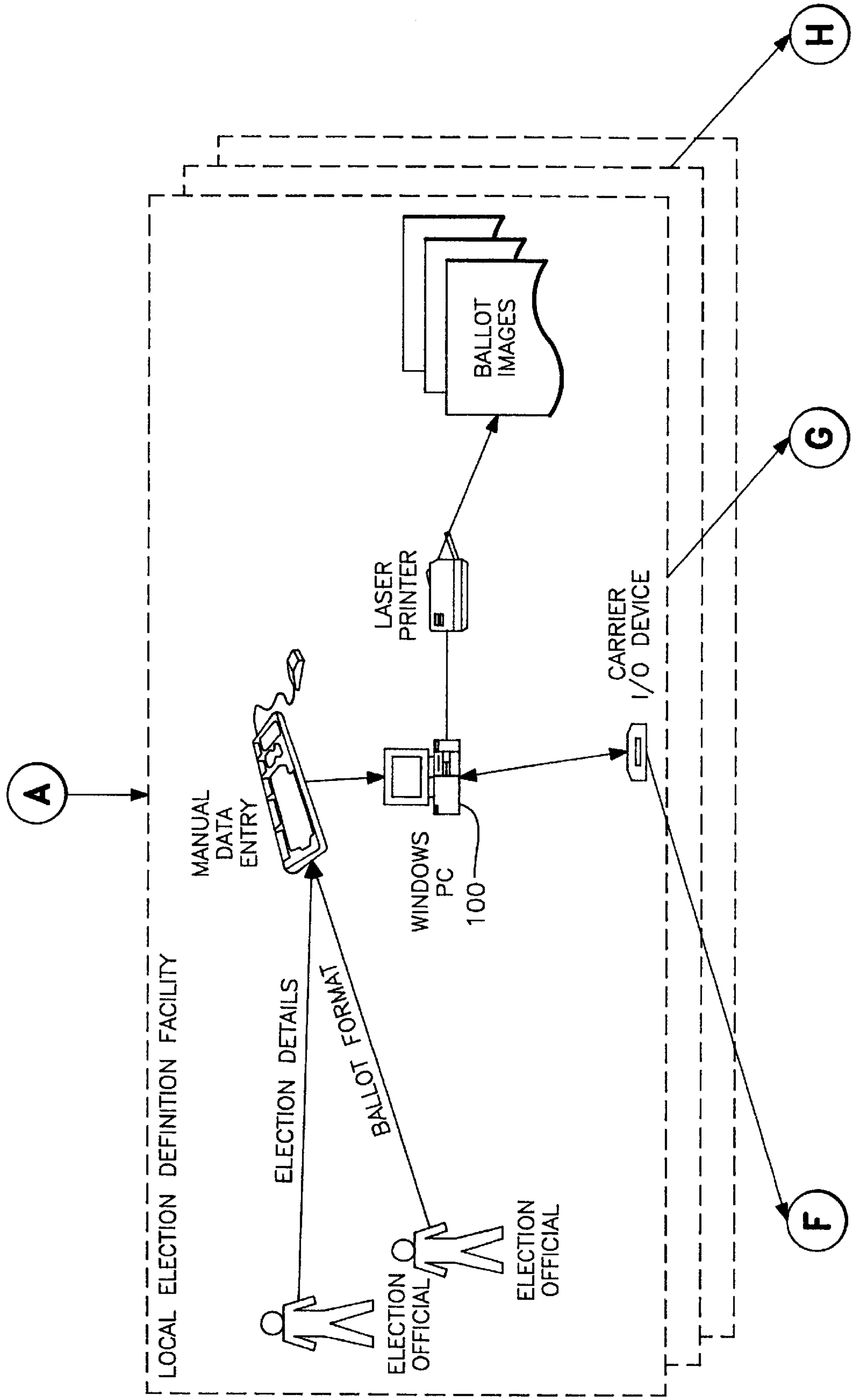
Figure 3D:
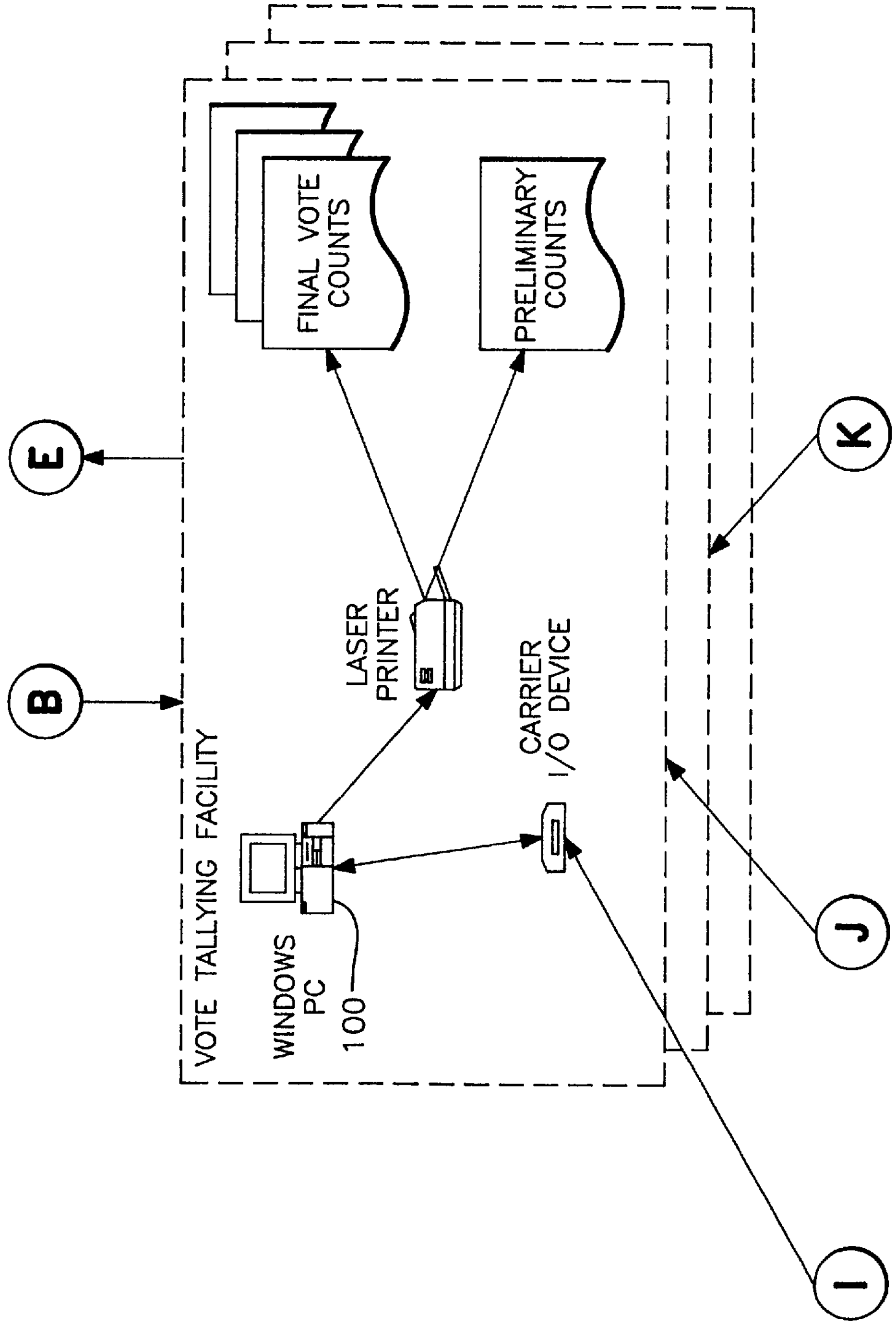
Figure 3E:
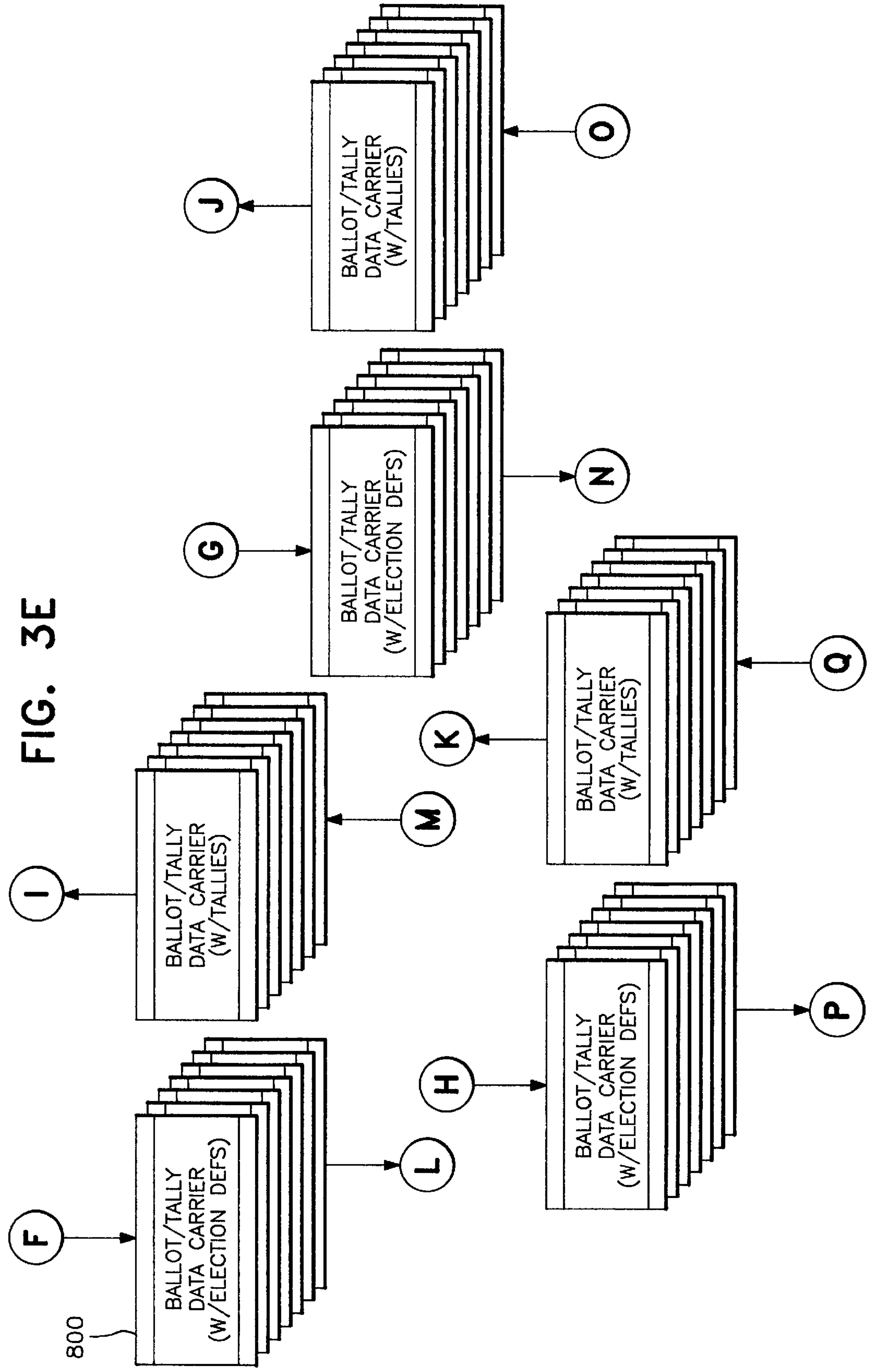
Figure 3F:
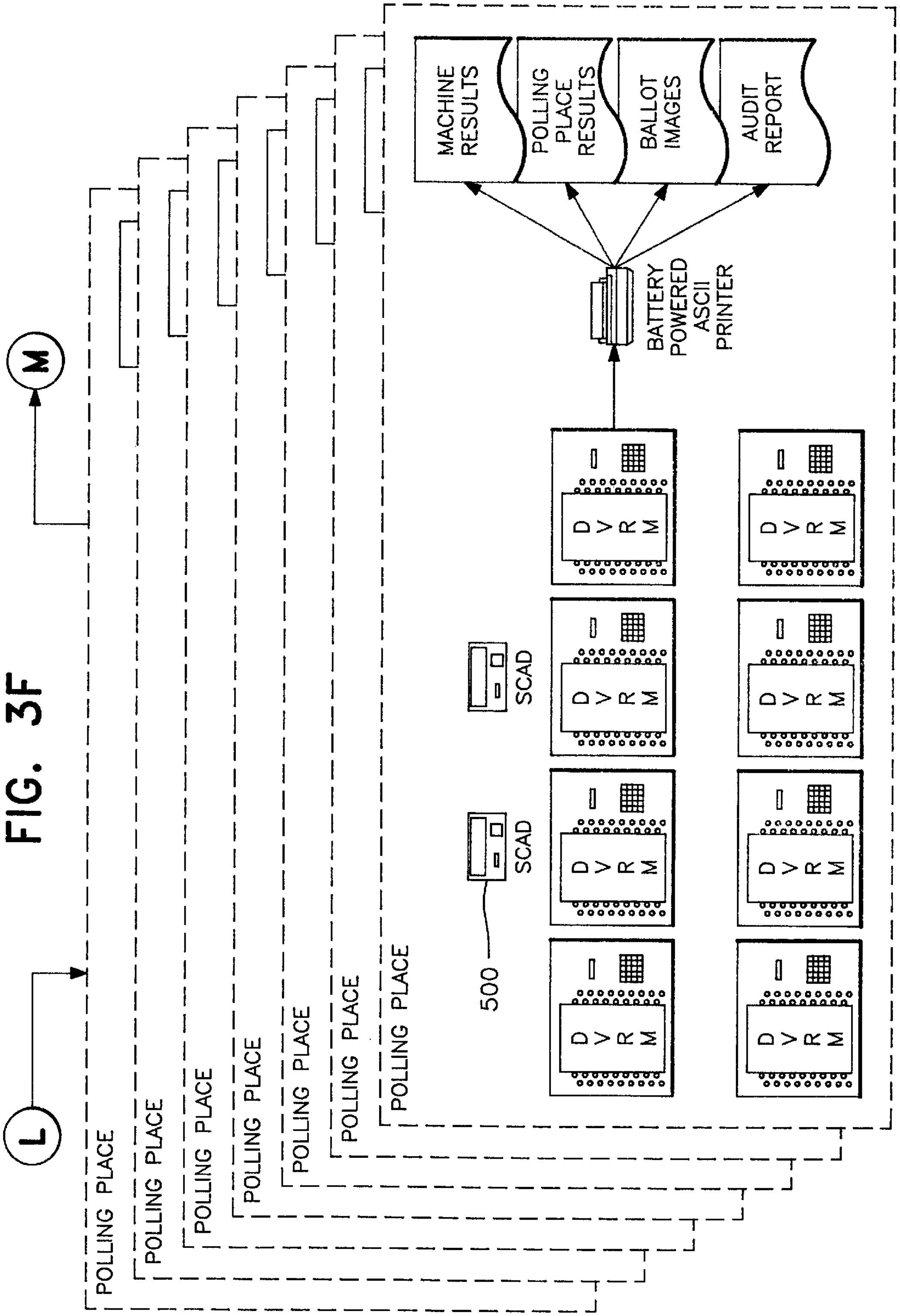
Figure 3G:
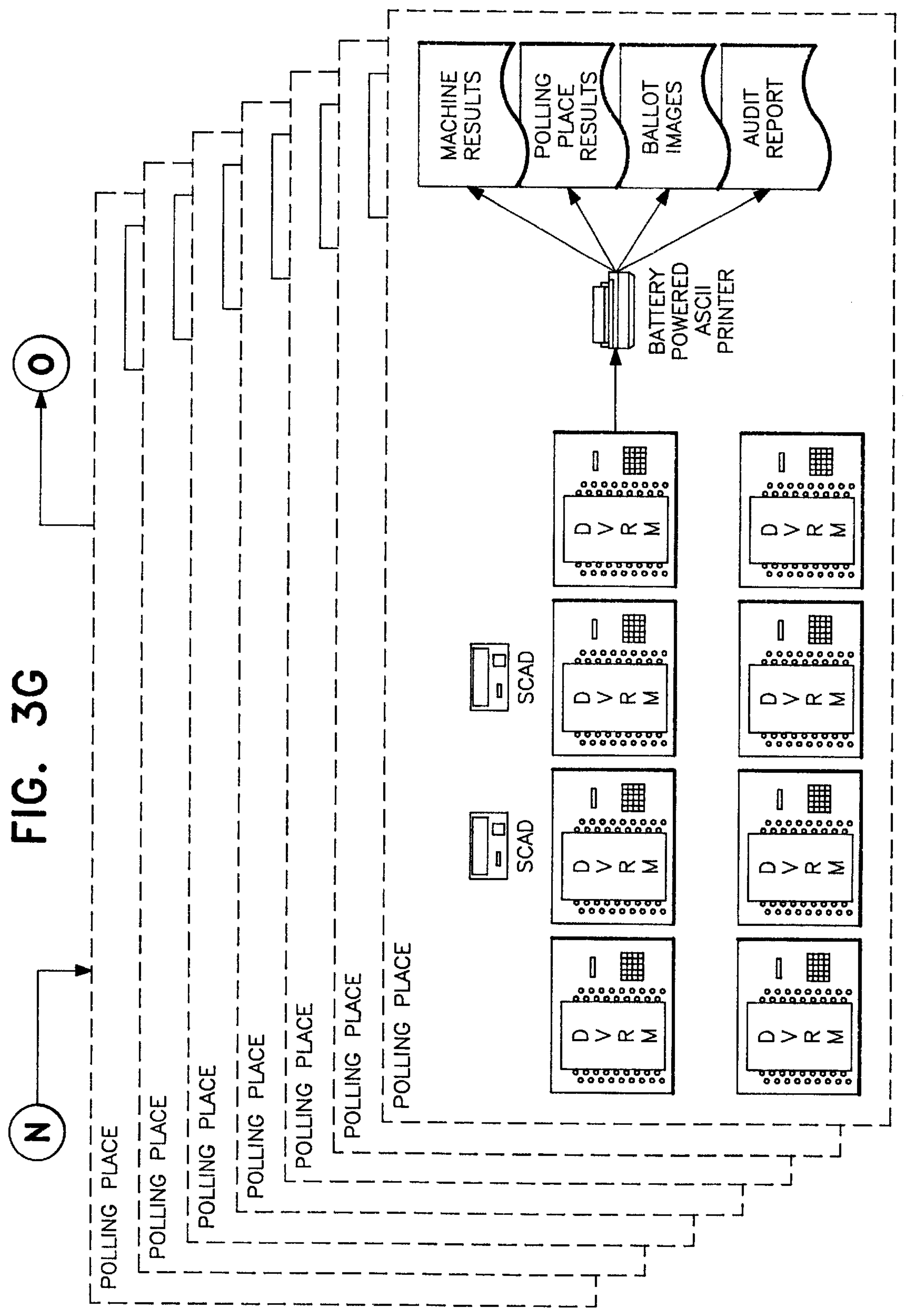
Figure 3H:
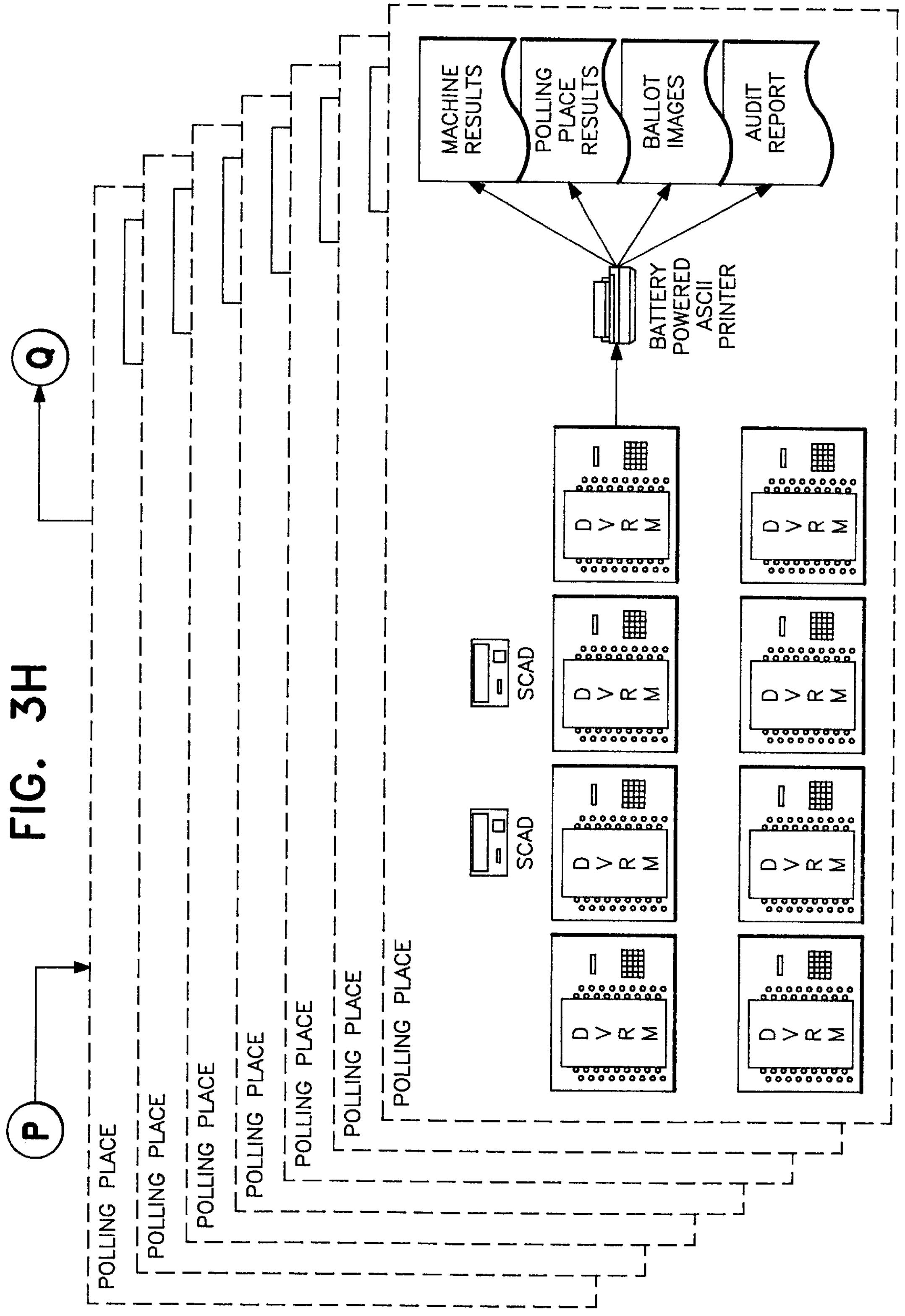

Turning to the drawings, FIGS. 1–3 each show an overview of the Direct Vote Recording System (DVRS) 10 in accordance with the preferred embodiment of the invention. As best shown in FIG. 1, the DVRS system 10 has three main elements: Personal Computer (PC) 100; Direct Vote Recording Machine (DVRM or "Voting Machine") 300; and, Smart Card Activator Device (SCAD) 500. In addition, the DVRS system 10 uses PCMCIA Ballot/Tally Data Carrier devices ("Data Carrier") 800 and smart cards 700. Smart card 700 can be programmed to be either a Voter Smart Card 710 or a Polling Officer smart card 720.

PC 100 is used to configure the DVRM 300 and SCAD 500 in accordance with requirements and conditions of a particular election. The PC 100 uses object-oriented software, which is referred to as the Election Management System (EMS). EMS preferably runs in WINDOWS operating system to provide management and administration functions. The DVRM 300 is used to interface with voters to cast their votes. The DVRM 300 incorporates security features, yet is sufficiently flexible in order to support a broad spectrum of voting practices worldwide.

The SCAD 500 provides all the control functions needed by a Polling Officer at a Polling Place. The SCAD 500 is used to program a Voter's smart card 710 in accordance with voting options appropriate to the particular voter. A Polling Officer smart card 720 is used by the Polling Officer in order to access certain functions of the DVRM 300 and SCAD 500 not available to the voter. The smart cards 700 are password protected.

The Carrier Devices 800 are used to receive information and data, including configuration data, from PC 100 and transfer the information to DVRMs 300 and SCADs 500. The Data Carrier devices 800 also are used to transfer encrypted election results from the DVRMs 300 to PC 100 for vote tallying and result reporting. Further to the preferred embodiment, the carrier devices 800 are PCMCIA cards with a minimum of 4 MB of memory or other memory devices with adapters that can be connected to PCMCIA card I/O slots.

The DVRS system 10 is designed for easy scaling from small to large elections. The DVRS system 10 is shown in FIG. 1 configured for a small election. The DVRS system 10 can support very small elections, such as for a small township, or special purpose elections, such as for a union. Usually, these small elections occur at a single Polling Place. Accordingly, the controlling PC 100 may be located in the same room as one or more DVRMs 300 and one or more SCADs.

In FIG. 2, the DVRS system 10 is configured for a typical jurisdiction election which involves multiple Polling Places. The controlling PC 100 may be located at one of the Polling Places, or at a centralized location. A central PC can directly support and report on an unlimited number of Polling Places, each havina dozens of Voting Machines. If early voting is allowed, each early-voting DVRM can be loaded with all of the ballots for the jurisdiction.

FIG. 3 shows the DVRS system 10 as preferably configured for a large election. Several PCs 100 are used in order to distribute work and save time. PCs 100 may be located at a jurisdiction master facility that coordinates operation at each Polling Place through one or more local Election Definition Facilities. These local facilities allow the sharing of work required to define an election. Each local facility receives common election data from the master facility, and may then add local races and define ballots for all assigned precincts. Data Carriers for the Polling Places are created at the local facilities. DVRS 10 may also export/import data to permit a state center to define statewide races and rules for all jurisdictions.

Other optional facilities that assist in distributing responsibilities include, for instance, State Coordination Center, Jurisdiction Master Facility, Local Election Definition Facility, Polling Place and Vote Tallying Facilities. Facilities may be co-located sharing a single PC or at different locations, each with its own PC 100. These specialized facilities may be used to streamline certain operations for the DVRS system 10. For instance, the vote tallying facilities improve tallying in a large jurisdiction. A single separate facility may be organized to handle high traffic volume and multiple vote tallying facilities may be provided to share the workload and report their results either directly to the master facility or to a higher-level tallying facility.

The State Coordination center is an optional facility which supports jurisdictions by providing common definitions for all statewide races. A state coordination center reduces the data entry effort at the jurisdiction level and ensures the consistent presentation of statewide races. When used, this facility preferably operates the access control, reference maintenance, election definition and data export subsystems.

Jurisdiction Master Facility is the main election preparation and management facility for a county, city, or consortium using a DVRS. Preferably, only one such facility may exist per jurisdiction for a particular election. The access control subsystem will ensure that all other facilities are linked to one common center. This facility preferably operates all subsystems except for the voter control and direct vote entry subsystems.

The Local Election Definition Facility is an optional facility which can be used in populous or geographically dispersed jurisdictions to reduce the ballot definition workload at the master facility. When used, this facility receives partially completed election definitions from the master facility similar to the way the master facility would receive such data from a state facility. Officials and clerks at the Local Definition Facility then complete the election definition by adding local races, organizing ballots for each precinct, and defining precincts and Polling Places.

The Polling Place is the facility which serves to support voting activities on election day. The SCAD at this facility operates the Voter Control subsystem. Multiple DVRMs operating the Direct Vote Entry subsystem are also at this facility. A PC operating the tally import and reporting subsystem may optionally be used at this facility.

The Vote Tallying Facility is the facility that counts votes and reports results. Every jurisdiction must have at least one tallying facility. If more than one tally facility is created, one will be the final tally site and the others will be intermediate sites responsible for feeding consolidated data to the final site. Each tally facility level can print summary reports of the votes it has collected. The highest level of authority can duplicate all reports down to, and including, those of the individual Voting Machines. This feature allows for absolute certification that election data has not been changed through the reporting process. In geographically dispersed jurisdictions, multiple sites speed up the vote counting process by reducing the travel time between Polling Places and the tally facility. In populous jurisdictions, multiple sites expedite vote counting by reducing the workload at a single tally facility. The vote tallying facility operates the tally import and reporting subsystem only.

General DVRS Operation

Figure 4:
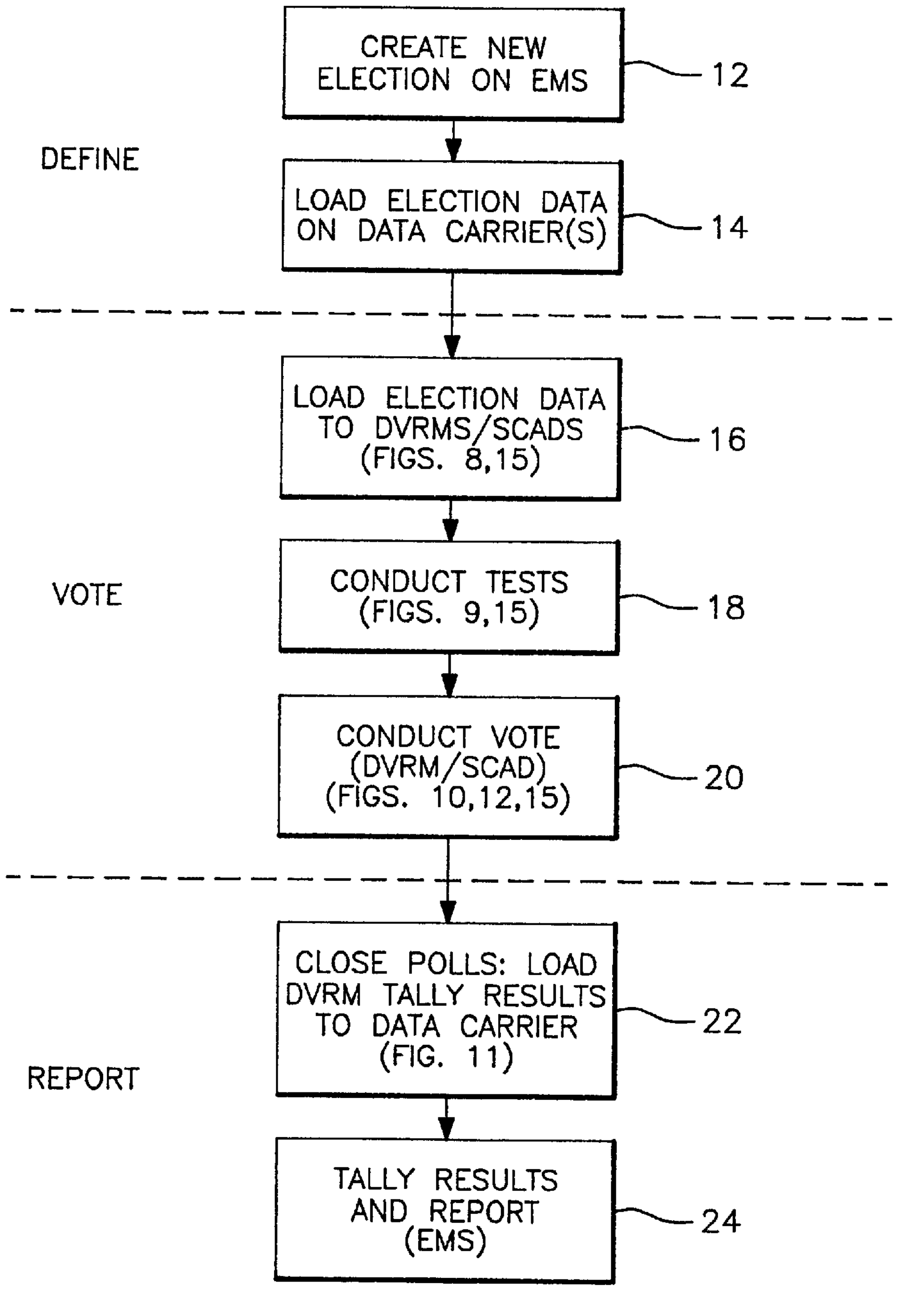
FIG. 4 is a flow chart of the overall operation of the DVRS.

As shown in FIG. 4, the DVRS system preferably follows a three-stage approach: Define, Vote and Report. Each stage must be completed before the next stage can begin. The Define stage is implemented at PC 100 to prepare ballots and define the election structure. At the define stage, election data, races, candidates, ballots, ballot format and reporting rules are established, reviewed and approved. The define stage preferably takes place in the jurisdiction master facility on a single PC 100.

During the Define stage, a System Administrator creates a new election database on the EMS, step 12. Once the database exists, the administrator may then concurrently enter contests, define ballots, define ballot appearance, edit and correct ballots and export Polling Place data. Entering a contest includes setting races and candidates, issues and options, and straight-party tickets. These tasks can be performed in one session or spread over several days. For instance, races can be entered first and candidates added later.

After the races, issues and recalls have been entered, the ballots needed for each precinct are defined by entering the ballot's title or number and identifying its contents. In order to define ballot appearance, display text, fonts and graphics can be set at any time after the items they describe have been entered. Race, issue and recall headers allow an unlimited amount of text. Candidate entries can be formatted to include party icons. Custom cover pages can be defined for each ballot. Page banners, voting instructions, and formatting rules can be defined for related groups of races, issues or recalls. At any time during the define stage, reports may be printed showing the contents of the election database. Once ballot appearance has been defined, sample ballots can be printed to review, correct and approve the ballot layouts.

At step 14, the ballots have been finally approved, and data is exported to one or more Data Carriers 800. Further to the preferred embodiment, a unique Data Carrier 800 is created for each Polling Place. Polling Officer smart cards 700 are also created at this time. Each smart card is assigned to a Polling Officer and operates as a private key to access Polling Place SCADs 500 and DVRMs 300. These Polling Officer smart cards 720 are valid for one Polling Officer, one Polling Place and a one election.

The Voting stage is supported by the SCAD 500 and DVRM 300, and includes Polling Place preparation, voting and poll closing activities. This stage is centered in the Polling Place. Preparation of the Polling Place begins weeks or months before the election (and not necessarily at the Polling Places). By this time, the Data Carrier(s) has been produced at the PC. Also, all Polling Officer smart cards have been encoded and distributed to the appropriate Polling Officers.

During Polling Place preparation, the SCADs 500 and DVRMs 300 are initiated. At step 16, the new election is loaded by inserting the Data Carrier device 800 into each SCAD 500 and DVRM 300. A Polling Place Password is created at the first DVRM loaded, and transferred back to the carrier. Subsequent SCADs and DVRMs are loaded with the new election data that now includes the Polling Place Password created and written to the Carrier by that first DVRM. The user may display images of all ballots and compare with those printed by the EMS to confirm completeness of download. The DVRM is now ready for Test Voting, Practice Voting or Active voting.

At step 18, the Polling Officer may now proceed to put the DVRM into Test mode, insert a Test Voting smart card and exercise the DVRM as if actual voting were taking place. Even though test mode is a non-recording mode, tally reports may be printed. Test Voting and Practice Voting will only be allowed on a DVRM before the polls have been opened. However, a dedicated DVRM may be placed into Practice mode for practice voting with a Practice smart card during Active Voting. Results are not retained in this mode. Once a DVRM is used for Active Voting, it cannot be used for Test or Practice Voting.

Upon completion of Test and/or Practice Voting, the DVRMs 300 may be placed in voting service. Part of this activity is setting the clock on all DVRMs. Since activities such as Test voting become part of that election's Audit Log, the clock must be accurate in order to provide a useful time stamp on the audit entry.

The SCAD must also be prepared for voting. A Polling Officer smart card is inserted and the Polling Officer password is entered. Following a successful self-test, the election and Polling Place are displayed. The Data Carrier is inserted and the new election (which has been updated by the first DVRM) is loaded to the SCAD, step 16. Since the SCAD uses only Ballot Titles from the data, SCAD data is not encrypted. Upon successful completion of the download, the Polling Officer menu is displayed and any additional tests may be conducted. The election, Polling Place and titles of all the ballots downloaded are displayed as an indication that the download is complete. At this time testers can use the SCAD to issue Voter Active, Practice and Test smart cards, step 18. The viability of a smart card can be determined by inserting it into a working SCAD, which will display a "Valid Card" message.

Following the initial preparation of the DVRMs and the SCAD, the Polling Officer powers up the SCAD and DVRMs by inserting his/her Polling Officer smart card. The SCAD just needs to be powered up since to a SCAD, polls are always open. At the proper time, the Polling Officer selects the Polls open option from the DVRM Polling Officer New Election menu. When this is complete, that DVRM is live and ready for active voting.

Once the DVRMs 500 and SCADs are in voting service, voting may commence, step 20. Polling Officers identify voters upon their arrival and determine their appropriate ballots. For example, the candidates and issues voted on by a particular voter may vary depending upon the district in which the voter resides. The Polling Officer then uses the SCAD 500 to program a Voter Smart Card 700 for the proper ballot. The Polling Officer may also select language or special display modes to accommodate voter needs or disabilities.

The voter takes the programmed smart card 700 to an open DVRM 300 and inserts the smart card 700 into the DVRM. Upon insertion of the smart card 700, the DVRM 300 powers up, performs a self-test, and automatically displays the first page of the ballot. The voter may now begin voting. The DVRM 300 automatically prevents overvoting. When the last page of the ballot has been displayed, a CAST BALLOT button is enabled. Once this button is pressed, all of the voter's votes will be added to the proper tally counters. In addition, a logical image of the ballot will be saved and the smart card 700 is automatically erased to prevent unauthorized reuse.

At the end of the election day, Polling Officers use their smart cards 700 to close the DVRMs 300, step 22. All vote tallies are then uploaded to a Data Carrier device 800, preferably the same Data Carrier used to download the elections to the DVRMs and SCAD. The same Data Carrier is also used to download Audit data from all DVRMs.

Optionally, archive data may also be downloaded at this time to an Archive Data Carrier, or at a later time. However, it must be done before the DVRM will permit the loading of another election, regardless of whether the 6 month or Safe Periods have expired. The Safe Period is defined by the System Administrator as a period of time following the Polls Closed before which no new election will be accepted and no DVRM data can be erased. During this time, however, the DVRMs are still accessible for reports and data verification. In an alternative embodiment, the DVRM may be used before the end of the 6 month period or user-defined safe period, if all data has been downloaded from the DVRM.

Once closed, the DVRM 300 cannot be placed back in service for the same election. The Polling Officer may print a summary report from each DVRM 300, but only after the DVRM has been closed to voting. This report will show, by ballot type, all votes including write-ins cast on that machine. Once all DVRMs in a Polling Place have been uploaded to the Data Carrier 700, any DVRM 300 can print a summary report of all votes cast at the Polling Place. A printer may be connected to each DVRM to print local reports of results or the images of all ballots cast in that machine. The images are produced in random order so that the votes of any individual cannot be identified.

Finally, the batteries are removed and the units are locked and returned to storage. Since the DVRM clock has its own on-board power supply, the DVRM will still be able to validate elapsed time before allowing another election to be loaded. Comparably, the data is stored in non-volatile flash memory which does not need a power supply to retain data integrity.

The Report stage is supported by PC 100 to collect votes and report results, step 24. During this stage, which takes place in the jurisdiction's Vote Tallying Facility, all Polling Place tallies collected from DVRMs 300 via Data Carriers 700 are loaded onto the PC 100. At any time during the vote tallying process, an election official can interrupt the tallying process to generate interim reports or to export results to other systems. Once all votes, including those from other systems and paper ballots, are entered, final reports can be produced. The DVRS 10 provides several standard report formats that should meet the needs of most jurisdictions, in addition to an ad-hoc reporting facility that can be used to create custom reports. Reports can be exported to other systems or posted on the Internet. The Archive data and/or Audit data can also be loaded into the PC and printed in a report in case the election is challenged.

At a minimum, vote tally data includes: the number of ballots cast, by each ballot configuration/type, candidate; vote totals for each contest; the number of ballots read within each precinct, by type, including totals for each party in primary elections, and separate accumulation of undervotes for each race or issue.

After the election, a System Administrator can use the central PC 100 to print any and all of the audit logs from all DVRS systems 10, including the DVRMs and SCADS. If the operation of a DVRM 300 is questioned, the DVRM 300 itself can print a copy of its audit log along with images of all ballots cast, including all votes and write-ins cast on that DVRM 300. The DVRM keeps an audit log of all Polling Officer actions from the time a new election is loaded. This audit log will also record any improper use of Voter Smart Cards and any hardware or software problems.

In the normal course of events, Ballot Definition would be completed and that new election data used to test out the SCADs and DVRMs far in advance of election day. However, units may also be tested before there is sufficient ballot data. Using the EMS, the user may create a fictitious election that is reusable. This fictitious election would have its own Data Carrier and Polling Officer smart card(s) that would be used to produce its own Test, Practice, and Active Voter Smart Cards to form a "Test Election Kit". The fictitious election could even have a fictitious date, so long as the DVRM clock is adjusted (the SCAD does not need this). Then the DVRS can not only Test vote and Practice vote, but can also Open Polls and exercise fully functional active voting. When the real election data is loaded, the clocks should be reset. A ballot of the Fictitious Election can also be used as a ballot for Practice voting on election day.

The flexibility designed into the DVRS allows support of a variety of primary election structures. Primaries can be established as completely separate elections, as a single election with ballots coded by party, or as an open primary election. At the Polling Place,, voters can be given smart cards programmed for the party of their choice, or the voter may be allowed to select a party at the DVRM. For an open primary, no party designation is needed. Nonpartisan contests can be defined for a primary and included on the ballots of all parties. It is also possible to define nonpartisan ballots with only nonpartisan contests.

Early voting is also accommodated by the DVRS 10. Each DVRM 300 can store hundreds of ballots and weeks of tally data. In an early voting situation, the Polling Officer can use his/her smart card 700 to temporarily shut down a DVRM 300 each evening so that it can be restarted the next day. No one can examine the data contained in a DVRM 300 until the end of the election has passed.

DVRS Functional Subsystems

The DVRS system 10 includes the following subsystems: (1) Access Control, (2) System Administration, (3) Reference Maintenance, (4) Election Definition, (5) Ballot Formatting, (6) Data Export, (7) Voter Control, (8) Direct Vote Entry, and (9) Tally and Reporting. These subsystems are defined for the purpose of organizing system functions from a conceptual perspective. The subsystems need not be implementation units. All of these DVRS subsystems operate on PCs 100, with the exception of Voter Control and Direct Vote Entry, which operates on the SCAD and DVRM, respectively.

The Access Control subsystem protects all PC 100 resident software against unauthorized use and allows users to change their passwords. This subsystem runs on all PCs 100 and maintains a database of authorized users along with their IDs, passwords, and access authority.

The System Administration subsystem maintains user and DVRM 300 rosters for the system independent of all elections. This subsystem also supports emergency access to Voting Machines and provides audit log output capabilities. This subsystem is run on PC 100 by the EMS, though its functionality may be limited on PCs 100 outside the jurisdiction master facility. Only users with System Administrator authority may use this subsystem.

The Reference Maintenance subsystem maintains reference and control data needed for the correct handling of elections. This subsystem runs on the master PC 100 only to maintain all reference data that is not managed by the System Administration subsystem. Only users with reference maintenance authority may use this subsystem. User-selectable functions include: controlling system parameters and conditions; maintain reporting structures, precinct data, Polling Place data; maintain political parties, format rules; and, print system data, system conditions, reporting structures, precinct and Polling Place data, political parties and format rules.

The Election Definition subsystem runs on all Pcs 100 and is responsible for defining elections. The Election Definition subsystem maintains election and ballot contents, including races and candidates, and the order in which they will appear on ballots. It maintains all nondisplay data about an election. This subsystem also provides text reports for quality assurance purposes. Its capabilities at any facility will depend on whether any election data created by a higher-level facility has been locked by that facility. Only users with election definition authority may use this system. User-selectable functions include: modifying election data, define contests and ballots, define party selection and DVRM placement, and print election data.

The Ballot Formatting subsystem supports the maintenance of material that will be displayed on Voting Machine screens. Sample ballot outputs are provided for quality assurance purposes. The Ballot Formatting subsystem runs on all PCs 100 responsible for defining elections. It maintains all ballot display data about an election. Its capabilities at any facility will depend on whether any election data created by a higher-level facility has been locked by that facility. Only users with election definition authority may use this subsystem.

The Data Export subsystem supports the export and import of data between components of the DVRS 10. This subsystem runs on all PCs 100 responsible for defining elections and only users with data export authority may use this subsystem. User-selectable functions of this subsystem include: export all data needed to prepare all or a single Polling Place, export election definition, export election to diskette and recover and erase Data Carriers.

The Voter Control subsystem supports the programming of Voter Smart Cards 700 to enable each voter to vote on the correct ballot at the Voting Machine 300 without Polling Officer intervention. This subsystem operates on the SCAD 500 and only users with Polling Officer authority may use this subsystem.

The Direct Vote Entry subsystem supports the voting activities of individual voters and exports vote counts for use by other DVRS 10 components. This subsystem operates on the DVRM 300.

The Tally and Reporting subsystem supports the summarization and reporting of election results, and also supports the import of tallies from other systems and from manual data entry. This subsystem runs on each PC 100 EMS responsible for tallying votes or printing election results. Only users with system administration, DVRM import, other import, manual vote entry, corrections input, and reporting authority may use this subsystem. These users may Import DVRM Data, Import Other Data, Print or Export Data.

Import DVRM Data reads Data Carrier as they are inserted and issues a warning if data from the same DVRM is inserted more than once. In such a situation, the second input will be rejected. Warnings are also issued if data is received from a DVRM whose serial number is not in the database, or a Data Carrier contains suspect data because it was created with the emergency procedure. All such warnings are entered in the audit log. Data with warnings will be accepted or rejected based on user input.

Import Other Data imports precinct tallies from other systems. This may, however, require some manual assistance if the source system does not include all of the data needed by the DVRS. Enter Other Counts accepts manual input of vote tallies by precinct and candidate. Enter Corrections allows a specially authorized user to key in corrections to vote counts. It allows a jurisdiction to enter recount information if they wish.

Print Contest Details prints a detailed report of a selected race or issue, or all races and issues in the election. Each show totals by reporting unit, and individual counts by precinct for each candidate and write-in. Percentages are calculated at the reporting unit level only. Print Race Summary prints a report of all races and issues in the election. This report does not show precinct level tallies. Print Machine Usage prints a report by Polling Place of the DVRMs in each Polling Place and the number of voters (public count) who used each machine. For each Polling Place, the precincts supported will also be listed in this report to support early voting where one Polling Place may support multiple precincts. Print Source Details prints the Vote Tally Report that is normally printed by a DVRM. This is provided as an audit capability to confirm tally inputs. The user must specify the data source as either a single DVRM or a single manual input action.

Export Summary Data System exports contest totals on a precinct-by-precinct basis to a standard file format. Export Detailed Data exports tally counts on a DVRM-by-DVRM basis to a standard file format. Export Consolidated Tallies exports all received data in a format that can be easily loaded into a higher-level Tally Import and Reporting subsystem.

Direct Vote Recording Machine (DVRM) 300

Figure 5:
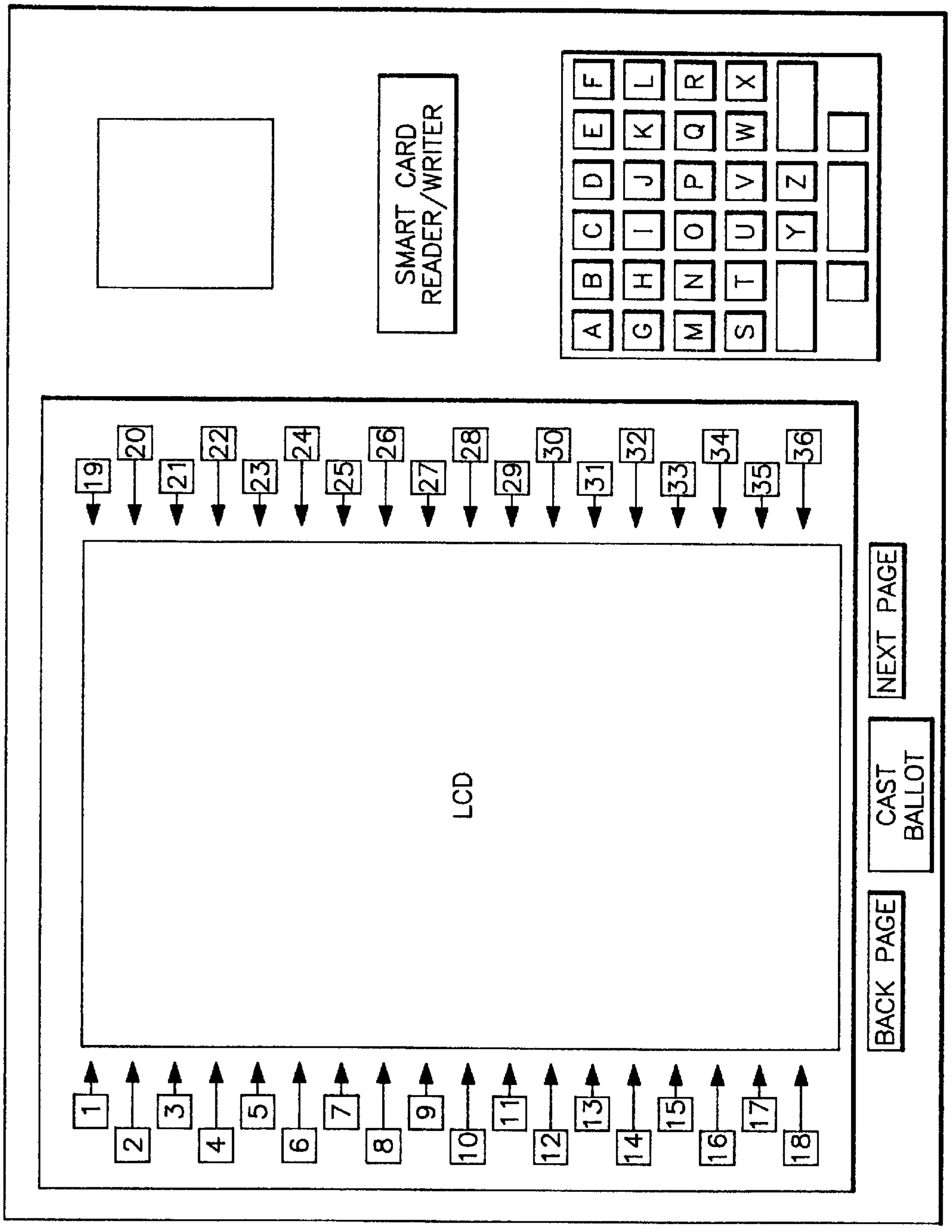
FIG. 5 is a schematic of the DVRM front panel.

The DVRM is the primary means of entering and recording votes. It is used by Polling Officers to prepare for and manage operations of the Polling Place, and by voters for practice voting and actual casting of ballots. FIG. 5 shows the front panel of the DVRM 300. The front panel contains the following: a high-contrast liquid crystal display (LCD); pushbutton switches to advance the LCD by one page, NEXT PAGE, or return to a preceding page, BACK PAGE; a custom-designed array of pushbutton voting buttons arranged in two columns of 18 buttons, one column on each side of the LCD; a speaker; a smart card access slot; a custom keypad consisting of keys A through Z, BACK SPACE, SPACE, . (period), ENTER WRITE-IN, and - (hyphen); and a CAST BALLOT pushbutton switch with software-controlled backlight.

With two exceptions (Backspace and Enter), the button and key groups are mutually exclusive. When one group is active the other is disabled. Normally the buttons are active. When a write-in is being entered, the buttons are generally disabled and only the keys are active. However, the using jurisdiction may set a control in the EMS that will allow the buttons to remain active during a write-in. If the contest allows more than one vote, and another write-in has been entered for the same contest, the DVRM 300 will check that the new write-in is not identical to another write-in for the same contest. If the new write-in matches a prior one, a message will be displayed and the button cell will return to its original unvoted state.

Figure 6:
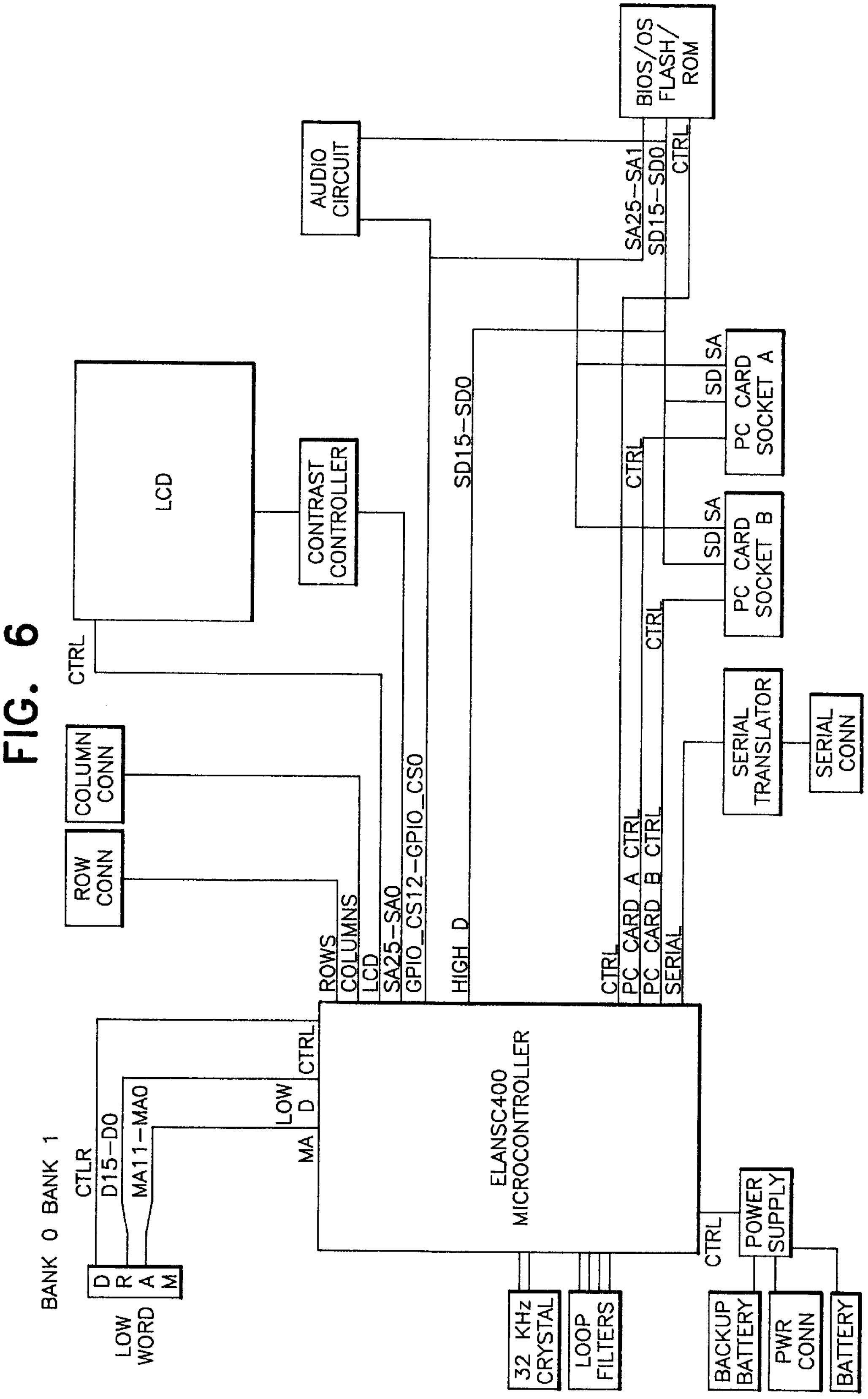
FIG. 6 is a general block diagram of the DVRM.
Figure 7:
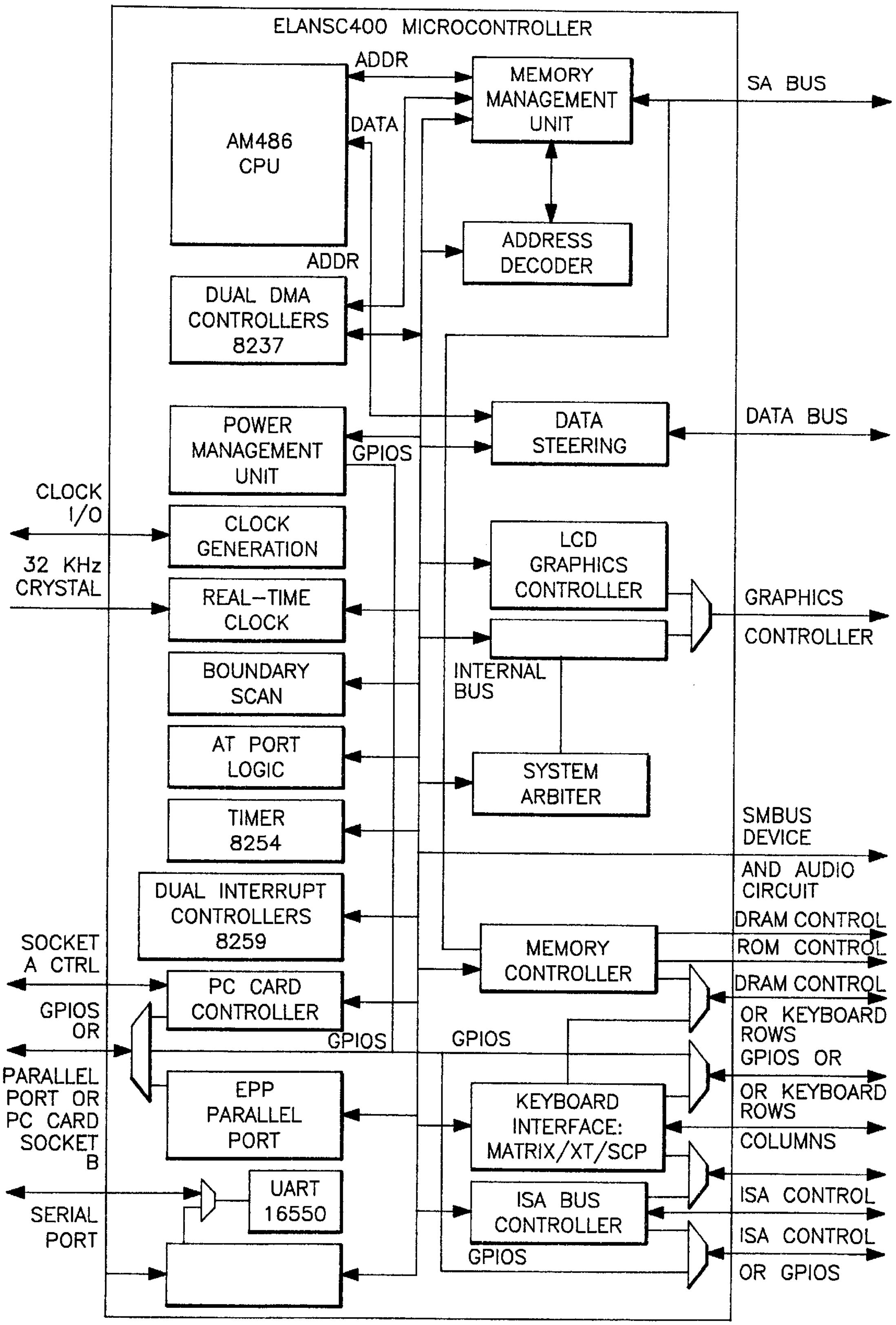
FIG. 7 is a block diagram of the microcontroller for the DVRM of FIG. 6.

As shown in FIGS. 6–7, the DVRM 300 includes a dual PCMCIA card connector for use in importing ballot data and exporting vote tallies and archival data from the Data carriers and operating a PCMCIA modem card. Internally, the DVRM preferably includes 8 Mb of dynamic random-access memory (DRAM), 4 Mb of redundant, removable Flash memory, and a dual power capability using either D-cells or an external power converter. The DVRM is designed around a custom-designed circuit board with an Am486 microprocessor. The DVRM further has a smart card I/O connector, a USB port for external devices, a 6-pin keyboard connector, an RS-232 printer port, an audio output connector, and a reset switch.

Dual redundant flash memory is used to provide absolute assurance that all tally data will be protected for a minimum of 6 months when the DVRM is in storage with batteries removed. The DRAM serves as both working memory and as a RAM disk to minimize wear on the flash memory and to improve performance. Updated tally information will be written to flash after each voter, but reference data and ballot definitions will generally be retained in RAM from one voter to the next.

The DVRM has three states, full-power operation with screen on, low-power sleep with screen off and power off. Inserting a smart card or pressing the CAST BALLOT button while the DVRM is in the sleep state will cause the DVRM to enter the full-power state. Inserting batteries will cause the DVRM to enter the sleep state; removing batteries will cause it to return to the power-off state. Issuing software commands or pressing the reset button will cause the DVRM to go from the full-power to the sleep state.

The DVRM is equipped with a two counters, a Protective Counter and a Public Counter. The Protective Counter is set to zero on manufacture and cannot be reset by the using jurisdiction. It sums the total number of ballots cast on that DVRM during the entire life of that machine. The Public Counter is set to zero prior to the opening of the Polling Place, and records the number of ballots cast during that particular election. Both the Protective Counter and the Public Counter are incremented only by the casting of a ballot.

The DVRM has tamper apparent seals surrounding electronic components and tamper apparent seals around the carrying case to ensure that no one has tampered with the device after ballot definitions have been loaded. In addition, a digitally encoded serial number is built into the main circuit board that can not be changed and which can be read by DVRM software. The DVRM is identified by means of a permanently affixed nameplate or label containing the name of the manufacturer, the name of the device, its part number, its revision letter, and its serial number.

FIG. 6 is a general block diagram of the DVRM. The microcontroller drives a separate audio circuit used to generate aural messages. The microcontroller (shown in further detail in FIG. 7) interfaces with DVRM peripherals by means of various signals and data buses. The microcontroller is compatible with standard PC/AT system logic, including dual programmable interrupt controllers (PICs), dual direct memory access (DMA) controllers, a programmable interval timer (PIT), and a real time clock (RTC). An external 3-volt coin cell keeps the real time clock in the microcontroller powered on when primary power is turned off.

The Memory Management Unit (MMU) controls addressing of the Flash memory and PCMCIA cards by system address bits. The data steering logic controls data transfers to and from the DRAM. The Power Management Unit (PMU) controls operation under various conditions to minimize current drain on the battery power supply. It exercises its control by slowing down certain clocks or stopping clock pulse generation completely while certain hardware elements are not being used. It also reduces power consumption whenever a low battery condition is detected. A concurrent path is maintained among the microcontroller, the Flash memory block, and the LCD. Because of this, data transfers to Flash memory by write operations occur in less than 1 minute. The chips specified have a demonstrated 99.95% probability of error-free data retention for at least 6 months.

The RAM drive remains "live" between voters so that the same data need not be copied from flash for each new voter. However, after an extended period of inactivity, the RAM drive will be shut down and all its data lost. For this reason, the application must save tally data to flash memory after each voter and must test for the presence of required files on the RAM drive before trying to read them.

The data read from the Data Carrier 800 by the DVRM 300 is saved as a collection of zipped files on a virtual drive in flash memory. These files are unzipped and copied into a virtual drive in RAM as needed. All or selected parts of these files are read from the RAM drive into working RAM as needed. This provides reliable long-term data storage in flash memory and minimizes the delays and wear of flash memory accesses.

The DVRM operates in the following sequence for each election: Load New Election (FIG. 8), New Election Menu (FIG. 9), Open Polls Menu (FIG. 10), and Close Polls Menu (FIG. 11). Once the New Election is Loaded, the DVRM reboots and will power up for the New Election Menu. Once the Polling Officer opens the polls from the New Election Menu, the Open Polls Menu is displayed, and the New Election Menu is no longer accessible. During Open Polls, the DVRM will operate in the Open Polls Menu for a Polling Officer smart card, and the Voter Interface (FIG. 12) for a Voter Smart Card. Finally, once the Polling Officer closes the polls from the open Polls Menu, the Close Polls Menu is displayed, and the DVRM can no longer return to either the New Election Menu or Open Polls Menu until a new election is loaded. The numbers in FIGS. 8–11 indicate a position adjacent the corresponding button in FIG. 5.

Figure 8:
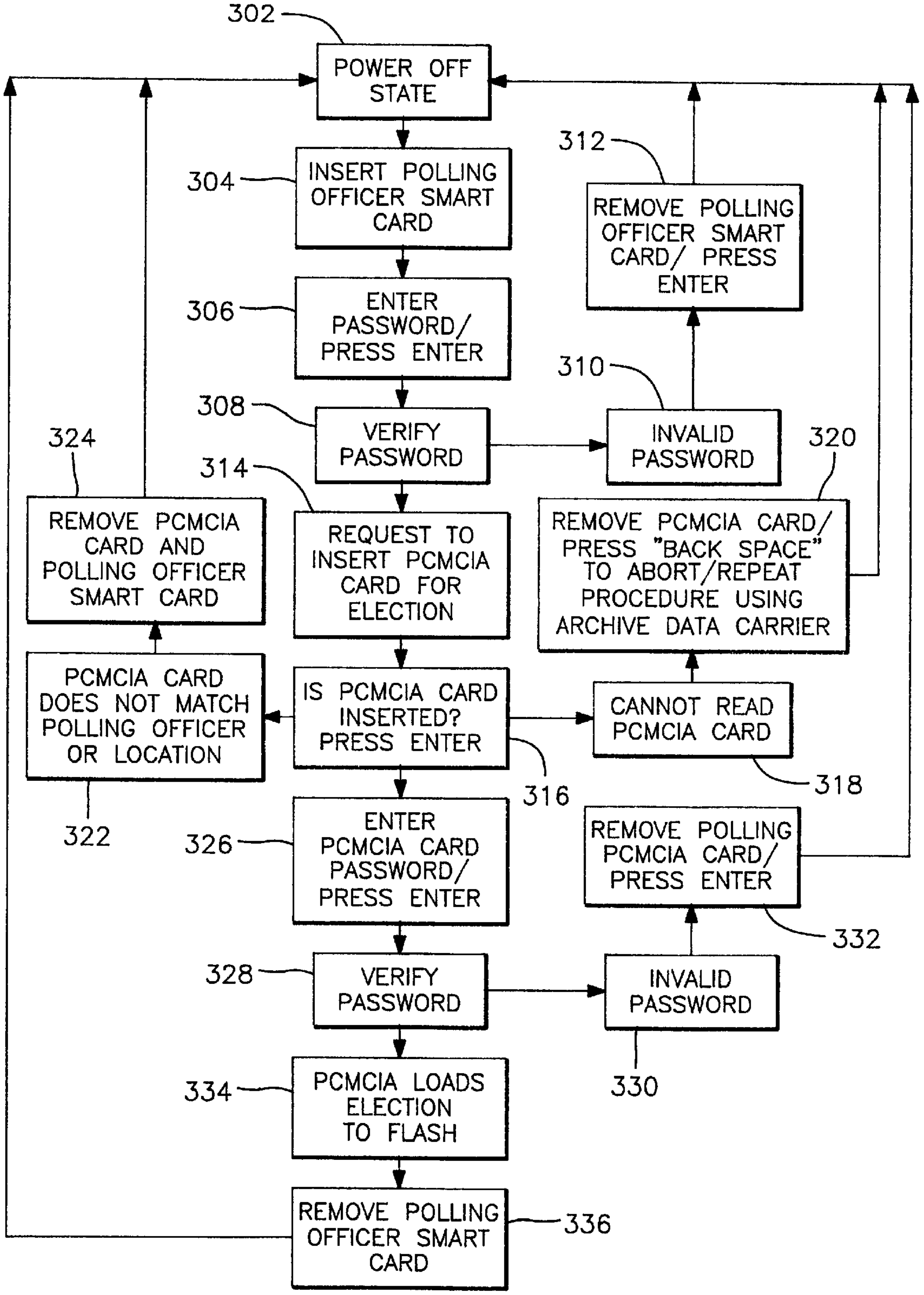
FIG. 8 is a flow diagram of the Polling Officer user interface for loading a new election in the DVRM.

As shown in FIG. 8 (step 16, FIG. 4), a Polling Officer must perform various steps to prepare a DVRM 300 for use. These steps may be performed either at a central location or at the Polling Place. At power down, step 302, the Polling Officer must insert batteries in the DVRM 300. The DVRM will boot up automatically when triggered by the insertion of a smart card, 304. The DVRM 300 executes basic self-tests. If the DVRM 300 passes these self-tests, then it can be used reliably for voting.

The Polling Officer is prompted to enter the Polling Officer's password, step 306. If the password is invalid, 310, the Smart card is removed, 312, and the DVRM powers down, 302. If valid, the DVRM 300 reads election and Polling Place information from the smart card. The Data Carrier 800 is then inserted into the DVRM, step 314, and the DVRM 300 tests the electrical connection to the PCMCIA card, 316. The DVRM 300 compares data read from the Data Carrier and read from the Polling Officer smart card. If these do not match, 322, the DVRM shuts down, 302.

If the data from the Polling Officer smart card and Data Carrier match, the DVRM enters the Data Carrier's password, step 326. This password is created by the EMS and included on the Data Carrier with the encrypted election data. The Polling Officer's password is entered at step 328, every time a Data Carrier is inserted into a DVRM 300. If invalid, 330, the Data Carrier is removed, 332, and the DVRM shuts down. If the Carrier cannot be read, 318, it is removed and an Archive Carrier may be tried. Otherwise, the DVRM powers down, step 302.

If the Polling Officer's password is correct, step 328, the DVRM 300 will load a new copy of its software and all the necessary election definition data, step 334. A decryption key is activated by the validated password. The decryption key is used by the DVRM 300 to decrypt data when downloading it from the Data Carrier. When the download is complete, the Polling Officer is then prompted to remove the Data Carrier (or the last of a group of Data Carriers), step 336. The DVRM 300 will then automatically reboot, step 302, after which it loads software and reference data from flash memory into RAM.

Safeguards prevent the loading of a new election before 6 months have elapsed, unless steps have been taken to save the previous election data. The DVRM also prevents the erasure of voting information before the end of a user-specified safe period.

Once the first DVRM 300 has rebooted, a Polling Officer may insert a back-up Data Carrier 800 into the DVRM 300 and use a special command to copy necessary control information to that carrier. This procedure will allow the Polling Officers to use more than one carrier to prepare the remaining DVRMs 300 and SCADs at the Polling Place.

Except for the Polling Place password, all data written to a Data Carrier for use by a DVRM 300 is encrypted using a key entered by the Polling Officer. The DVRM accepts or rejects a Data Carrier based upon whether or not the Election ID and Polling Place ID on the carrier match those already stored in the DVRM. If the match succeeds and Polls have been closed, access will be permitted only for the purpose of retrieving data or reports of the election still stored in the DVRM. New election data will be accepted only if either the Safe Period or six month period have expired and all data has been downloaded. If the match succeeds and polls are still open, only a Polling Officer or Voter Smart Card will be accepted.

If the match fails, access may still be permitted under the assumption that a new election is to be loaded. In the case of a new DVRM straight from the factory, there is no data to compare with or dates to check, so the match fails. Thus, access by the Data Carrier will be permitted for the sole purpose of loading a new election.

In the case where the DVRM has already been used in an election, and both the six month and Safe Periods have expired for the previous election, the match will again fail but access is permitted to load a new election. If either date is still pending, access will be denied. The DVRM will only permit the loading of a new election after the expiration of the Safe Period and before six months if all data have been collected. After six months, the DVRM will permit loading of a new election after six months have expired as long as the voting tallies have been downloaded.

Figure 9A:
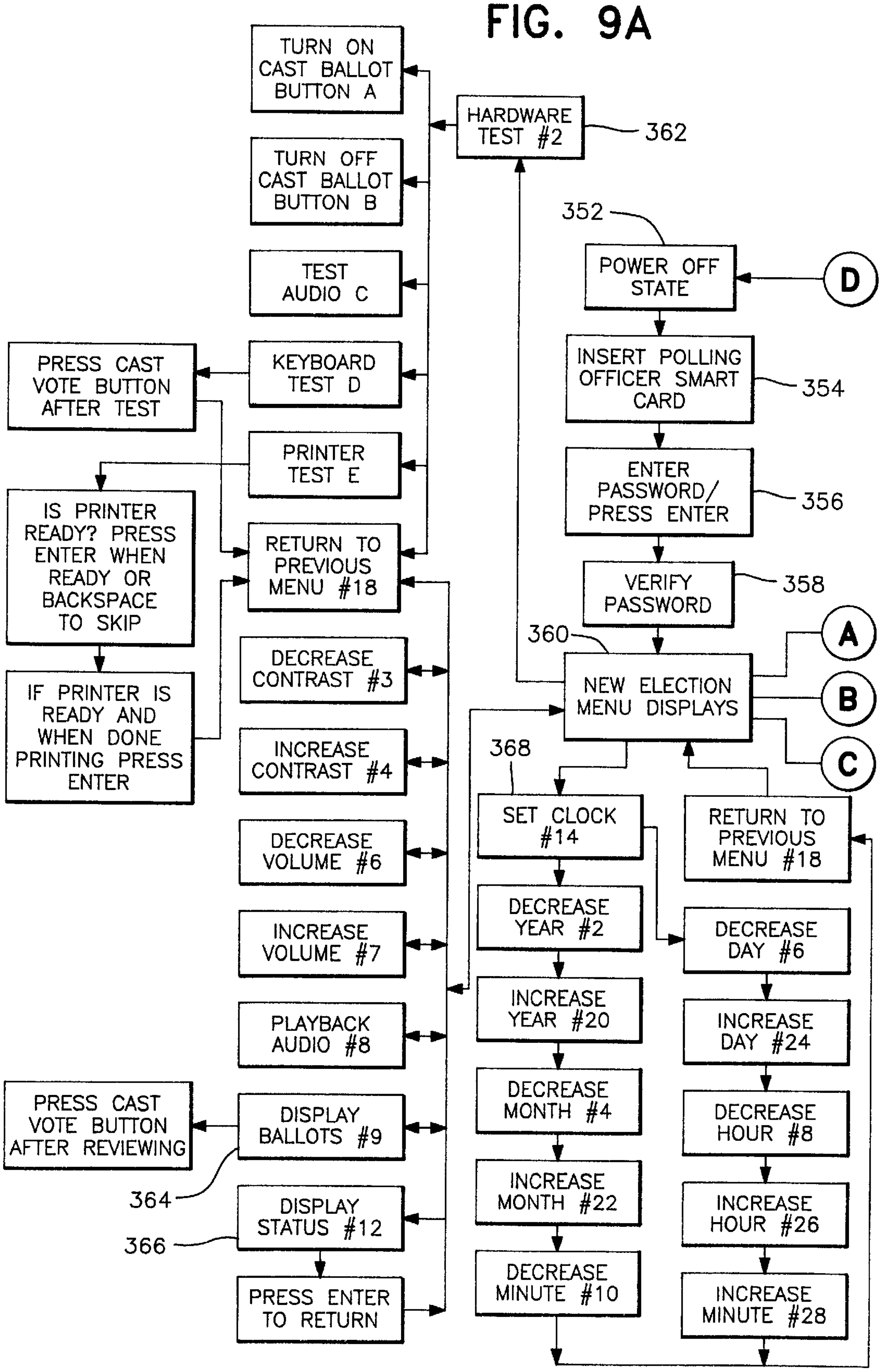
FIG. 9 is a flow diagram for the DVRM New Election Menu.
Figure 9B:
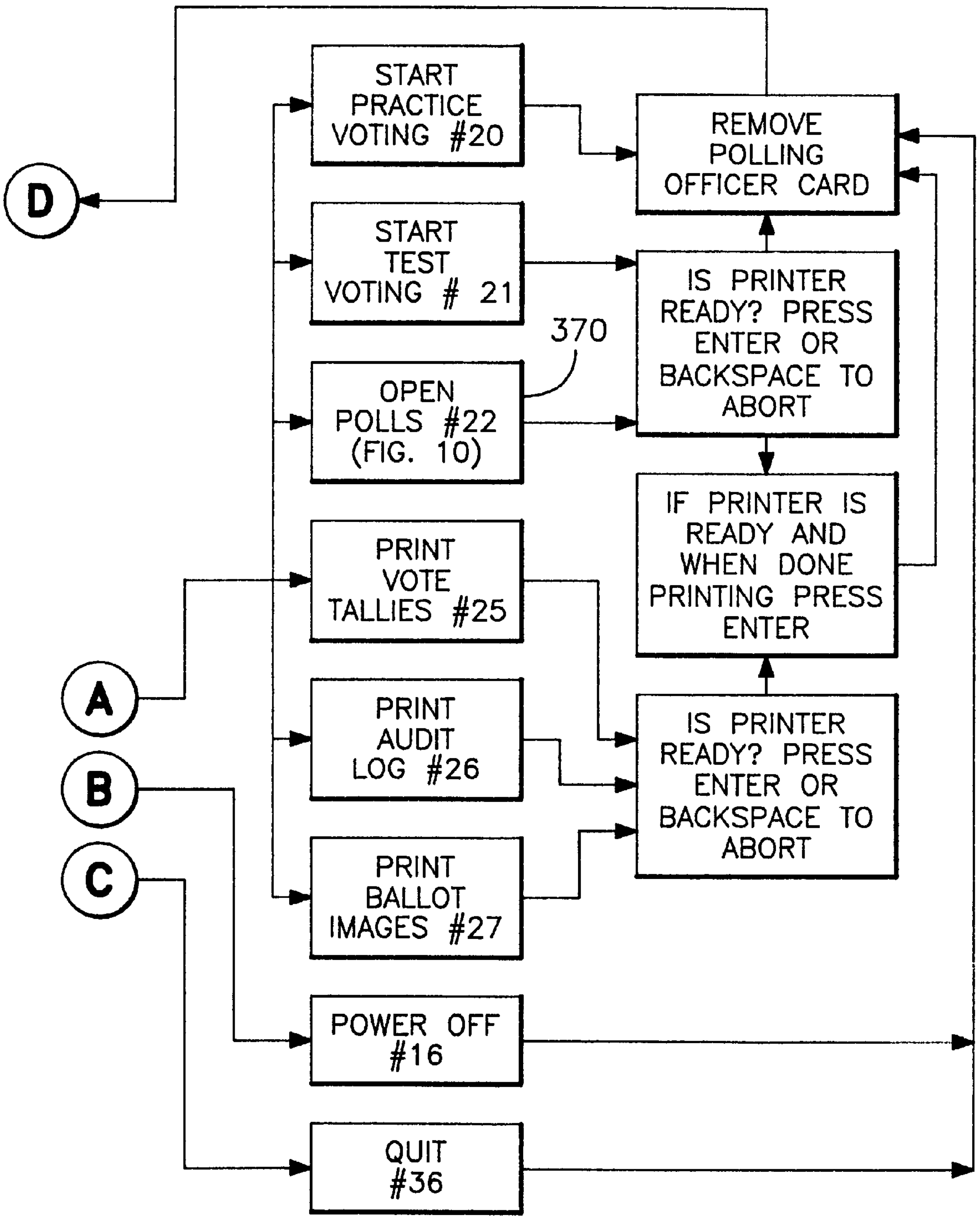

Turning to FIG. 9, the DVRM has loaded a new election (FIG. 8) and has rebooted, 352. It is now available for voting or for use by the Polling Officer, steps 18, 20, (FIG. 4). Upon insertion of a Polling Officer smart card, step 354, the DVRM requests that the Polling Officer enter the correct password, 356. The password entered is compared with an encrypted stored password, 358. The DVRM accepts or rejects a Polling Officer smart card based upon whether or not the Election ID and Polling Place ID on the smart card, and Polling Officer Password entered, match that already stored in the DVRM. If the Polling Officer removes the smart card at any time, the DVRM 300 will display a message. To continue operation the Polling Officer must reinsert the smart card and press ENTER. Otherwise, the DVRM 300 shuts down.

New Election, step 360, is the initial state of a DVRM 300 after a new election has been loaded. The audit log is clear. This menu allows the Polling Officer to perform any or all of the following activities as they may desire or as required by local procedures. The Polling Officer may adjust the internal clock 368, adjust LCD contrast, adjust audio volume or play a sample audio message. In addition, the Polling Officer may execute a variety of cooperative hardware tests, step 362, or place the DVRM 300 in test voting mode.

The Perform cooperative Tests task, step 362, presents the Polling Officer with a menu of DVRM hardware tests which generally require some assistance from the Polling Officer. This function may include tests for buttons, the smart card reader, and the printer, in addition to those shown.

The Polling Officer may also Display Ballots, step 364. Here, the DVRM displays every ballot screen one at a time in the order printed by the ballot definition PC. This allows the Polling Officer to certify that all ballots are properly loaded. The Polling Officer may also Set Audio Message, which activates the default "Thank you for voting" message when the user presses the Cast Ballot button.

Display Status, step 366, displays the DVRM's current status including its serial number, the current election and Polling Place, the current Public and Protective counter values, and the current date and time from the DVRM clock. In addition, the DVRM may display the Protective counter value when the current election was loaded and the Protective counter value when the DVRM 300 was first placed in voting service.

Start Test Voting allows a Polling Officer to test the voting functions and ballot definition data in the DVRM by entering test votes. The Test Voting state can be entered only from the New Election state as a result of a Polling Officer's command. This is the only state that will accept a test vote smart card. While in the test voting state, the DVRM will function in exactly the same way as in normal voting mode. When the test voting mode is exited, the vote tally report will be printed and all test votes will be erased. This mode can only be entered before the DVRM is placed into actual voting service. Insertion of a Polling Officer smart card will return the DVRM 300 to the New Election state.

Start Practice Voting places the DVRM in practice-voting mode. The Practice Voting state can be entered by Polling Officer action only from the New Election state. In this state, voters may use the DVRM in the same manner that they may use a live machine. Only a specially coded practice smart card is accepted. The practice smart card is not erased after each use, and it may be used by many voters. A special practice ballot is displayed. In practice mode, votes are not tallied, ballot images are not saved, and the voting screen clearly indicates that the machine is in practice mode. Insertion of a Polling Officer smart card will return the DVRM 300 to the New Election state.

Open polls, step 370, places a DVRM in an active voting state. However, this cannot be done prior to the polls open time that is part of the election definition data. In addition, once a DVRM enters Open Polls 370, the New Election Menu can no longer be accessed, so that the DVRM cannot be used for Test or Practice Voting, the clock cannot be reset, 368, and unauthorized printing cannot be conducted.

Figure 10A:
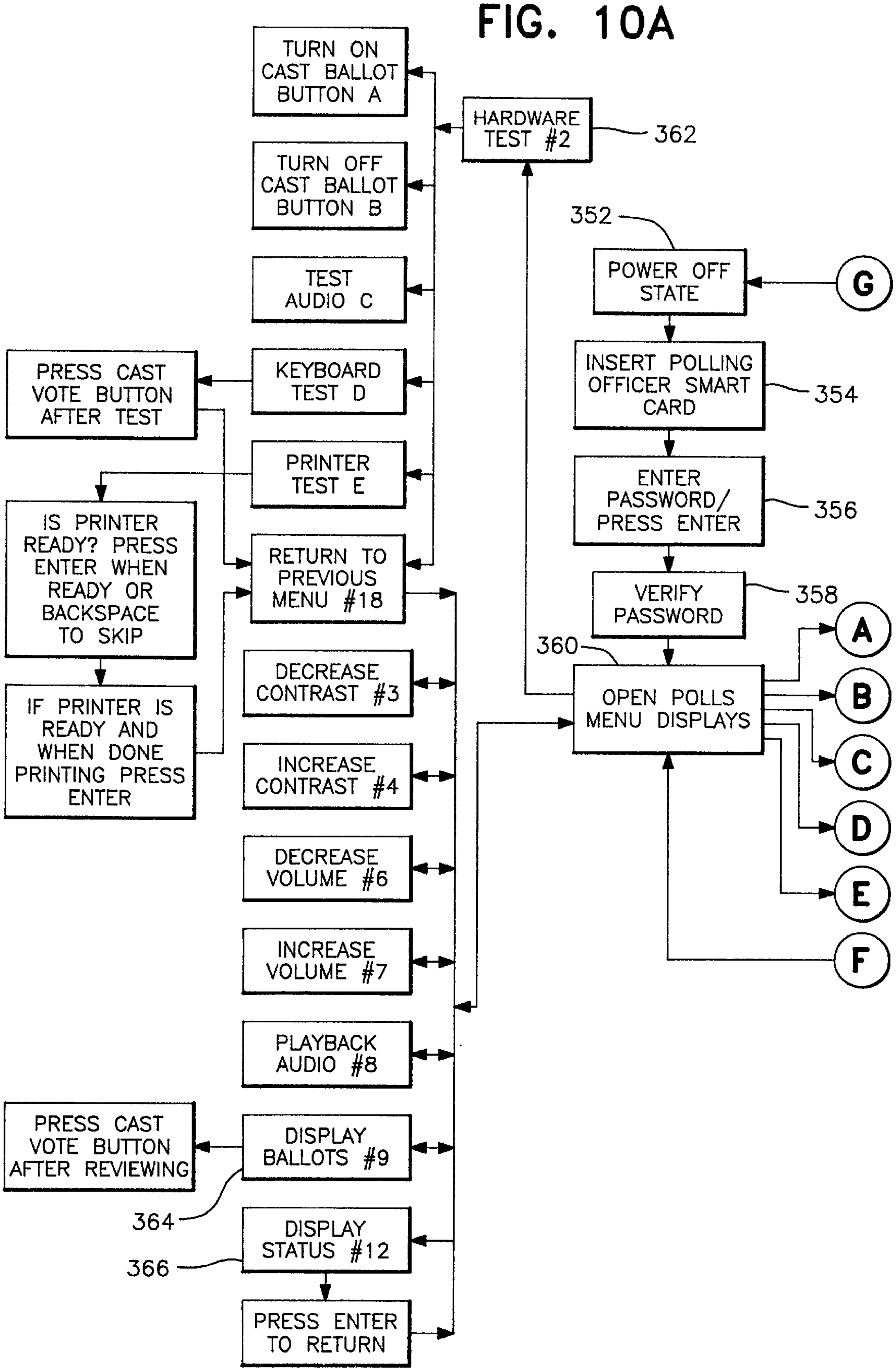
FIG. 10 is a flow diagram for the DVRM Open Polls Menu.
Figure 10B:
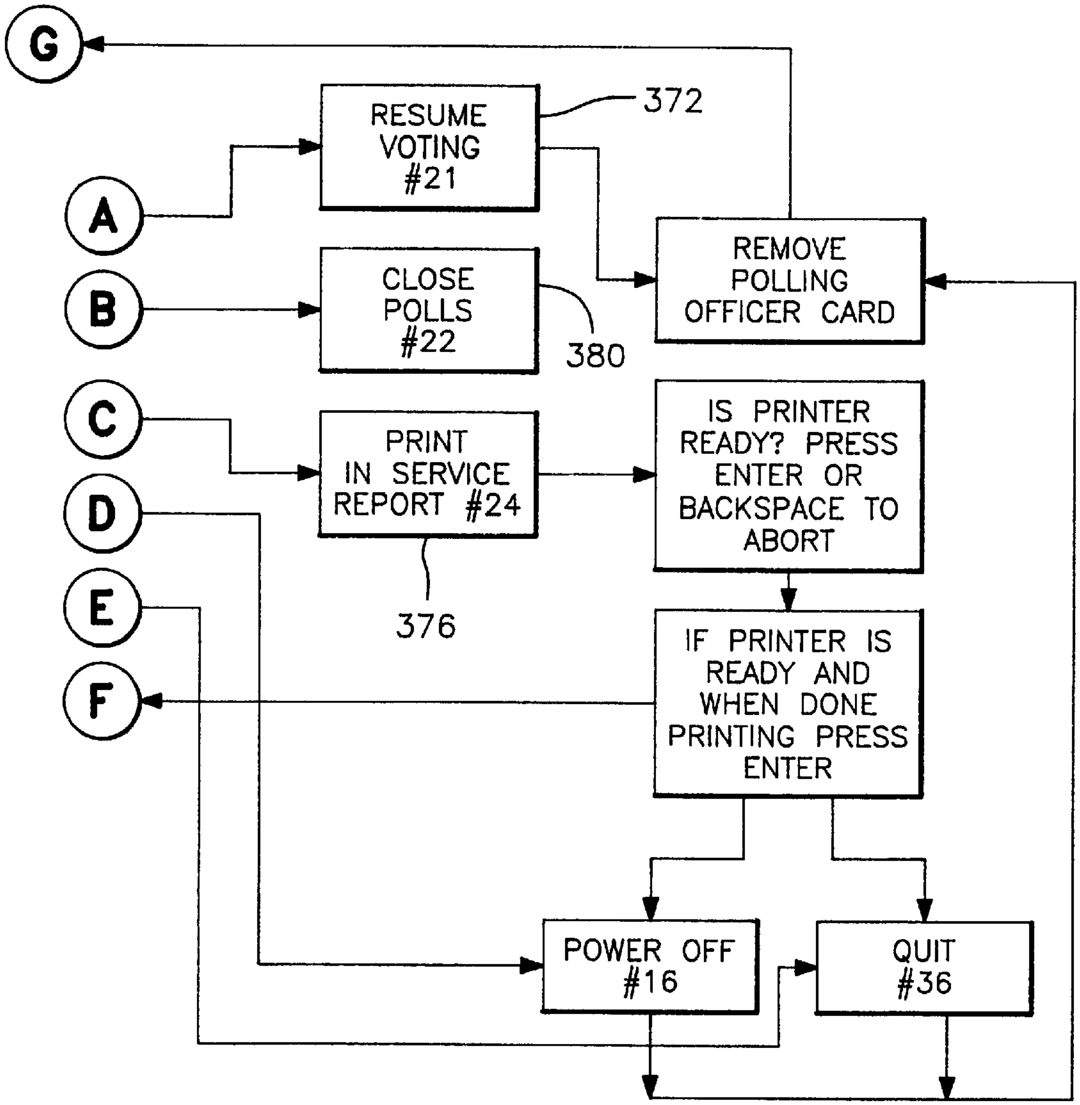
Figure 11A:
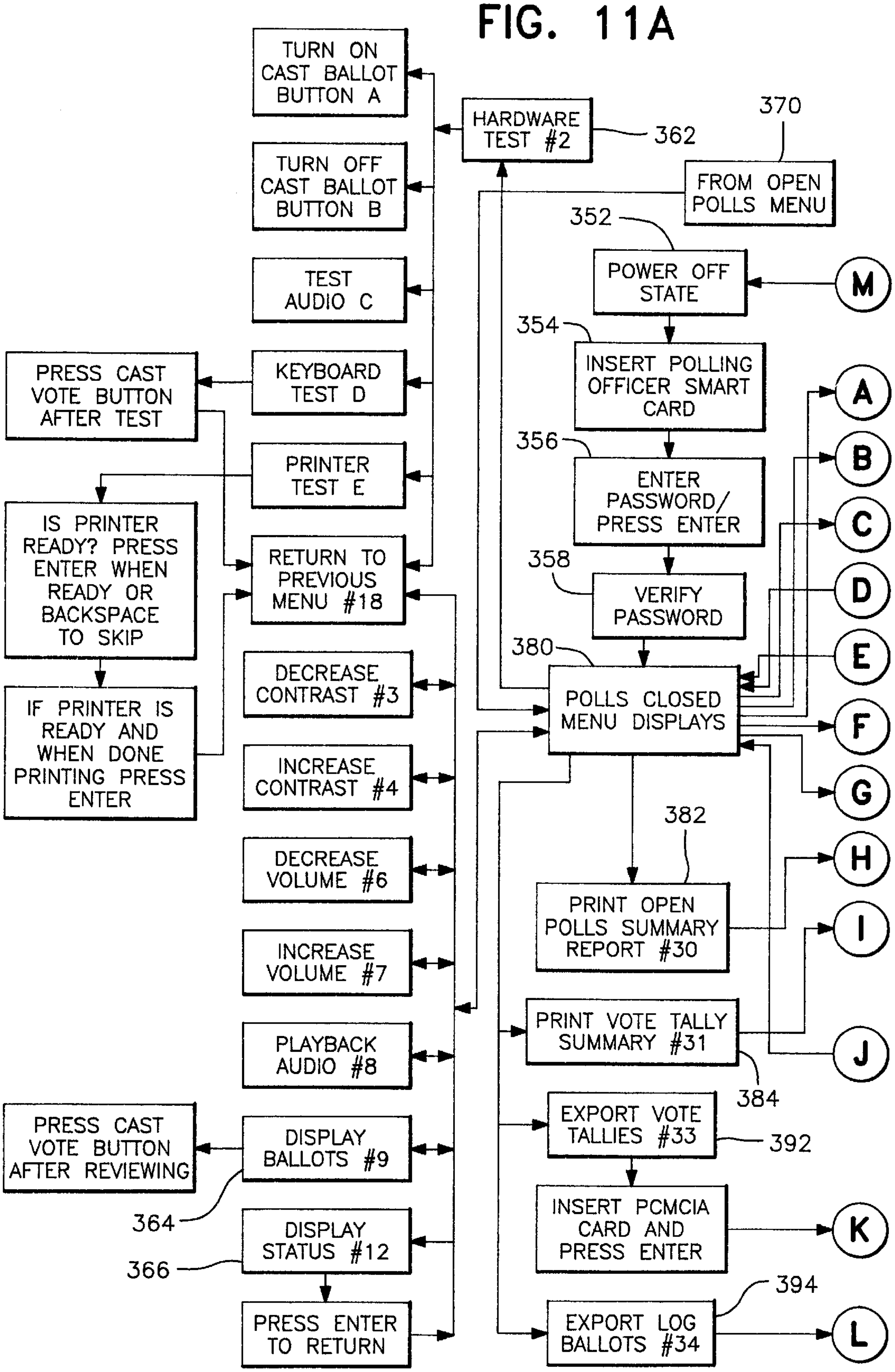
FIG. 11 is a flow diagram for the DVRM Close Polls Menu.
Figure 11B:
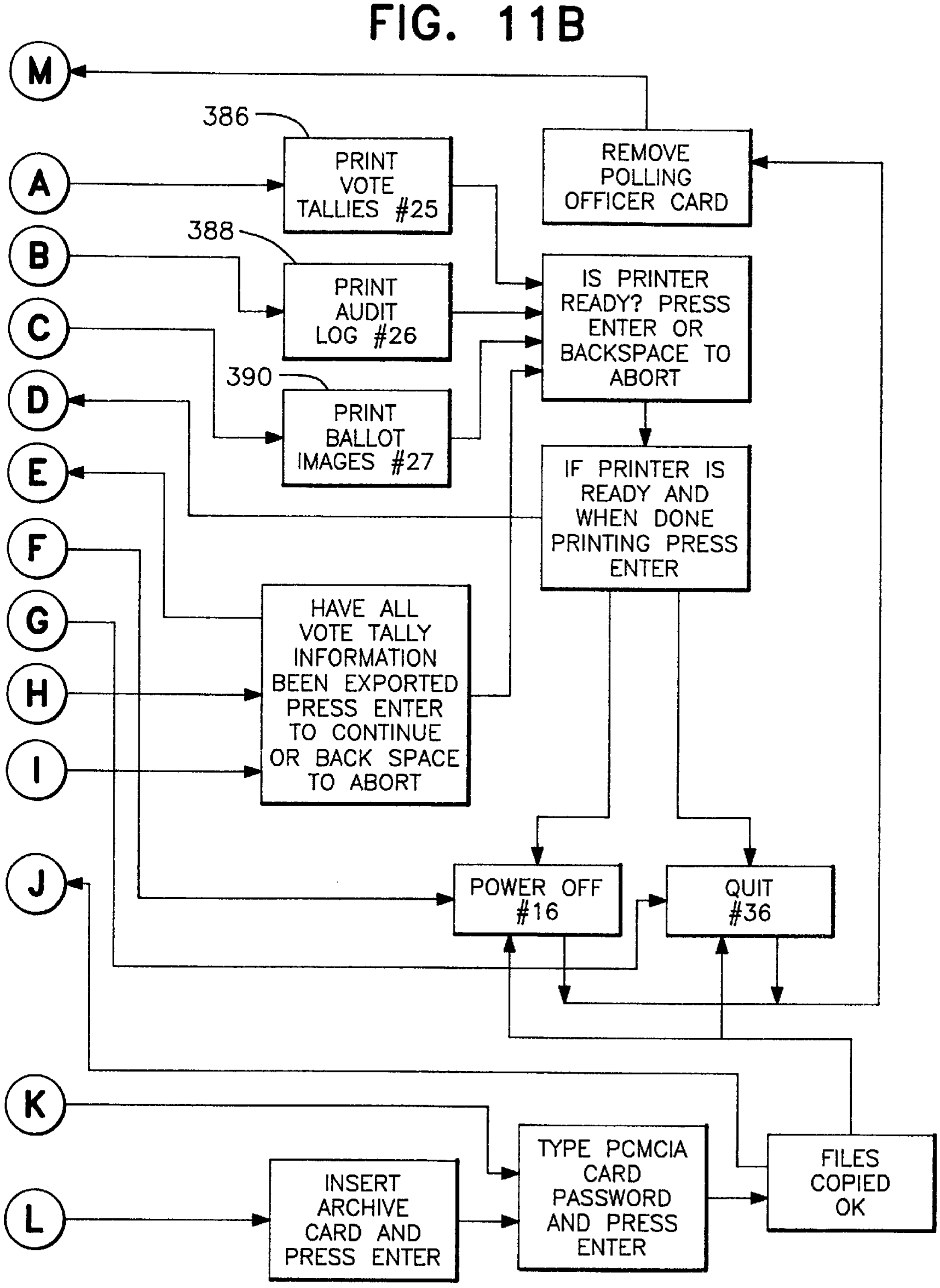
Figure 12:
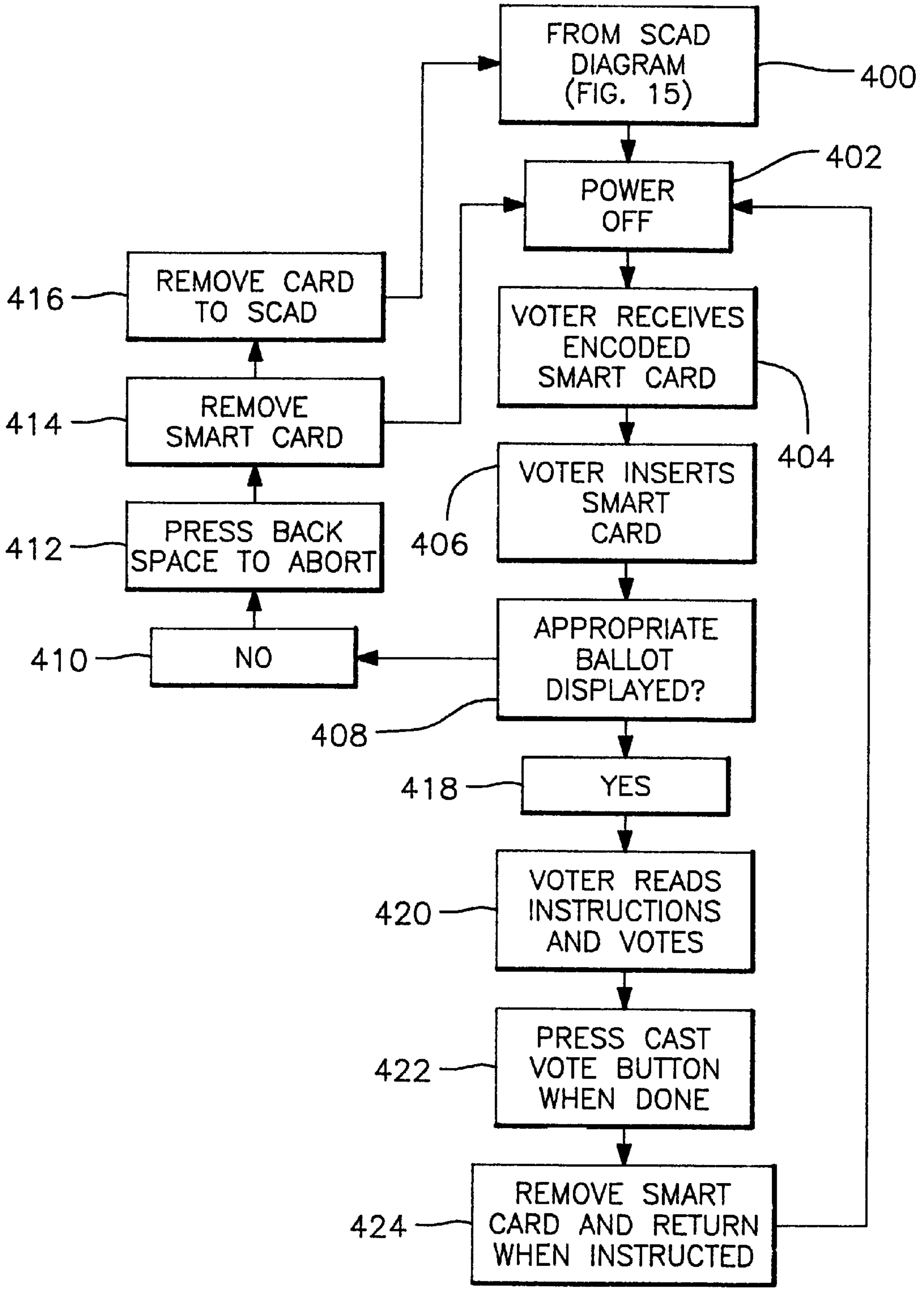
FIG. 12 is a diagram of the DVRM voter user interface.

On selecting Open Polls 370 from the New Election Menu, the DVRM proceeds to FIG. 10. On first entering Voting Service, the DVRM prints a certificate showing the date, time, location, and public and protective counter values when the machine was placed in service, step 376. The Open Polls Menu 370 can be entered from the New Election Menu 360, or by powering up a DVRM that last shut down from Open Polls, steps 352–358. The Polls Open menu is displayed and the user may select "Enter Active Voting", step 372. The Polling Officer smart card is then removed and the DVRM powers down, 352, and awaits the insertion of a Voter Smart Card (FIG. 12). The active voting state only accepts a Voter Smart Card programmed for Active voting. Insertion of a Polling Officer smart card, test card or practice card will put the DVRM 300 into the Polls Open state.

The Polls Open state (FIG. 10) allows a Polling Officer to take temporary control of a DVRM 300 during the election (i.e., once the DVRM has entered the Active Voting state). It provides controls for adjusting screen contrast and audio volume. To insure privacy, no tally reporting is possible while in this state. At step 376, the Polling Officer may print various reports from the DVRM. Print Set-Up Summary prints a report of all Voting Machines installed in a Polling Place and their counter values at the time they were loaded with election data.

Close Poll, step 380, takes a DVRM out of service, and can be accessed from the Open Polls Menu 370, or by powering up a DVRM that has been closed, steps 352–358. Once this is done, the DVRM may not be placed back into voting service for the same election. The Polls Closed state (FIG. 11) is the end state of the DVRM 300. It can only be entered by direct Polling Officer action. In this state all reports can be printed and data can be exported to the Data Carrier. The Available state is entered automatically from the Polls Closed state when the data backup or 6-month protection requirements have been met. In this state, a new election may be loaded. Otherwise this state has the same functions as Polls Closed.

Print Vote Tallies, step 386, is the primary output report. It prints the detailed tally results for a single DVRM after the polls are closed. This report will list the tallies for every ballot used on the DVRM and organized by ballot and by contest within each ballot, including number and text of write-ins. The data for this report come from the DVRMs flash memory. This function is not available while a DVRM is in voting service. The Tally Report has a header having the DVRM serial number, public counter value, Protective Counter value when the election was loaded, Protective Counter value when the DVRM was placed in service, and Protective Counter value when the DVRM was taken out of service. If multiple Data Carriers have been used to download tallies from the DVRM, the Tally report will include only those DVRM that have placed their tallies on the current Data Carrier.

The body of the report is organized by ballot. For each ballot loaded on the DVRM, the ballot title and the total number of voters using that ballot are printed. For those ballots used by at least one voter, every contest on the ballot is printed in order with each choice shown under the proper contest. The tally counts for each choice are printed next to the name of that choice. If a choice is a write-in, all the write-in text are printed immediately below the choice title, one line per entry. The undervote tally for each contest is also printed.

Open Polls Summary, 382, is a short report of the public and Protective Counter values for all DVRM in a Polling Place and serves as an audit record showing the in-service status data for the DVRMs including DVRM serial number and counter values. It uses data written to the Data Carrier 800 by each DVRM and is printed after the polls are closed. If multiple Data Carriers 800 have been used to prepare the Polling Place DVRM, this report will include only those DVRM that have placed their control data on the current Data Carrier.

Print Audit Log, sep 388, prints a report of all audit records stored on a DVRM. This function will be available only after polls have been closed. Print Ballot Images, step 390, prints a report of all ballot images stored in a DVRM after polls have been closed in random order. This ballot data may be saved on a special archive Data Carrier after polls are closed and election results have been downloaded. The Ballot Images include the title of the ballot followed by an entry for every contest on that ballot. Under each contest the name(s) of choice(s) that received votes on that ballot. Choices that were not voted will not be shown. If a contest received no votes, the phrase "no votes" will appear. If a write-in was entered, the write-in text will appear.

Polling Place or Print Vote Tally summary, step 384, is a report with separate tallies for every contest by ballot number for all the DVRMs in a Polling Place combined. This report has the same organization as the Tally Report, but the numbers are totals across all DVRMs. The data for this report are read from the Data Carrier.

The Individual Ballot Image report (not shown) is an optional report that produces a hard copy ballot image at the time CAST BALLOT is pressed. This hard copy is intended to be placed in a ballot box as an optional audit trail for the electronic voting process. The body of this report consists of one ballot block identical with that defined for the Ballot Images report. The heading for this report will be just the DVRM serial number, but the date and time is not printed.

Steps 392, 394 permit the Polling Officer to export data to the Data Carrier from the DVRM. In accordance with the preferred embodiment, data may only be exported once the polls have been closed. In general, three export functions are available: Export Vote Tallies 392, Special Export, and Export Logs and Ballots 394. Every ballot's tallies are stored separately. Every export tests that the same DVRM is not exported more than once to the same Data Carrier.

Export Vote Tallies, 392, transfers all tally data from a DVRM to a Data Carrier with full error checking. These tallies will include separate counts for every voteable position on every ballot plus undervotes. Every ballot's tallies will be stored separately. This function will include logic to ensure that the same DVRM is not exported more than once to the same Data Carrier. This function will also include logic to ensure that the data placed on the Data Carrier agrees with data in both redundant DVRM memories. It will be possible to export the same tally data to more than one Data Carrier for redundancy or where the data exceeds space limitations of a single carrier.

Special Tally Export (not shown) transfers all tally data from a DVRM to a Data Carrier. The Special Tally Export function is intended to be used only if the normal export fails, such as when the data in redundant memories do not match. The data is exported with maximum data recovery functionality, and includes error correction. As long as either of the redundant copies of the tally data can be recovered using the built-in error correction codes, this function will succeed. If only some data can be recovered, it will be recovered and the unrecoverable tallies will be so designated on the Data Carrier. These tallies will include separate counts for every voteable position on every ballot plus undervotes. Export Log and Ballots, 394, exports the complete audit trail and ballot images from an election to a Data Carrier that has been specially formatted for archival use, thereby allowing the DVRM to be used for another election in less than 6 months. Step 394 may also copy the audit trail file and ballot image files to a Data Carrier formatted as an archive.

At the time an election is formatted for export to the Data Carriers, every item for which tallies are required will be assigned a tally serial number. The contest tallies will be used to count undervotes. Choices are assigned serial numbers in order: first by the order of their contest, and next by order of appearance within the contest. In this way, the same tally counter is assigned election-wide to each item that must be counted. Tallies are accumulated only after Cast Ballot is pressed. Undervotes are calculated at the time tallies are accumulated. The undervotes for a contest will be adjusted by the number of votes allowed less the number of votes cast in that contest by the voter. However, undervotes for the replacement race of a coupled recall will be adjusted only if a vote was entered for the recall itself.

The DVRM maintains separate tally counters for every ballot it supports. The counters for each ballot will include a use count for the ballot itself, vote counts for every choice on the ballot and undervote counts for all contests. If multiple languages are supported, a single set of counters will accumulate all votes on one ballot code regardless of the language used. In accordance with the preferred embodiment, no facility will report votes by language within a single ballot.

After the polling officer places the DVRM in Polls Open, it is ready for Active voting. Voter operation of the DVRM follows FIG. 12, and does not require assistance from the Polling Officer. The voter obtains a programmed Voter Smart Card from the SCAD, 400. The DVRM is initially powered down, 402. The voter proceeds to a DVRM in. Polls Open, 404. When the voter inserts a Voter Smart Card, 406, the DVRM automatically powers up and checks for the correct smart card type, password, election ID, and Polling Place ID, as well as language ID and ballot ID.

The data on a Voter Smart Card is protected by a Polling Place Password programmed to the card by the SCAD. The DVRM uses the Polling Place password saved in flash memory to unlock and read the smart card. No external input is required from the Voter. If the smart card is a valid, unused Voter Smart Card, the DVRM will display the first page of the proper ballot for voter action. Report data is loaded only if needed. During reporting, different ballot definitions may be read individually.

The DVRM will assemble and display each ballot page, step 408, based on the graphic controls created for that page by the EMS. A graphic is placed adjacent each button position from 1 to 18 or 1 to 36, depending upon whether one or two columns are required for the ballot page. If the proper ballot is not displayed, 410, the voter may exit, 412, remove the smart card, 414, and return to the SCAD, 416, after which the DVRM powers down, 402.

If the correct ballot is shown, step 418, the voter may use the numbered vote buttons to enter votes for the choices that match those numbers, step 420. When a vote is entered, an X is placed in the checkbox of that choice and the choice is optionally changed to reverse video. After entering a vote, pressing the same button will cancel that vote and the display will revert to its unvoted state.

If the voter attempts to enter more votes than allowed, the DVRM will respond either with an error message or by canceling previous votes for that contest depending on a control set by the using jurisdiction. The voter may also enter write-in votes. When the Next Page or Back Page button is pressed, the next or previous consecutive page of the current ballot will be displayed. Any votes already entered either on a previous visit to this page or entered by a ticket vote will be shown.

The CAST BALLOT button is enabled when the last page of the ballot has been displayed. When the CAST BALLOT button is enabled, the backlight is turned on until the vote is cast. Previous votes may be undone or redone at any time before the CAST BALLOT button pressed. If the voter removes the smart card at any time prior to pressing CAST BALLOT, the DVRM will display a message and halt operation until the smart card is replaced.

When the Cast Ballot button is pressed, step 422, earlier vote key press data stored in its registers are transferred to the Flash memory. The public and private counters are updated, and the logical image of the ballot is saved in memory. When this action completed, the smart card ballot ID is cleared so that it cannot be reused without first being reset at the SCAD by Polling Officer. The DVRM will display and/or announce its "Thank you for voting" message and prompt the Voter to remove the smart card from the DVRM and return the smart card to the Polling Officer. At this time the voter must remove the smart card, step 424, and the DVRM will shut down, step 402, until the next smart card is inserted.

The DVRM is capable of retaining 12,000 individual votes (voted ballots). If the DVRM runs out of memory, the Polling Officer may off-load the votes onto the Data Carrier and the DVRM enter resume polling from the Open Polls Menu (FIG. 10), step 372. The off-loading process takes less than 30 seconds.

The DVRM supports a wide range of voting practices, including overvotes, primaries, general elections, split tickets, ticket voting, issues, two-part recalls and write-ins. The DVRMs also provide effective support for visually impaired and illiterate voters. One option available is to use easy-to-read, large font ballots. Another option is to provide an audio response using earphones that allow complete voter privacy. In its audio response mode, the DVRM reads each ballot option to the voter. The DVRM will also provide status updates every time a vote button is pressed (e.g., "You are now on page 3 of the partisan races.").

The DVRM software prevents overvoting (including contests where more than one vote is allowed and/or the number of choices exceeds one page). The DVRM may handle overvotes in any suitable manner, such as clearing the prior vote and entering the new vote, not permitting the overvote, or clear votes only for contests that allow just one vote and to display the overvote message for all other contests. The DVRM also prevents voting on a coupled recall replacement race when no vote is entered on the recall itself. It also provides special support for those states where voters in a primary election may choose the political party they wish to vote for in secret.

For a primary election, the using jurisdiction may permit voters to select the party ballot they wish to use by making a choice on the ballot itself. This will be indicated by the presence of a special contest type as the first contest of the election. When a voter selects a primary party, the DVRM will reset itself and display the ballot associated with that selection. It will be possible for a voter to page through one ballot, and go back and select a different party. If this is done, any votes on the first primary ballot will be canceled when the DVRM resets for the second ballot.

If the voter enters a ticket vote, the DVRM will record a vote for every choice included in that ticket. However, a ticket vote will not be recorded for contests where votes are already present. When a ticket vote is canceled, the individual votes for all choices included in that ticket will be canceled. However, a contest which allows more than one vote and has some votes present that are not part of the canceled ticket will receive special handling depending on a control set by the using jurisdiction as follows: either all votes for candidates on the ticket in such a race will be cleared without affecting the votes for non-ticket candidates, or the votes for ticket candidates in such a race will be untouched (because there is a presumption that the race with a split vote records the specific wishes of the voter and are no longer part of the ticket vote).

If a two part recall (a recall issue with an associated replacement race) has been coded as a coupled recall by the using jurisdiction, the DVRM will prevent the voter from voting on the replacement race without first voting on the recall. If the voter cancels a vote on such a recall, any vote on the replacement race will be canceled automatically.

Polling Place Passwords are created by the first DVRM in a Polling Place loaded for a new election. The Polling Place Password is written to the Data Carrier by that DVRM. The Password is then read from the Data Carrier by all other DVRMs and SCADs. The SCADs then encode this Polling Place password on every Test, Practice and Active Voter Smart Card. When a smart card is then inserted into a DVRM, the password is read from the smart card and compared to that input at election load to verify the legitimacy of the smart card (in addition to checking the election and Polling Place IDs).

The Polling Place Password is the key to operational security within a Polling Place. This password is used to read and write data on Voter Smart Cards. In the preferred embodiment, this password is not encrypted. This means that physical security of the Data Carrier is an important issue. The Polling Place Password is an internal password and not accessible to anyone.

The successful self-test terminates with a prompt for the insertion of the Data Carrier and entry of the Encryption Key. When these are found acceptable, the new election data is automatically downloaded. At the completion of loading, the first DVRM loaded will automatically generate a Polling Place Password and write it back to the Data Carrier along with a record of its serial number. This test indicates that the unit has successfully downloaded the data for this election.

Carrier Activity Data are control records written to the Data Carrier by each DVRM when it is initially loaded and again when it transfers its results back to the Data Carrier. The Activity data prevents duplicate transfers of election data to the DVRM and for the Tally/Reporting subsystem to detect missing-results. Archive Data is an optional output from a DVRM to a specially configured Data carrier. Archive data is used to protect the audit data of a previous election when a DVRM must be reused within 6 months of that election.

A Polling Officer can use the Special Recovery State to print reports and export tally data when the DVRM fails, usually due to failure of the smart card reader. This state is entered by pressing the Cast Ballot button while the DVRM is shut down. When the DVRM starts up, the Polling Officer must enter a special emergency override password that is only available by calling the Jurisdiction Master Facility and providing the DVRM serial number. This state provides the same functions as the polls closed state once the DVRM has entered this state it can no longer be placed in voting service. If a DVRM fails, the Polling Officer should remove the unit from service, remove the batteries, remove the flash memory, and return the unit to the vendor for repair or replacement. The flash memory can be inserted into another DVRM for the restricted purpose of recovering any voting tallies and data by downloading. The state the DVRM was in when the jam occurred will be recorded in the flash memory.

Smart Card Activator Device (SCAD)

The SCAD provides all voter control functions performed by a Polling Officer in a Polling Place. The SCAD is primarily used to perform encoding of smart cards during tests, step 18 (FIG. 4) and Active Voting (step 20), and RESET button processing. Secured data is not stored on the SCAD, so that security and encryption is not an issue.

Figure 13:
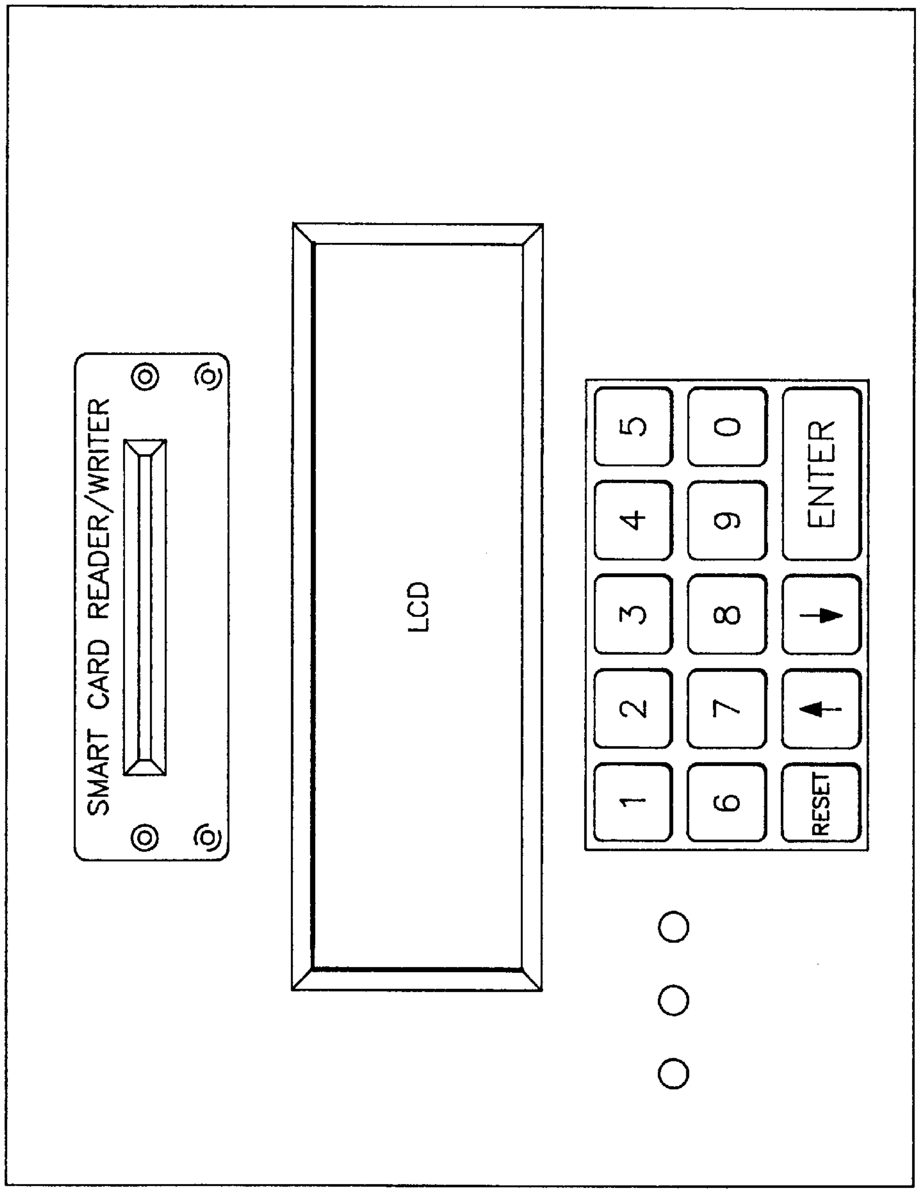
FIG. 13 is a schematic diagram of the SCAD front panel.

The front panel of the SCAD is shown in FIG. 13. The front panel contains a smart card access slot, an LCD display, red and green LED status indicators, and a keypad. Preferably, the SCAD has a Microchip 16C64A PIC microcontroller, a buzzer, smart card I/O connector, 64 Kb of static random-access memory (SRAM), a PCMCIA card reader capable of reading data from the Data Carrier, and dual power capability using either batteries or external power. In accordance with the preferred embodiment, the SCAD software uses the PIC assembly language, and does not have an operating system. All necessary functions, including hardware drivers, is part of the design.

The SCAD keypad preferably has a limited number of keys for performing its required tasks. The set of keys include ten numbered keys—0 through 9, an up arrow key, a down arrow key, an enter key, and a cancel key. The numbered keys are used simply to select from a number of choices. The up/down arrow keys are used to scroll through a list of choices that may not fit on the LCD display. Each SCAD is identified by means of a permanently affixed nameplate or label containing the name of the manufacturer, the name of the device, its part number, its revision letter, and its serial number. A SCAD is delivered to a Polling Place in its transport/storage case with a seal affixed that will indicate tampering enroute.

Figure 14:
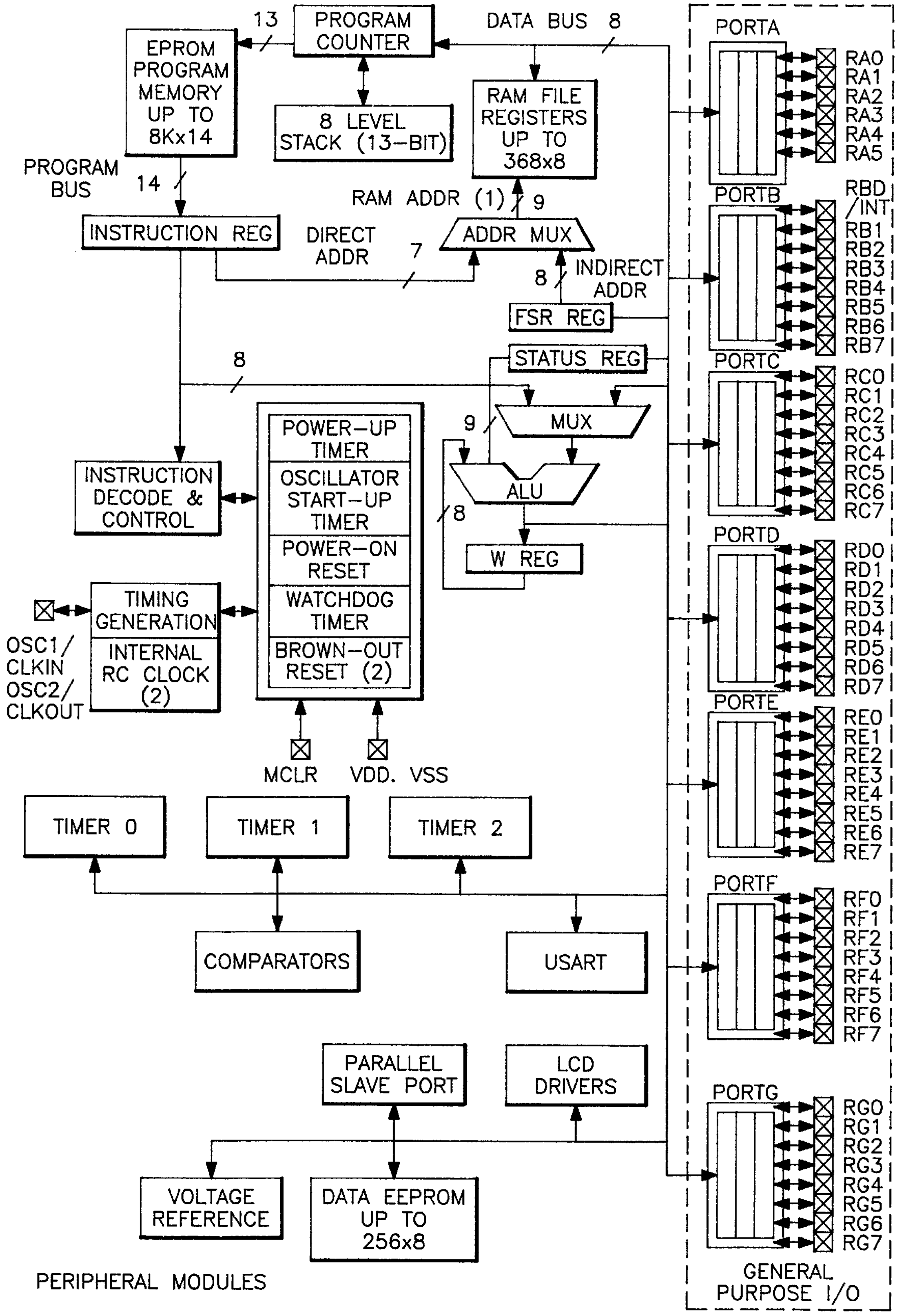
FIG. 14 is a block diagram of the microcontroller for the SCAD.
Figure 15A:
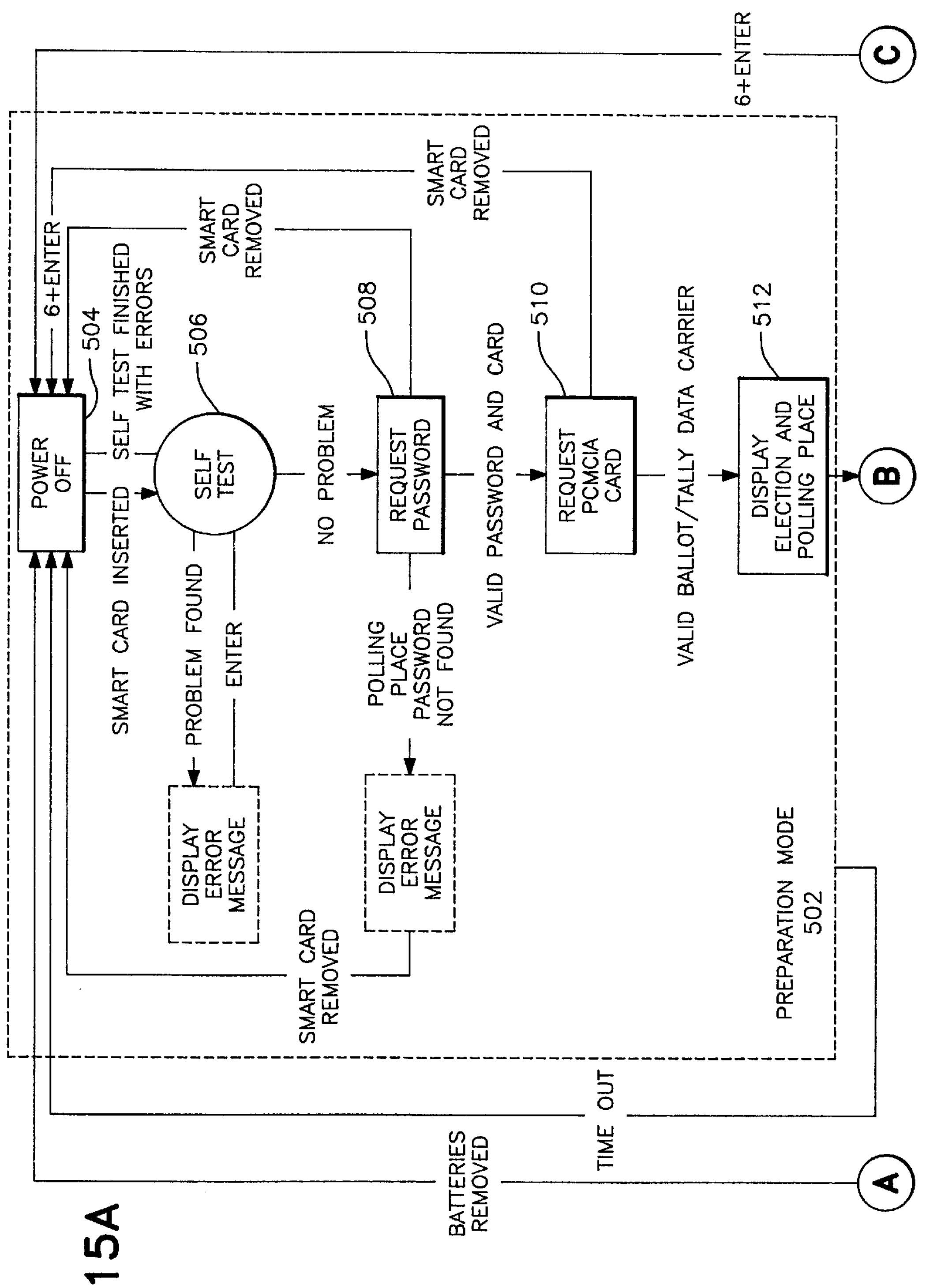
FIG. 15 is a schematic diagram of the SCAD user interface.
Figure 15B:
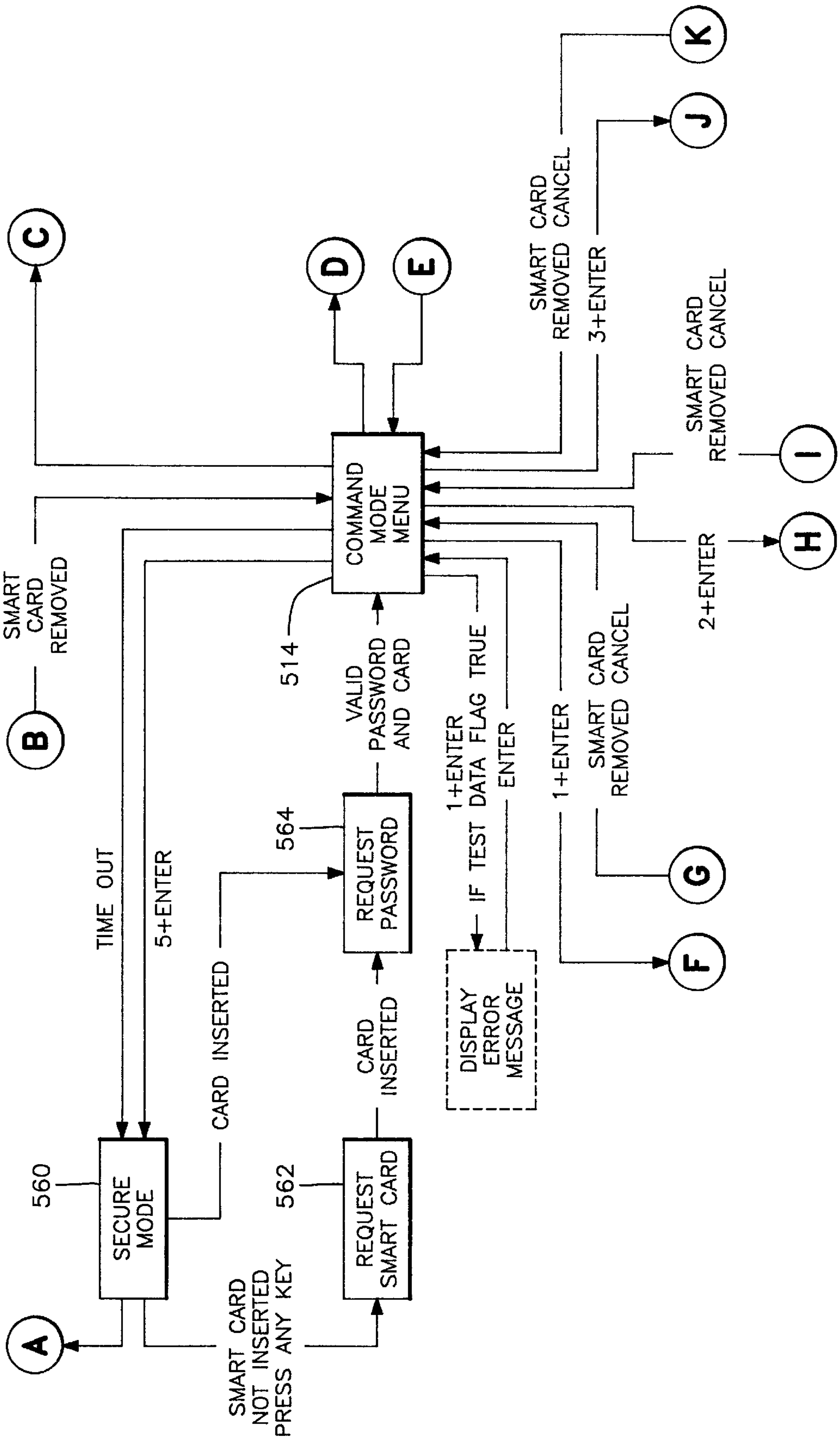
Figure 15C:
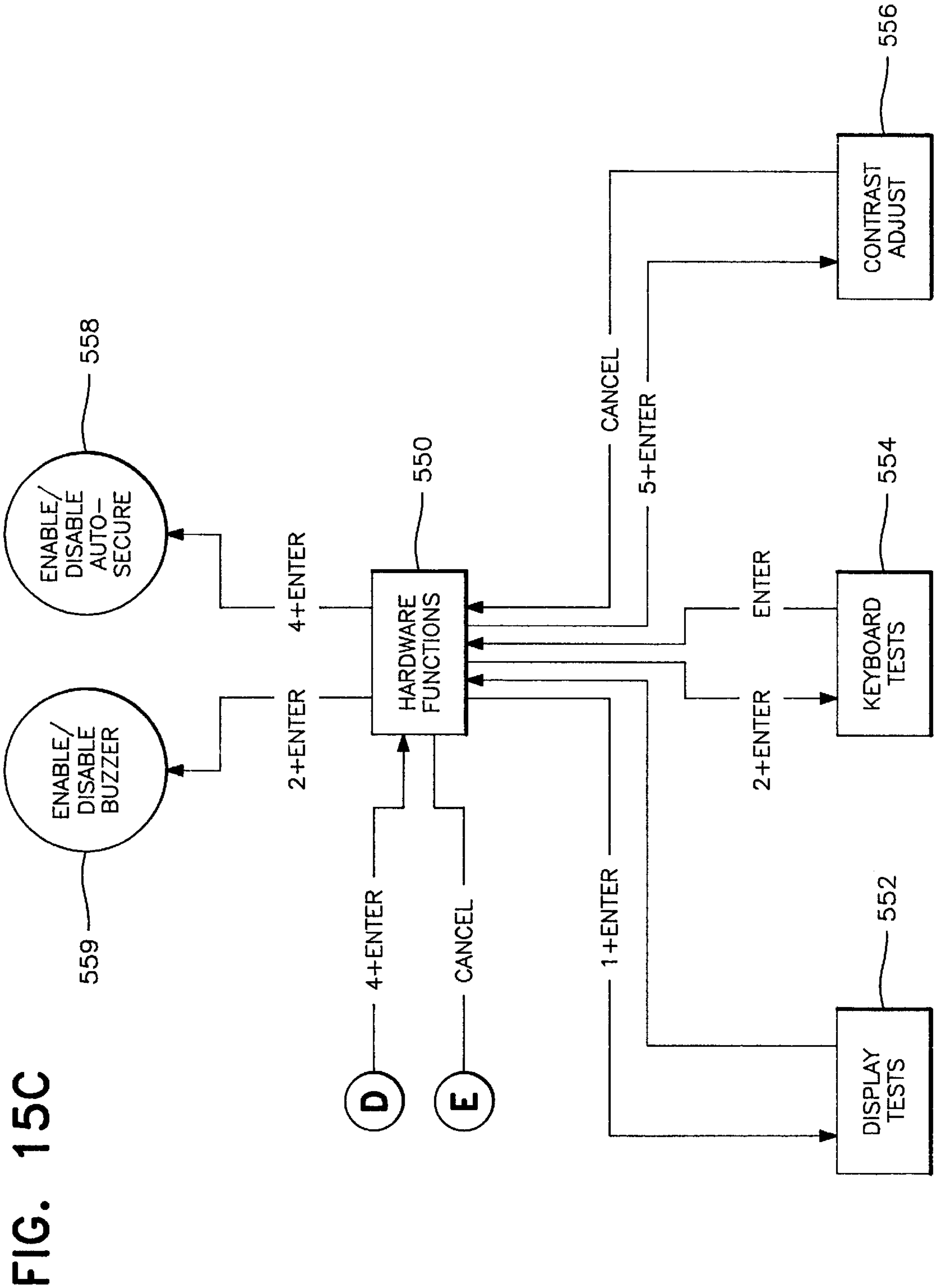
Figure 15D:
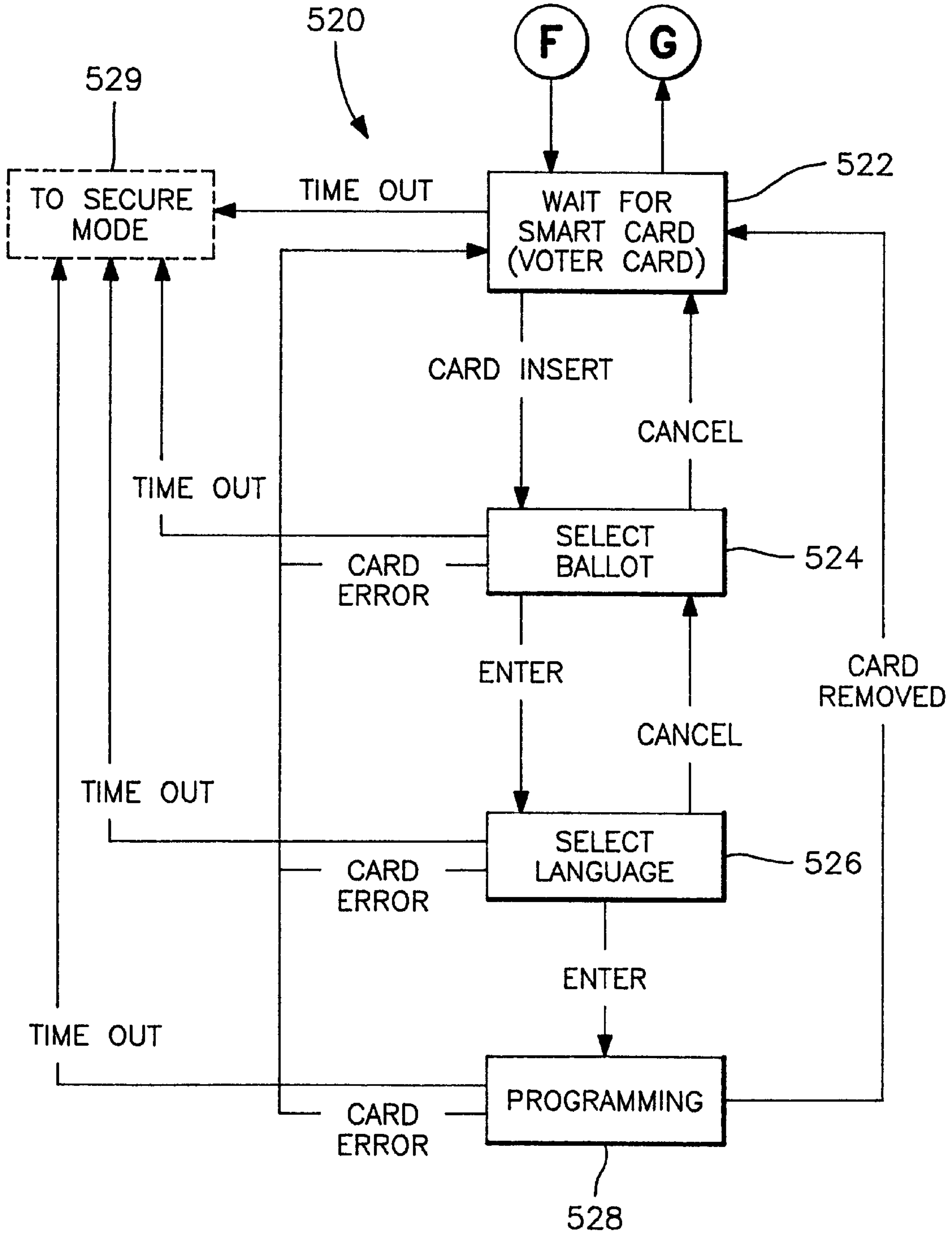
Figure 15E:
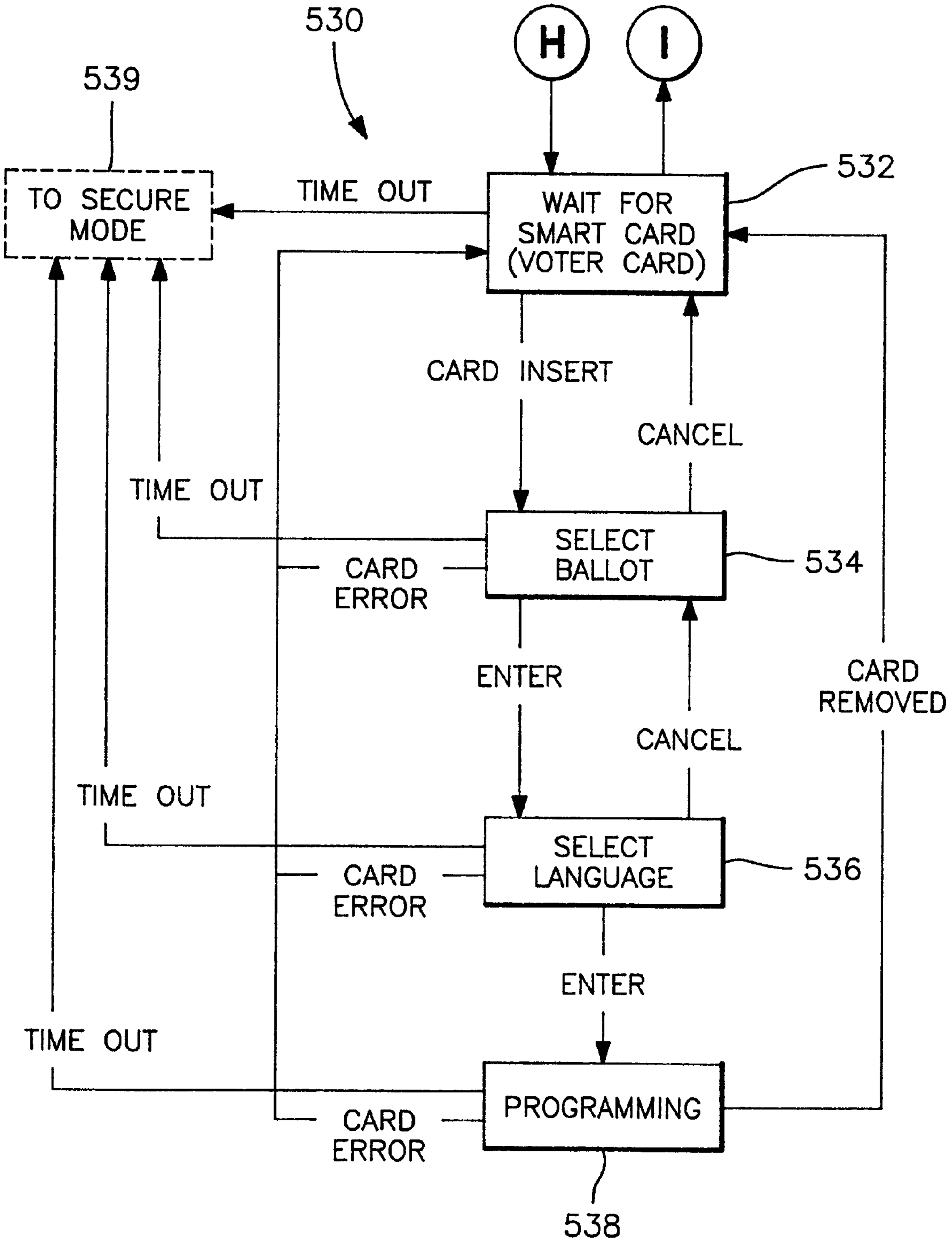
Figure 15F:
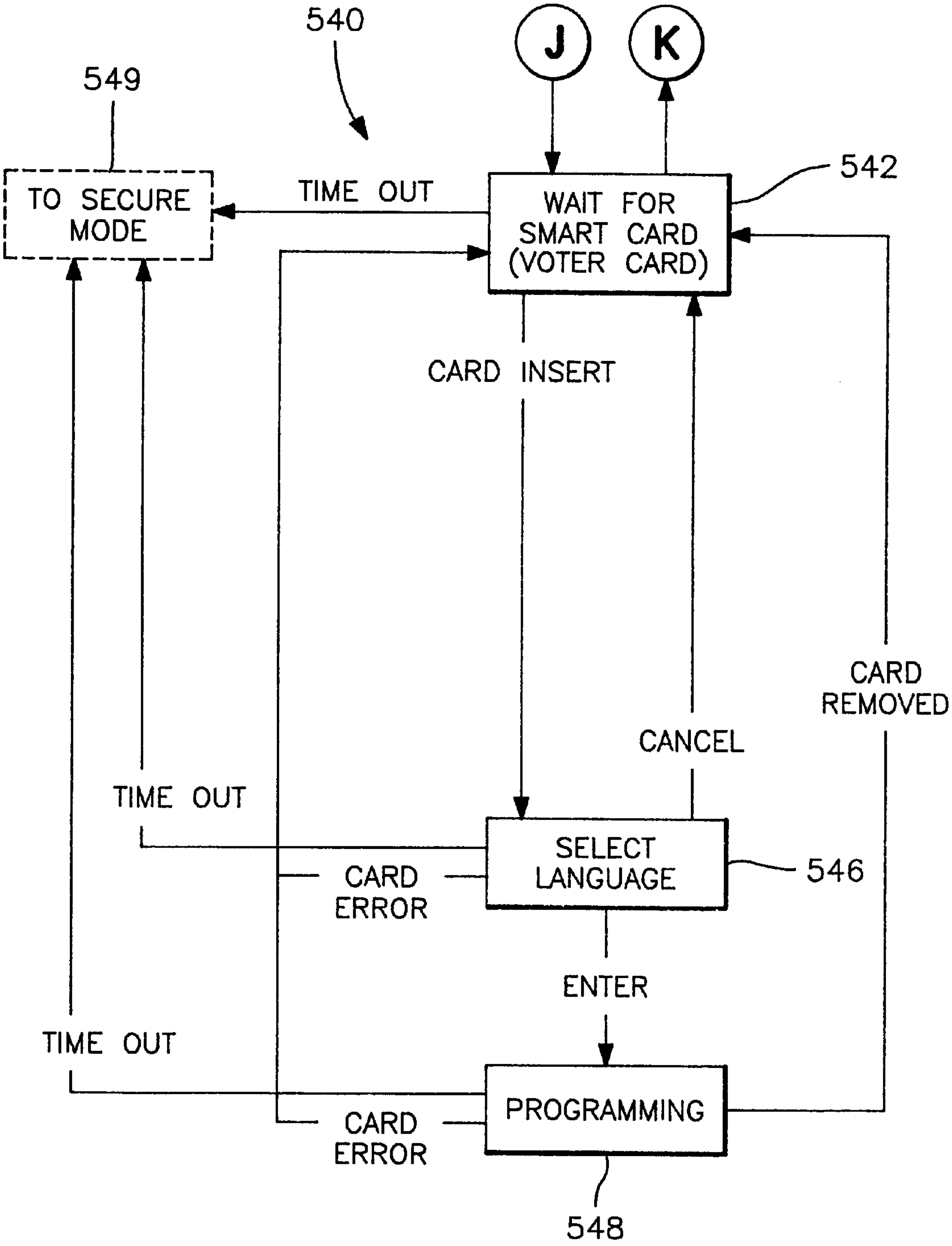

FIG. 14 is a general block diagram of the SCAD microcontroller. The microcontroller interfaces with external devices by means of peripheral modules. Input/output signal flow occurs via internal buses and through five general purpose I/O ports or registers. Port assignments are as follows: PORTA (IC1 register A) for LCD, SRAM, PCMCIA card reader; PORTB (IC1 register B) for Data (DB) bus; PORTC (IC1 register C) for PCMCIA control lines, keypad row address lines, LCD reset line, smart card detect (CDET) line, PCMCIA card detect line; PORTD (IC1 register D) for memory address (MA) bus; and PORTE (IC1 register E) for smart card interface.

Software is permanently installed in every SCAD as firmware. The SCAD boots up in command mode whenever a Polling Officer smart card is inserted. FIG. 15 shows all major display states of the SCAD and the events that cause it to change state. The initial state of the SCAD is power off 504. In most cases, the SCAD is powered up prior to opening polls and remain powered up all day. Most of the activity during the day will occur in the Voter Card mode.

Most of the text displayed by the SCAD is prepared and formatted by the EMS. This procedure allows the user to modify menu and message text to suit local needs and terminology. This text is downloaded to the SCAD from the Data Carrier 800 at step 16 (FIG. 4) and includes menu lines, header lines, error message displays, ballot numbers and names, and language numbers and names. The text needed to support SCAD preparation cannot come from the Data Carrier 800 since that data is not loaded until the end of the preparation step. Instead, this text is hard-coded into the SCAD.

Election definitions created by the EMS are read from the Data Carrier 800 defining all ballots authorized for a Polling Place for a particular election. The Polling Place password is read from the Data Carrier 800 only after generation by the first DVRM in a Polling Place to load the new election. The Polling Officer smart card is created by the EMS.

In the Preparation Mode 502, the SCAD executes a sequence of tasks each time the SCAD is turned on. The user must execute each task in the order given. The only way to re-enter this mode is to power down the SCAD, step 504, and then turn it back on. In Preparation Mode, the user must insert batteries into the SCAD. In response, power is supplied, but the processor does not boot-up at this time. Next, the user must insert a Polling Officer smart card.

Once a Polling Officer smart card is inserted, the SCAD boots up and automatically executes its built-in self-test 506. If successful, the microcontroller turns the green LED on. At step 506, the SCAD checks that the smart card is a Polling Officer card. An error message is displayed if a problem is found. If all is OK, the SCAD displays a password prompt 508. The user must enter the password for the Polling Officer smart card. The SCAD reads the smart card and determines if the password was valid. If an error is detected, an error message is displayed, the user must remove the smart card and the system powers down, 504.

If the password is accepted, the SCAD displays a Data Carrier prompt 510. The user inserts the Data Carrier 800, and the SCAD determines if the carrier is a Data Carrier 800. The election ID and Polling Place ID are read from the carrier and checked against that from the Polling Officer smart card. Unlike the DVRM, the SCAD downloads only the Titles of the election ballots for this Polling Place and they are not encrypted, so that a decryption key is not required. The unencrypted Polling Place Password is loaded to the SCAD, which displays an error message if needed. If all is OK, the SCAD loads the menu/message text table, ballot look-up table and language look-up table. The SCAD then reads unencrypted data from a Data Carrier 800, and loads a list of valid ballots from the Data Carrier 800. When data transfer is complete, the microcontroller displays the election and Polling Place, step 512, and cues the Polling Officer to remove and reseal the Data Carrier.

The SCAD then prompts the user to remove the smart card. When the Smart Card is removed, the SCAD enters the Command Mode 514. In the Command Mode 514, the SCAD provides the top level of control for the SCAD. There are six working modes available to the user from the Command Mode: Program Voter Cards 520, Program Test Vote Cards 530, Program Practice Cards 540, Hardware Functions Menu 550, Secure SCAD 560, and Shut Down. The menu also presents the Polling Officer with the option to Display Available Ballots.

The Program Voter Card Mode 520 is the main operating mode of the SCAD. In this mode, the Polling Officer uses the SCAD to program smart cards for voters. Normally, the Polling Officer will place the SCAD in this mode shortly before polls open and the SCAD will remain in this mode all day. Each smart card becomes a personalized key for a voter, allowing the DVRM to be operated and causing that device to display the correct ballot. When the voter finishes voting, the DVRM erases selected data from the smart card so it cannot be reused until it is again programmed by the SCAD.

The Program Voter Card mode 520 has four submodes: waiting for smart cards 522, select ballot 524, select language 526, and programming 528. The submodes operate in the order listed. The first operating submode of the program voter card mode 520, waiting for smart card 522, is the resting submode between active operations. The SCAD displays a message, such as "Insert Voter Card".

When an eligible voter has been cleared to vote, the Polling Officer will insert a used smart card in the SCAD. The SCAD checks the card type and rejects the card if it is either a Polling Officer card or an unrecognizable card type. If the Polling Officer inserts a voter card from a previous election, a message will be displayed asking if it is OK to erase that card. If the Polling Officer inserts a voter card that has not yet been voted, a message will be displayed, and the Polling Officer may either remove the card and return it to the proper voter or direct the SCAD to overwrite it's current settings.

Assuming the card is valid, the SCAD will then attempt to read the smart card. If successful, the ballot ID is checked and an error message is displayed, if needed. If all is OK, the SCAD then displays "Select Ballot For Voter", followed by the available ballot choices, step 524. The Polling Officer selects the appropriate ballot for that voter. If more than one language is available, the select language submode 524 is entered. Once the user selects the desired language, the programming mode 528 is entered. Otherwise, if there is only one language, that language is selected by default and the SCAD proceeds to program the card, step 528.

In the Programming Mode 528 the SCAD displays the name of ballot selected, and the name of language selected, and programs the. Voter Smart Card accordingly. If an error is detected, the SCAD displays an appropriate message and illuminates the red LED. Otherwise, when coding is successfully completed, the green LED is illuminated and the user is prompted to remove the programmed voter card. Once the card is removed, the SCAD turns off the green LED and returns to the waiting for smart card submode 522 where it prompts for insertion of another Voter Smart Card to be encoded. If no more Voter Smart Cards are to be encoded, the Polling Officer hits CANCEL to return to the Command Mode Menu 514.

The primary purpose of the SCAD is the programming of Voter Smart Cards for each voter while the polls are open. To facilitate this, the SCAD employs repetitive coding, whereby, once the Polling Officer has requested the Program smart card 520 from the Polling Officer menu, it is not necessary to return to the main menu 514 to program another card of the same type. The SCAD expects the function to be repeated. Thus, upon completion of encoding a smart card 528, the SCAD loops back to request insertion of the next card to be programmed, step 522. The Polling Officer only needs to return to the main menu 514 to program a different type of smart card or to perform another function.

The selection of the ballot to be voted upon with the smart card being coded is equally anticipatory. Within the card coding loop each ballot list reappears at the same position used for the previous card and is not reset so that the Polling Officer does not have to find the same entry each time. If a different ballot is required, the Polling Officer needs only to scroll through the list to search, or enter the Ballot Number to select it directly.

The Test Card Mode 530 is a special mode used only before polls open to create cards for test voting. Submodes 532, 534, 536, 538 and 539 are analogous to the Voter Card Submodes 522, 526, 528 and 529, respectively. The Test Mode 530 also has the same behavior as the Voter Card Mode 520, except for the wording of their displays as a test mode and the Smart Card Type Code written to the smart card. The output of this mode is test cards that can be used for test voting but not regular voting. The only difference between this mode and the voter card mode is that the SCAD displays in this mode will clearly indicate that test cards and not voter cards are being programmed.

The Practice Card Mode 540 is a special mode used to create practice vote cards. Normally only one practice card will be needed. This card can only be used on a DVRM that is in practice mode and can be used continually throughout the voting day without being reprogrammed. More than one practice card may be created, each programmed for a different language, step 546. As shown, this mode does not require a select ballot submode since there is only one practice ballot. If there is only one language, step 546, the SCAD will begin programming the practice card, step 548, as soon as the card is validated. The Waiting For Smart Card Submode 542 is similar to step 522, and the SCAD checks the card type and rejects the card if it is either a Polling Officer card or an unrecognizable card type.

If the SCAD is in any of the Program smart card modes 520, 530, 540, inserting a programmed but unused smart card will display the information programmed on the card, including the name of the ballot and the language. In addition, the SCAD will indicate that the card has not yet been used for voting. The Polling Officer may then elect to erase and reprogram the card or to return the card to the voter. At any time in the program smart card modes 520, 530, 540, the user may presses CANCEL to return to the command mode 514. If there is no action for 15 minutes, the SCAD will enter auto-secure mode 529, 539, 549, if enabled.

In the Hardware Functions Mode 550, the Polling Officer can either confirm the proper operation of the hardware or set hardware features of the SCAD. Here, for instance, the user may test the display 552, test the keypad 554, turn the buzzer OFF/ON 559, turn auto-secure timer ON/OFF 558, or adjust the LCD Contrast 556. Pressing CANCEL will return the SCAD to command mode.

The Display Test mode 552 displays a pattern that will allow the Polling Officer to observe whether the LCD is functioning properly. Pressing cancel will return the SCAD to the hardware functions mode 550. The keypad test mode 554 will display numbers and symbols on line 2 of the LCD to confirm operability of the keypad as keys are pressed. Pressing enter will return the SCAD to the hardware function mode 550.

The adjust LCD contrast mode 556 will allow the contrast level of the LCD display to be adjusted to a suitable level for viewing the SCAD display. The UP arrow increases the contrast level and the down arrow decreases the contrast level. Pressing cancel returns the SCAD to the hardware functions mode 550.

The Hardware Functions menu 550 may also present the option of Display Status. This would verify current election and Polling Place identification. When this task is finished, the LCD reverts to the task menu.

The secure mode 560 is entered by a time-out event in any mode of the SCAD including error message displays, steps 529, 539, 549. It provides additional security to prevent unauthorized use. If the SCAD is inactive for a period of more than 15 minutes, and the auto-secure timer is on, it will enter a low-power state called secure mode 560. In this mode the LCD display will be powered down and the green LED will blink to show that the SCAD is sleeping.

This time-out rule applies to all operating modes including error messages, but not including the preparation mode. In the preparation mode, a SCAD that is allowed to remain idle for 15 minutes will simply shut down, step 504. In an early voting Polling Place, the Polling Officer can force the SCAD into its secure mode with a command mode option from menu 514. The next day the Polling Officer can simply wake it up by pressing any key or inserting a smart card. Once the secure mode is entered, the SCAD will request a Polling Officer smart card 562, if one is not present, followed by the Polling Officer password, 564. The SCAD also determines if the election and Polling Place IDs match those loaded from the Data Carrier, and displays an error message if needed. If all is OK, the SCAD enters the command mode 514.

The Polling Officer smart card Election ID, Polling Place ID, and Polling Officer Password must match those already stored on the DVRM. If they do not, it is assumed that the Polling Officer wishes to load a new election, in which case the SCAD prompts for insertion of a Data Carrier 800, step 510.

At the end of the voting day, the Polling Officer can completely shut down the SCAD by choosing the power down option 504 from the command menu 514. This will power down the processor and all data stored in RAM will be lost. Once the SCAD has been shut down, the Polling Officer can remove its batteries and return it to storage.

Election Management Software (EMS)

The DVRS Election Management software (EMS) supports election definition, vote tallying and reporting at PCs 100. The EMS uses object-orientated software with a graphic user interface that runs under the WINDOWS operating system on PCs 100 to provide all necessary DVRS management and administrative functions. The flexibility of the EMS software allows it to efficiently support elections of all sizes and types. Multiple elections can be supported at one time.

The EMS further allows entry of contest and choice information for an election as it becomes available or as the user wishes to enter it, allows the entry of tickets including the designation of the choices that will receive votes when a ticket vote is entered, and allows the definition of one or more ballots for each precinct including the designation of which contests appear on each ballot. The user may also format the exact appearance of ballot information. At the end of the election, the election data, including all reference books, is archived along with supporting reference and system data, and tally results.

The EMS includes support for early voting, primary elections, candidates filed with more than one party affiliation, recalls, including two-part coupled recalls, contests that exceed one ballot page in size, multiple write-ins for contests that permit more than one vote, alternative voting rules to satisfy the varied needs of different jurisdictions, and automatic layout of ballots based on user defined formatting rules.

There are various sub-sections of the election data that are approachable independently. This independence means that each section can be defined either from scratch or from an old election independent of which approach was used for any other section. These sub-sections are: (1) System Data, (2) Reference Data; (3) Ballot Data; (4) Ballot Formatting; and (5) Reports and Tallying.

System Data, or Election Independent Data, applies to all elections in the DVRS, and there is only one copy of this data. Changes to System Data therefore affect all elections created after that change. System data include User Roster (i.e., names, passwords, access, Polling Place assignment, etc.), Equipment Roster (i.e., DVRMs, SCADs, their serial numbers, Data Carriers, Polling Place assignment, initial Protective Counter value, etc.), and Facility Roster. The Equipment Roster is used at Tally time to insure that all results have been received from all DVRMs at all Polling Places. In addition, when a new election is loaded into a DVRM, that unit writes its serial number back to the Data Carrier in an "already loaded" table for the purpose of being able to reject subsequent attempts to load the same election into the same unit (by recognizing that its own ID is already on the Carrier).

This same technique is also part of downloading election results to the Data Carrier after polls are closed. The DVRM again writes its serial number in the "already downloaded" table to prevent repeat occurrences of this activity also. A separate flag is also maintained on the Data Carrier for downloading of Audit data. The same procedure is applied to the downloading of Archive data on the Archive Data Carrier. When the Data Carriers are returned to the EMS Tally facility, the Tally software will be able to read these tables and determine that no DVRMs have been missed in the data collection and that no DVRM has been downloaded more than once. This facility presents attempts to withhold votes by ignoring selected DVRMs or to inflate votes by downloading selected DVRMs multiple times.

Reference Data, on the other hand, may be shared by one or more elections. Therefore, there can be multiple sets of Reference data, each uniquely identified. Election Data is the entire ballot related data of a single election, and includes Ballot Data and Ballot Formatting. Election Data may not be shared,-though may be duplicated into subsequent new elections.

Ballot data is where the user enters races and their candidates, straight tickets, recalls, issues, etc., and defines the ballots and assigns contests to them. For instance, one could begin with races and candidates, then add the other contests, and finally assign them to the appropriate ballots. The user may also establish the order of contests within the election and the order of candidates within races. These tasks can be performed regardless of the order in which data becomes available. While ballots can be defined before all the contests have been entered, most jurisdictions will do these steps in order.

A special non-voteable ballot may also be created which is used as the Practice Ballot on the Practice DVRM. This ballot would likely contain fictitious data to preserve the integrity of the voting process if the voter should require instructional assistance from a Polling Officer. This convenience is available as an alternative to the Test Election. Certain facts about each contest (number of votes allowed, and whether write-ins are permitted) must also be entered. Political party affiliation for partisan races may also entered at this time.

Ballots may also be formatted. This deals with the placement of contests, graphics and additional text on the ballot. The ballot may be partitioned into groupings of contests having common characteristics, indicated by Ballot Subtitles, and still maintain the overall order of contests within the election. Voting instructions may then be entered, along with any titles for groups, banners, whether to use one or two column format, etc.—any material which affects the appearance of the ballot as displayed to the voter on the DVRM.

An important task in creating a new election is to assign access authority to users. The EMS requires the DVRS System Administrator to maintain a User Roster of authorized users accompanied by the EMS sub-functions each user is permitted to access. Thereafter, when a user logs on successfully by providing a User ID and password, the EMS will enable only those sub-functions authorized for that user. The existence or identity of other non-authorized sub-functions is not divulged to the current user. Creating user records for Polling Officers may be deferred until issuing Polling Officer smart cards. The Roster of EMS Users is part of the root EMS system and is independent of any particular election. The User Roster is available to all elections and is part of the System Data.

The System Administrator may also grant or withdraw authority to each user for one or more of the following functions: System Administrator activities, reference database maintenance, election definition including ballot definition and ballot formatting, exporting data to Polling Places, encoding Polling Officer smart cards, tally import from DVRMs and other systems, manual tally input, tally adjustment input, and/or report output. The first two of these functions are set on a system-wide basis, while the other functions are set separately for each election. The System Administrator can print a roster of users and their access authority to assist in managing this activity.

The first time each person logs on they must replace the assigned ID and Password with one of their own choosing before the DVRS will permit any further access. This change will automatically update the User Roster. For all log-ons, the EMS system automatically enables only those functions the user is authorized to perform. In response to subsequent log-ons, the system automatically positions the user at the window(s) which were active at the last log-off. If all windows were closed at that time, the system opens just with the authorized EMS menu and associated tool bar(s) where the user can select what function(s) to perform. Every log-on of every user will be recorded in the audit trail.

Polling Officers, although not regular EMS users, must still be assigned an EMS User ID and an EMS User Strong password. These passwords are used to access the EMS for one purpose: to create that Polling Officer's individual Polling Officer Polling Place ID and Password encoded on that Polling Officer's smart-cards. This Polling Officer Password has its own format, and need not be a Strong Password. Each Polling Officer must be assigned to a specific Polling Place (which becomes part of that person's record in the User Roster). That particular Polling Place ID will also be encoded on the smart card along with the Election ID, rendering that card usable by only one specific Polling Officer at one specific Polling Place for this one specific election.

In creating a Polling Officer password the Polling Officer must enter a sequence of any 12 to 20 alphabetic characters. The EMS then returns a pair of Polling Officer passwords: the same alphabetic string originally entered for use in accessing the DVRM, and a numeric password of variable length used to access the SCAD. Separate passwords are necessary because the SCAD has only a numeric keypad and the DVRM an alphabetic keypad.

Further to the preferred embodiment, a new election (as well as the reference data and system data) is created by using a wizard which will ensure that all necessary steps are followed. A wizard is a program user interface that guides the user through a task step-by-step from beginning to end. The user may interrupt and resume any wizard at any point.

Figure 16:
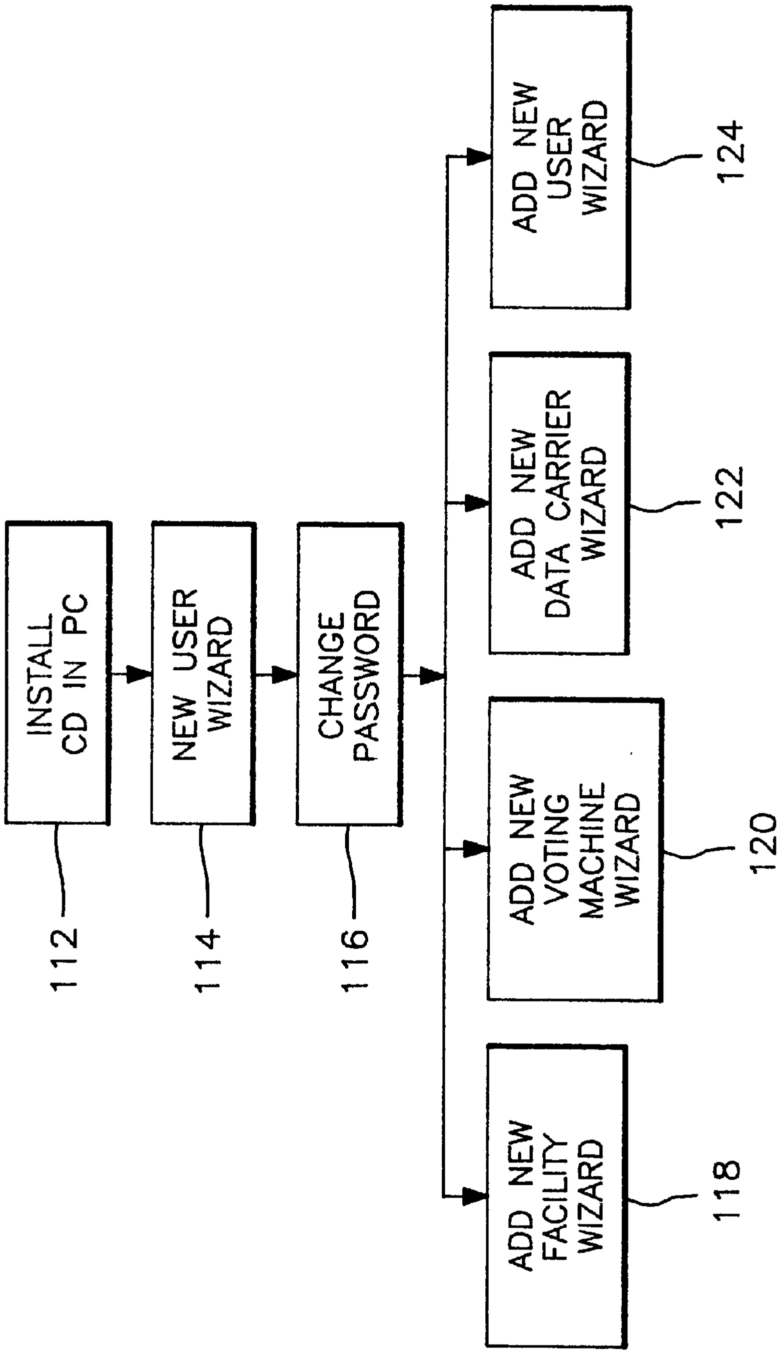
FIG. 16 is a flow diagram showing installation of the EMS.
Figure 17:
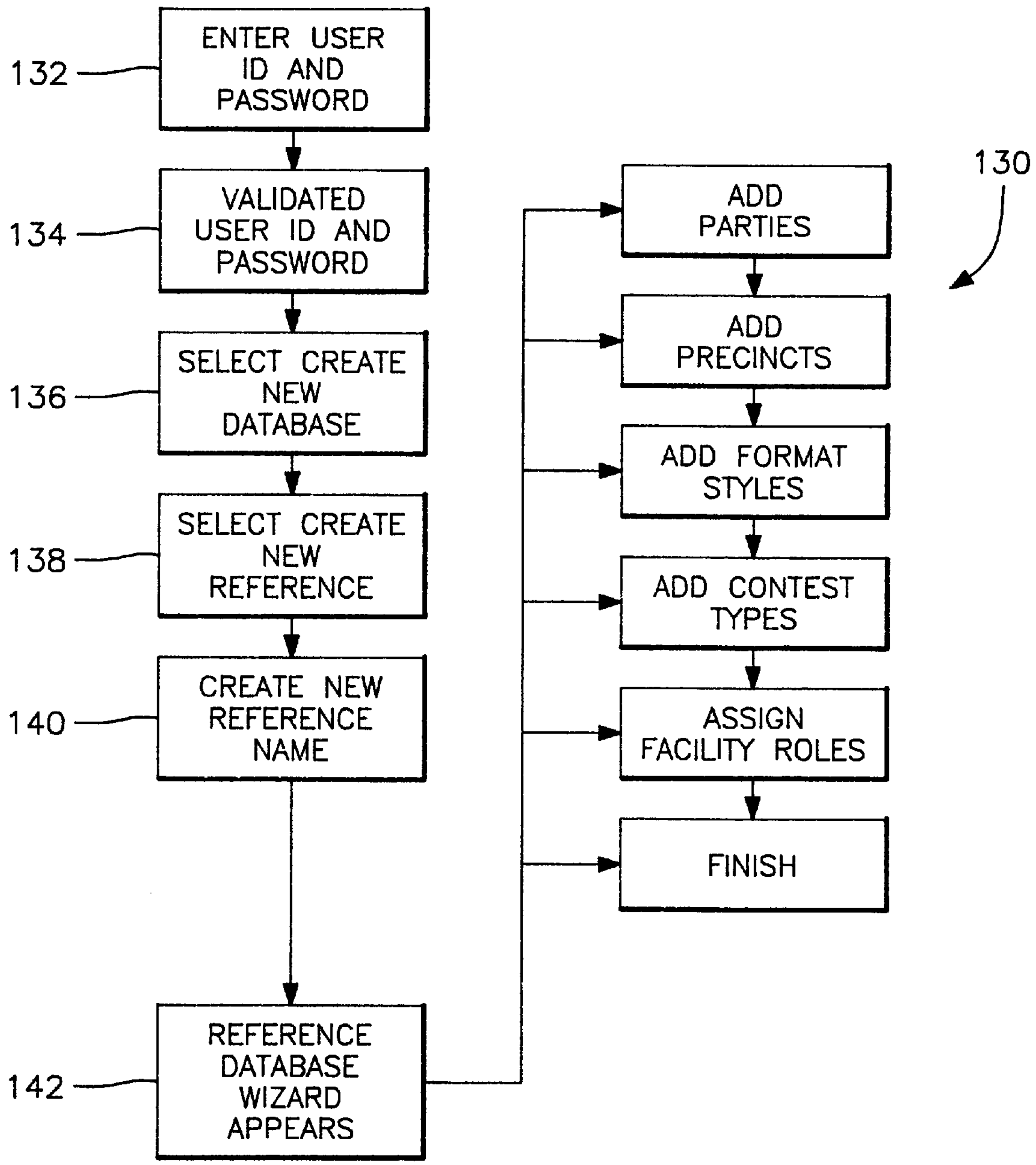
FIG. 17 is a flow diagram showing creation of the Reference Database on the EMS.
Figure 18:
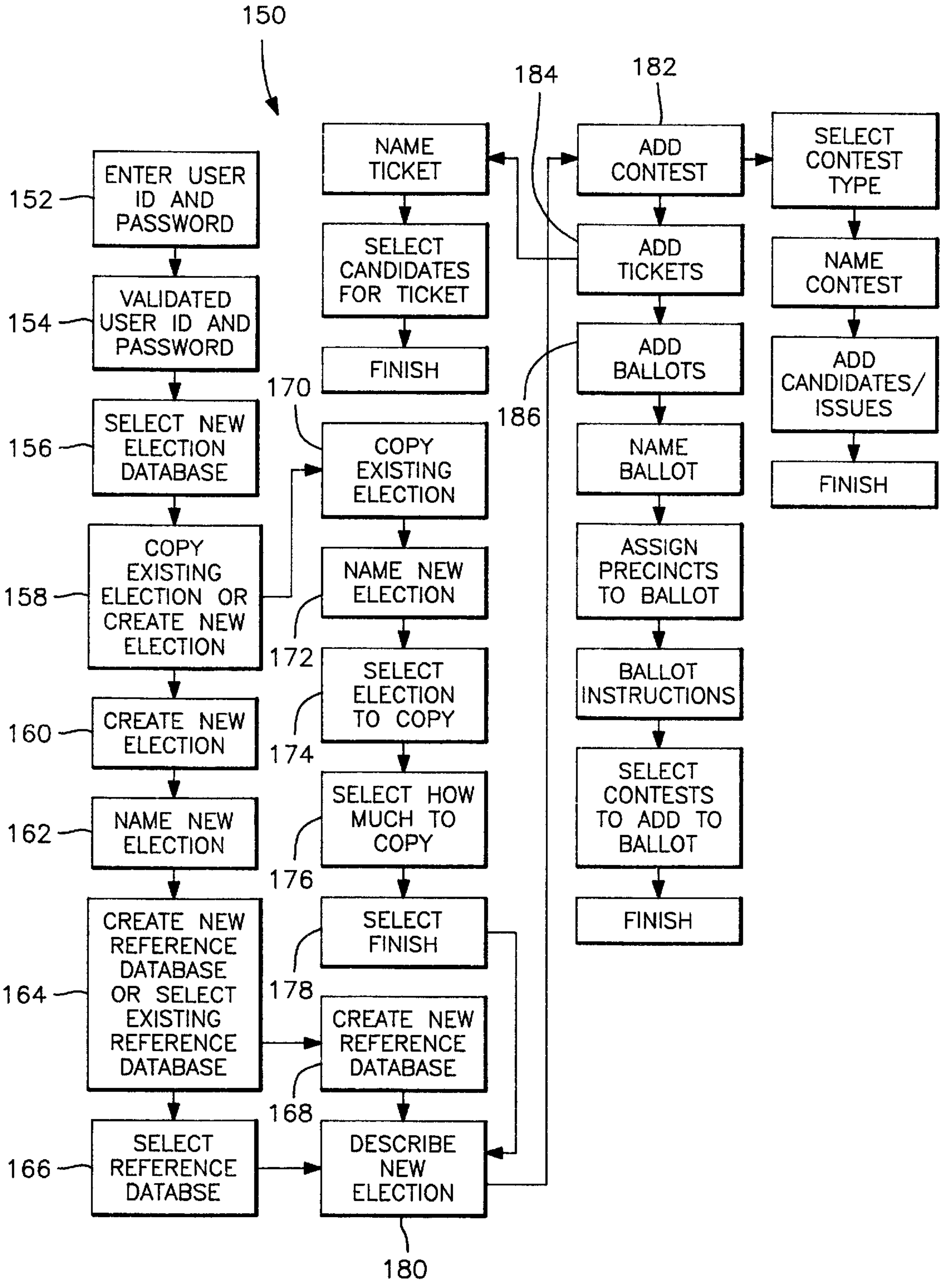
FIG. 18 is a flow diagram showing creation of an Election Database on the EMS.
Figure 19:
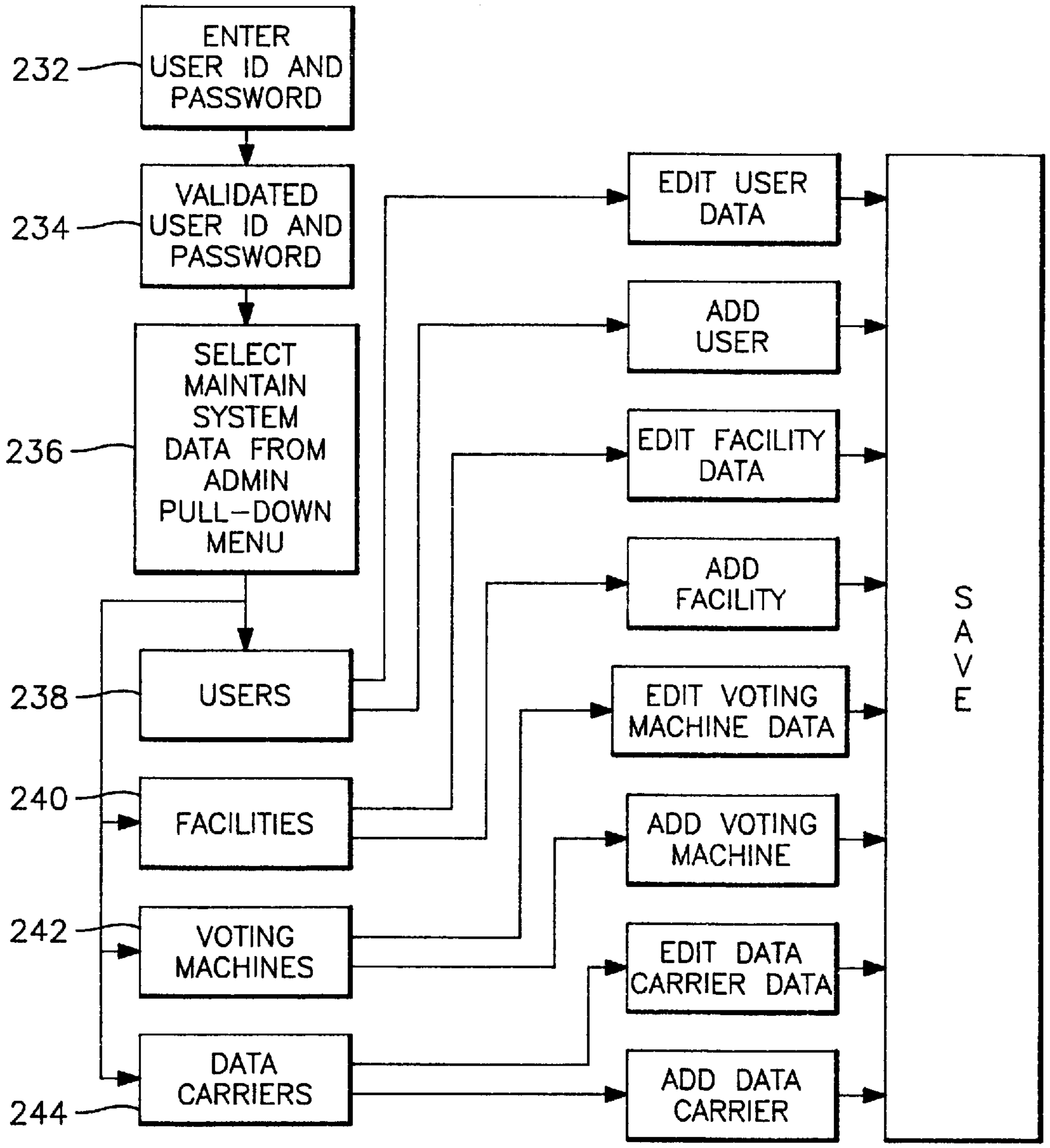
FIG. 19 is a flow diagram showing maintenance of System Data on the EMS.

Turning to FIGS. 16–19, operation of the EMS will now be discussed. FIG. 16 shows installation 110 of the EMS on PC 100. Once the EMS software is installed, the user may create reference data 130 (FIG. 17), create an election 150 (FIG. 18) and/or maintain system data 230 (FIG. 19). Each may be done as information comes in. However, for an election to be complete, the election must be created, and all reference data and system data provided.

Starting with FIG. 16, installation and set-up of the EMS is done by an election official who is designated as the System Administrator. This task must be accomplished before the EMS can be used for any other purpose. In some jurisdictions, this will be done just once. The EMS will be installed on a PC and used on that PC for many elections from one year to the next. In other jurisdictions, the EMS may be installed on a different PC for each election. The New User Wizard 114 assists with installation, requiring the user to enter the DVRS serial number and define at least one user as a System Administrator who creates a password, 116.

The EMS presents the user with various wizards used to create System Data. Specifically, the EMS prompts the user to create Equipment Roster, namely Add Facility 118, Add DVRM 120, and Add Data Carrier 122 or the User Roster, Add New User 124. These options are provided since they are most commonly used. However, the user need not select any of these options, and may instead proceed to create or edit an election 130, reference data 200, or other system data 200. Nonetheless, it is imperative that much of the data in the system be associated with a particular election. Therefore, the first thing to be done is to Create a new reference database.

Turning to FIG. 17, when the user decides to create or edit the reference database, the normal ID and password check is made, steps 132, 134. The user enters the create database command, 136, elects to create new reference database, step 138 and names the reference database, step 140. The Reference Database wizard is invoked, step 142, permitting the user to add parties, precincts, format styles, contest types or assign facility roles.

Once the user ID and password are provided 152 and validated 154, the user may select to create an election database, step 156 (FIG. 18). The wizard allows the user to create a new election from scratch or to copy data from an existing election database, step 158. In most cases, new election setup will be done by copying part or all of a previous election, or a sample election, as designated by the System Administrator. Then appropriate changes, for example changing the name and date of the election, will be made.

An election is created from scratch by entering all data manually, step 160. This involves naming the election, step 162, and at step 164 creating a new reference database, step 168, or selecting an existing database, step 166 (see FIG. 18). During this process, however, the user may still open an old election for the purpose of copying isolated items (such as the text of a particularly long issue or amendment) and pasting this information to the new election without having to accept all the data for the entire section of the old election data. In addition, considerable default information including system messages and standard formats will be included automatically.

If the new election is copied from an existing election, step 170, the election must still be named, step 172. The election to be copied is selected, 174, and the material to be copied is identified, step 176. When the reference database is complete, step 166, 168, 178, a short description of the election may be provided, step 180. The user then adds contests 182, tickets 184 and ballots 186, preferably in this order.

At FIG. 19, the user has again logged in, providing the necessary user ID and password, steps 232, 234. The user then decides to maintain system data by using the Administration pull-down menu. At this point, the user may create or edit the users 238, facilities 240, DVRMs 242 and/or data carriers 244.

At any time during the data entry process, the user may print intermediate reports to review the data and make necessary corrections. When it is estimated that all data is in and correct, the user can print an image of the ballot(s) for a final check which will include the Ballot appearance as well as the content. Further corrections or additions may still be made at this time. The user may iterate in this Open Election state as much as necessary.

Each election, regardless of the approach to its definition, progresses through a series of four states which parallel the Define—Vote—Report stages of the election life cycle, namely open, locked, in-service and closed. The initial state of the election is Open. In the open state, data Entry has begun but is not complete. The transition from Open to Locked may be made at any time.

In the locked state, once all data has been entered and checked via printed reports, the System Administrator locks the election barring any further changes. Only then can the ballot data be exported to the Data Carrier and Polling Officer smart cards be issued. Election Definitions are written to the Data Carrier defining all ballots authorized for a Polling Place for a particular election. Images of all the ballots may also printed for use in verifying the correct loading of the ballot data into the DVRMs. The data is loaded into the first DVRM and images of all the ballots are displayed and compared with those printed by the Election Definition PC. Archive Data Carriers are also created for each Polling Place.

If everything matches the other DVRMs are loaded and the election is ready to move from the Definition Stage to the Vote Stage of its life-cycle. If everything is not satisfactory, the System Administrator must activate the Recovery procedure in order to Unlock the election for modification. This entails returning all Data Carriers and Polling Officer smart cards to the Election Definition facility, inserting each one in the Data Carrier or smart card reader respectively, and having all the data "recovered" and the Carrier or card erased. When all Carriers and cards have been recovered, the System Administrator is then able to Unlock the election and thus return it to the Open state. If a Data Carrier is missing, the System Administrator may exercise an override to unlock the election anyway. Once the desired changes have been made, the process is repeated. There is no limit to the number of Recovery cycles. Such activity, including the data changes made, will become part of the audit trail.

For the In-Service state, all the DVRMs and SCADs are loaded satisfactorily, all devices have been checked out and Tested, and the Polls are Open. Active voting is completed. The Polls are Closed, voting results have been uploaded to the Data Carriers. Optional local reports and archiving are complete. In the Closed State, all results have been returned to the Tally Facility and loaded into the PC. Election results from other sources (i.e., absentee ballots) have also been entered. The tallies and all reports are satisfactorily completed. The election is Closed. Data may continue to be viewed, but there is no recovery process that would permit any modification.

After polls close, the System Administrator will use a special function of the EMS to allow it to accept tallies in accordance with the Tally and Reporting Subsystem. Once this has been done, designated users will import tally data from various sources. A designated user will import most of the tally data by inserting Data Carriers into the PCMCIA card reader attached to the PC. A designated user can import data files from other automated systems (this can only be done for systems whose output file structure has been previously coded into the DVRS) or make manual entries for paper ballots. Once an election is in the closed state, it may not go back to either Locked or open. An election may transition to the Closed state only after tallies have been entered for all Polling Places. An archive file is created when an election is closed.

At any time while tallies are being loaded, authorized users may print a report listing which Polling Places and other sources have been loaded into the master facility PC. This report can be used to track the tallying process. Authorized users may also export or print reports showing the actual tallies loaded from a single DVRM or other input source. The report will be similar in organization to the tally report printed by the DVRMs. Election officials can use this report to confirm that manually entered data is correct and to audit data from DVRMs or other automated systems. The EMS will provide a verification facility that will allow a second user to enter the same data to catch data entry errors. This verification step is optional. Adjustments to previously entered tally counts may also be done by a specially authorized user. The input process will be the same as manual tally input, but negative numbers may be entered. This kind of input would probably take place a considerable time after polls have closed and becomes part of the audit trail.

Once all tallies have been loaded, the System Administrator may close the election. At this time, the election and all its related data will be archived. Once the System Administrator has closed the election, it can only be opened to print reports or to copy election definitions for a new election.

In accordance with the preferred embodiment, the EMS software presents its data to the user organized into a collection of reference books. Each election is a reference book the user can select, read, revise, archive, or discard as needed and if authorized. Reference data common to multiple elections are organized as one or more separate books. Each election uses reference data from a single, designated, reference book. For instance, the Facility and User Rosters may be organized into reference books that are each applied to all elections. Menus provide access to the full range of functions provided by the EMS.

The main user interface is through six book displays: Election and Ballot Definition Book, Ballot Display Book, Polling Place Export Book, Results Book, Reference Data Book, and Systems Data Book. Each book is presented to the user as a split window. The Election and Ballot Definition book, allows the user to enter and revise data describing an election including ballots. The Ballot Displays Book, allows the user to enter and modify the visual and audio material that will be presented to a voter. The Polling Place Export Book, displays the export status of an election with regard to Data Carriers and shows all the Polling Places defined for the election. The Results Book, displays the tally import status of an election with regard to Data Carriers. The Results Book shows all the Polling Places defined for the election followed by any other sources from which tallies have been imported. The Reference Data Book, is used to enter and revise reference data supporting one or more elections. The System Data book, is used to enter and to revise system data supporting. There is only one copy of this book allowed.

The books are organized with the left side of the window is a table of contents (TOC). Actions can be performed on the current TOC selection by double-clicking it or using an appropriate menu or toolbar function. The right side shows the currently selected "page" in whatever format is appropriate to the information being displayed.

When ticket voting is used, the user may define one or more special contests that consist of ticket choices. This is generally done after other contests have been defined since ticket definition requires that the user designate the choices selected by each ticket. The user makes this selection from a list showing all choices currently defined for the election. For a recall, the user may enter a replacement race and indicate if the two contests are coupled, i.e., votes are allowed on the replacement only after a vote has been entered on the recall.

In addition to standard Windows menus, such as File, Edit, Window and Help, the EMS employs customized menus, namely Format Menu, Election Menu, References Menu, Book Menu, Tally Menu, System Administration Menu and Password Menu. The Password Menu allows the user to view and edit EMS, SCAD or DVRM password. The Format menu is not a standard WINDOWS menu, though it is common to many WINDOWS applications. It allows the user to change the formatting of a selected item. It will only be seen when a format ballots book or reference data is being performed.

The Election menu has seven functions: define election, define ballots, format ballots, export to Polling Places, handle results, maintain references and access authority. The define election menu opens or sets the book that allows the user to enter and revise data defining the contests and choices of an election. The define ballots menu opens or sets the book that allows the user to define ballots for each Polling Place and indicate which contests appear on each ballot. The format ballots menu opens or sets the book that allows the user to define the appearance of all the graphic components which make up a ballot, such as text-equivalent audio messages. The export to polling menu places opens or sets the book that allows the user to create or retrieve Data Carriers for an election. The handle results menu opens or sets the book that allows the user to import tally data from DVRMs, other automated systems and manual vote counts. Also allows the user to print standard reports. The maintain references menu opens or sets the book that allows the user to enter and revise reference data for the reference database that supports this election. The access authority menu item only appears for System Administrators. It opens a dialog that allows the System Administrator to change user access authority for the election.

The References menu allows the user to access the book view for all open reference databases. Its contents will be the names of each open reference database. Since the same reference database may support more than one election, the number of entries here may be less than the number of open elections. Since the user may open reference databases without opening an election, the number of entries here may be greater than the number of open elections.

The Book menu provides book maintenance functions that duplicate those available from the contextual menu or which are found on various pages. The wizard function invokes the add wizard appropriate to the current TOC selection. The add function adds one new record or record collection of the type currently selected on the TOC. The save function saves data for the active book page. The revert function reverts all data on the active book page to the previously saved values. The delete function deletes the current TOC selection. Also deletes the current ballot column or columns on a ballot page. The select function invokes an add wizard appropriate to the list displayed on the active book page. The remove function removes the current list selection. The default function is active only when a system condition page is active. Sets that page's working text to the default test.

The Tally menu will be displayed only when a Results Book is the focus. It will be active only when the election state is Tallying or Closed and a bottom level TOC entry is selected. It allows the user to perform special functions associated with loading and verifying tally data. This menu has six functions. The print status function prints the tally status of all Polling Places showing the number of DVRMs and votes loaded and the time loaded for those that have been loaded. Also prints a report of just those Polling Places that have not yet been loaded. The import carriers function opens the import carriers dialog. The import tallies function invokes the Import Other Tallies wizard. The manual input function invokes the Manual Tally Input wizard. The verify input function invokes the Verify Tally Input wizard which only allows for manual input tallies that have been designated as requiring verification. The enter corrections function allows an authorized user to enter corrections to an existing tally. These corrections will be stored as a separate record and may include negative number.

The System Administration menu will be displayed only to System Administrators and, for them, it will be displayed at all times. This menu will allow System Administrators access to special functions only they are permitted to perform. This menu has seven functions, namely Maintain System Data, Set Election, Export Master Authority, Output Audit Data, Output DVRM Audit Data, Create Archive Carrier, and Issue Smart Cards.

The Maintain System Data function opens or sets the book that allows a System Administrator to enter and maintain system data. The Set Election state function opens a dialog for the election that currently has focus. This dialog allows the System Administrator to change the state of the election. This function is not available for a closed election. This function is also not available when the window with current focus is a reference book or the system data book. The Export Master authority function opens a wizard that allows the System Administrator to export the entire collection of EMS databases for the purpose of transferring operations to another PC. The Output Audit data function opens a dialog that allows the System Administrator to specify that all or some of the PC audit data be printed or exported. The Output DVRM Audit Data function opens a read dialog that allows the System Administrator to view the contents of an archive Data Carrier and select a file for printing or exporting. The Create Archive Carrier function opens a dialog that allows the System Administrator to format a Data Carrier for use as an archive Data Carrier. The Issue Smart Cards function opens a dialog that allows the System Administrator to issue smart cards to Polling Officers. Only available of locked elections.

The EMS maintains an audit trail of all activity at that PC facility. Each audit record indicates the identity of the election official responsible. The audit trail is stored in a manner that is protected against power loss and accidental erasure. For ballot definition, the audit trail records the file and record designation of every add, change, or delete action in the database. For tally data uploads, the audit trail records the Polling Place ID of each Polling Place loaded. For manual tally inputs, the audit trail records the file and record designation of every record added to the database. Every report request and data export command is also recorded in the audit trail. All audit trail records include a date/time stamp on every record.

The System Administrator may print the EMS audit log at any time. The user may either designate a start date and time or print the entire log. A start date and time provides flexibility since the log accumulates data from the initial installation of the DVRS. This report shows each log entry as a single line of print. They System Administrator may also copy and/or print audit data placed on Archive Data Carriers by the DVRMs. This data includes both the DVRMs audit log and copies of all ballots cast on each DVRM. This print capability duplicates that available directly from the DVRMs.

All data stored on the EMS is encrypted and may be read and written only if the user provides the proper encryption key. This key may be separate from the user's password and is created by the EMS. Preferably, the key is communicated verbally to the Polling Officer to minimize unauthorized acquisition of the key.

The EMS is also used to encode Polling Officer smart cards. Preferably, only a System Administrator may create Polling Officer smart cards. Each card is encoded for the current election with a specific Polling Officer and for a specific Polling Place. The smart card will have a default password that must be reset by the Polling Officer before it will be accepted by a DVRM or SCAD. In order to configure the smart card, the PC must be connected to a smart card I/O device.

The EMS supports over 4,000 ballots. For a primary election, the EMS supports ballot definitions for at least 30 political parties. As many as 512 races, issues, and recalls in a single election, may be created, as well as 2,048 voteable positions in a single election, and candidates for a single race. All the Data Carrier devices for a 500-precinct election may be loaded into a vote tallying PC 100 in 30 minutes once all those devices have arrived at the vote tallying facility. The DVRS system can be used with voter registration systems, which may be independently operated or integrated with the DVRS.

Further to an alternative embodiment, the Data Carrier 800 may be any suitable transmission device. In addition, since the SCAD 500 only downloads election titles from the Data Carrier, the titles may instead be placed on the Polling Officer smart card when programmed at the EMS, and loaded from the smart card to the SCAD.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art.

For example, the system may include additional features that presently are not permitted by FEC Requirements. For instance, the DVRM, SCAD and PC may communicate directly (instead of via Data Carrier 800), such as via the Internet, in order to load election data to the DVRMs/SCAD and to transmit voting results in real time to the central location so that any failure of a DVRM will not result in a loss of election information. In addition, the system may support cumulative voting by allowing voters to cast multiple votes for one candidate, write-in votes, rotation of candidate positions between Polling Place, and rotation of candidate positions within a Polling Place. In addition, the SCAD may keep data, such as a count of Voter Smart Cards created by the SCAD. The data would then be transferred to the EMS via Data Carrier 800 to further verify tally data from the DVRMs. Still further, the EMS, SCAD, DVRM, Data Carriers and/or smart cards may be integrated into a single unit.

Therefore, it is not desired to limit the invention to the specific examples disclosed or the exact construction and operation shown and described. Rather, all suitable modifications and equivalents may be resorted to, falling within the scope of the invention.

We claim:

1. A voting system for an election to be voted on by voters at a voting location, the voting system comprising:

an election management computer unit which creates election data relating to the election, said election data including one or more ballots and an election ID;

a polling officer smart card configured by said election management computer unit to include the election ID and a polling officer password for use by a polling officer;

a smart card activator device for reading the election ID and polling officer password from said polling officer smart card, for receiving a password input by the polling officer, and for determining that the password input by the polling officer matches the polling officer password read from said polling officer smart card, a successful match enabling said smart card activator device to receive the election data from said election management computer unit and to verify that the election ID from the polling office smart card matches the election ID received from the election management computer unit, the smart card activator device once enabled by a positive verification for configuring a voter smart card in view of said election data to enable a voter to vote on the election; and at least one voting machine for reading the election ID and polling officer password from said polling officer smart card, determining whether a password entered by the polling officer matches the password read from the polling officer smart card, a successful match enabling said voting machine to receive an election ID from said election management computer unit and to verify that the election ID from the polling officer smart card matches the election ID received from the election management computer unit, said voting machine, upon election ID verification, receiving at least one of the ballots of the election data from said election management computer unit and, upon reading and verifying the configured voter smart card, the voting machine displaying at least one of the ballots of the election data and permitting the voter to vote on the displayed ballot.

2. The system of claim 1, the voting machine further tallying votes selected by voters.

3. The system of claim 2, further comprising a plurality of data carriers for receiving and storing election data from said election management computer unit for transfer to said smart card activator device and said voting machine, and for receiving the tallied votes from said voting machine, the election management computer unit reading the tallied votes from each of the data carriers to provide a cumulative tallied vote.

4. The system of claim 3, wherein the election management computer unit compares the number of data carriers that received election data with the number of data carriers from which tallied votes are read to determine whether data carriers are missing.

5. The system of claim 3, wherein each data carrier is assigned a data carrier ID and the election management computer unit compares the data carrier ID of the data carrier being read for tallied votes with the data carrier ID from any previously read data carrier so that tallied votes are not read more than once for the same data carrier.

6. The system of claim 2, wherein the voting machine transfers the tallied vote to the election management computer unit which generates a tallied vote.

7. The system of claim 1, further comprising a plurality of voting machines.

8. The system of claim 1, wherein the election management computer unit is located at the voting location.

9. The system of claim 1, further comprising a plurality of election management computer units, wherein at least one election management computer unit is located at a master jurisdiction and at least another election management computer unit is located at a local jurisdiction.

10. The system of claim 1, wherein said voting machine has a counter that is incremented when the voter casts a vote.

11. The system of claim 1, wherein said smart card activator device shuts down after a predetermined period of inactivity.

12. The system of claim 1, wherein said smart card activator device configures a practice smart card with a practice ballot, said voting machine displaying the practice ballot and enabling the voter to vote only on the displayed practice ballot.

13. The system of claim 1, wherein the voting machine retains vote data formed by votes cast by voters, the voting machine preventing new election data from being received until a safe period defined by the election management computer unit and downloaded to the voting machine has expired.

14. The system of claim 1, wherein said voting machine has flash memory and retains vote data formed by votes cast by voters in said flash memory.

15. The system of claim 1, said voting machine preventing voters from voting on the election after the election has ended.

16. The system of claim 1, said voting machine tallying votes only after the election has ended.

17. The system of claim 1 wherein, upon completion of voting by the voter, said configured voter smart card is reconfigurable by said smart card activator device for use by a next voter.

18. A voting system for an election having one or more ballots to be voted on by voters at a voting location managed by a polling officer, the voting system comprising:

an election management computer unit which creates election data in response to operator input, said election data including ballot data for each ballot, an election ID identifying the election, a voting location ID identifying the voting location, and a polling officer password;

at least one portable data carrier which receives the election data, election ID, voting location ID and polling officer password from said election management computer unit;

a polling officer smart card for use by the polling officer, the polling officer smart card configured by said election management computer unit to include the election ID, voting location ID and polling officer password;

a voter smart card for use by the voter;

a smart card activator device for reading the election ID, voting location ID and polling officer password from the polling officer smart card, reading the election ID and voting location ID from the portable data carrier, determining whether a password input to the smart card activator device by the polling officer matches the polling officer password read from the polling officer smart card, verifying that the election ID and voting location ID read from said data carrier respectively match the election ID and voting location ID read from said polling officer smart card, and downloading the election data from said data carrier, said smart card activator device further programming said voter smart card to enable the voter to vote on one or more ballots; and, a voting machine for reading the election ID and voting location ID from said data carrier, reading the election ID, voting location ID and polling officer password from said polling officer smart card, determining whether a password input to the voting machine by the polling officer matches the polling officer password read from the polling officer smart card, verifying the election ID and voting location ID read from the data carrier respectively match the election ID and voting location ID read from said polling officer smart card, and downloading the ballot data from said data carrier, the voting machine further reading the programmed voter smart card, displaying the enabled one or more ballot and permitting the voter to vote on the displayed ballot.

19. The system of claim 18, said voting machine further generating a voting location password and transferring the voting location password to the portable data carrier, said smart card activator device reading the voting location password from the data carrier and programming the voting location password to the voter smart card, said voting machine verifying the voter smart card by comparing the voting location password read from the voter smart card to the voting location password generated by the voting machine.

20. The system of claim 18 wherein, upon completion of voting by the voter, said configured voter smart card is reconfigurable by said smart card activator device for use by a next voter.

21. A method of creating and managing an election having one or more ballots including an election management computer unit, a data carrier, a polling officer smart card, a voter smart card, a smart card activator device and at least one voting machine, the method comprising:

creating, at the election management computer unit, election data relating to the election, the election data including ballot data for each ballot, an election ID, a voting location ID and a polling officer password;

storing the election data on the data carrier;

configuring the polling officer smart card to include the election ID, voting location ID and polling officer password;

reading, at the smart card activator device, the election ID, voting location ID and polling officer password from the polling officer smart card;

receiving, at the smart card activator device, a password by a polling officer;

determining whether the password input by the polling officer matches the polling officer password from the polling officer smart card;

reading, at the smart card activator device, election data stored on the data carrier;

verifying that the election ID and voting location ID read from the data carrier matches the election ID and voting location ID read from the polling officer smart card;

downloading, at the smart card activator device, election data from said data carrier;

configuring, at the smart card activator device, a voter smart card using said election data to enable the voter to vote on the election;

reading, at the voting machine, the election ID and voting location ID stored on the data carrier;

reading, at the voting machine, the configured voter smart card; and permitting, at the voting machine, a voter to vote on the displayed ballot in response to reading the configured voter smart card.

22. The method of claim 21, further comprising the step of tallying, at the voting machine, votes selected by voters.

23. The method of claim 22, further comprising the step of transferring the tallied votes to the data carrier.

24. The method of claim 23, further comprising receiving, at the election management computer unit, tallied votes from a plurality of data carriers and tallying the received tallied votes to form a cumulative tally.

25. The method of claim 21, further comprising the step of preventing, at the voting machine, voters from voting on the election after the election has ended.

26. The method of claim 21, further comprising the step of tallying, at the voting machine, votes only after the election has ended.

27. The method of claim 21 further comprising the step of reconfiguring, by said smart card activator device, said configured voter smart card for use by a next voter.

* * * * *